(12) United States Patent
Kamei et al.

(10) Patent No.: US 7,245,793 B2
(45) Date of Patent: Jul. 17, 2007

(54) OPTICAL WAVEGUIDE CIRCUIT

(75) Inventors: Shin Kamei, Tokyo (JP); Yasuyuki Inoue, Isehara (JP); Takuya Tanaka, Mito (JP); Toshikazu Hashimoto, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 225 days.

(21) Appl. No.: 10/715,146

(22) Filed: Nov. 17, 2003

(65) Prior Publication Data

US 2004/0126052 A1    Jul. 1, 2004

(30) Foreign Application Priority Data

Nov. 19, 2002    (JP)    ............................... 2002-335257

(51) Int. Cl.
G02B 6/12 (2006.01)
G02B 6/36 (2006.01)

(52) U.S. Cl. ............................ 385/14; 385/31; 385/37; 385/46; 385/39

(58) Field of Classification Search .................... None
See application file for complete search history.

(56) References Cited

U.S. PATENT DOCUMENTS

| | | | |
|---|---|---|---|
| 5,577,141 A | 11/1996 | Adar et al. | |
| 6,304,687 B1 * | 10/2001 | Inoue et al. | ................... 385/14 |
| 6,320,888 B1 * | 11/2001 | Tanaka et al. | ................. 372/32 |
| 2002/0122623 A1 | 9/2002 | Yoneda | |

FOREIGN PATENT DOCUMENTS

| | | |
|---|---|---|
| CA | 2315458 | 2/2001 |
| EP | 0 919 840 A1 | 6/1999 |
| EP | 1118888 A2 | 7/2001 |
| EP | 1367418 A1 * | 12/2003 |
| GB | 2370128 | 6/2002 |
| JP | 63-33706 | 2/1988 |
| JP | 10-300957 | 11/1998 |
| JP | 11-97784 | 4/1999 |
| JP | 2000-29079 | 1/2000 |
| WO | WO 98/36299 | 8/1998 |

OTHER PUBLICATIONS

Aretz K, et al., *Reduction of cross talk . . .*, Electronics letters, IEE Stevenage, GB, vol. 25, No. 11, May 25, 1989, pp. 730-731, XP)))112786, ISSN: 0013-5194.

(Continued)

*Primary Examiner*—Frank G. Font
*Assistant Examiner*—Eric Wong
(74) *Attorney, Agent, or Firm*—Workman Nydegger

(57) ABSTRACT

An optical waveguide circuit includes a first loss component for causing a diffraction loss of light propagating through an optical waveguide, and a second loss component provided at least one of before and after the first loss component, for causing a diffraction loss less than the diffraction loss in the first loss component to the light propagating through the optical waveguide. This enables the beam spot size of the lightwave launched into the first loss component to be magnified seemingly, and to reduce the radiation angle of the lightwave at the first loss component, thereby making it possible to reduce the excess loss involved in the propagation of the light through the optical waveguide.

194 Claims, 41 Drawing Sheets

OTHER PUBLICATIONS

H. Takahashi et al., *Arrayed-Waveguide Grating for Wavelength Division Multi/Demultiplexer with Nanometre Resolution*, Electronics Letters, vol. 26, No. 2, Jan. 1990, pp. 87-88.

M. Okuno et al., *8×8 Optical Matrix Switch Using Silica-Based Planer Lightwave Circuits*, IEICE Trans. Electron, vol. E76-C, No. 7, Jul. 1993, pp. 1215-1223.

T. Tanaka, et al., *Integrated External Cavity Laser Composed of Spot-Size Converted LD and UV Wirtten Grating in Silica Waveguide in Si*, Electronics Letters, vol. 32, No. 13, Jun. 1996, pp. 1202-1203.

S. Suzuki et al., "High-Density Integrated Planar Lightwave Circuits Using $SiO_2$-$GeO_2$ Waveguides with a High Refractive Index Difference, Journal of Lightwave Technology, vol. 12, No. 5, May 1994, pp. 790-796, May 1994.

Shin Kamei et al., *Loss Reduction in Super-high-$\Delta$ Compact Athermal AWG*, Proceedings of the 2003 IEICE Society Conference, Sep. 10, 2003, pp. 145 (with English translation).

* cited by examiner

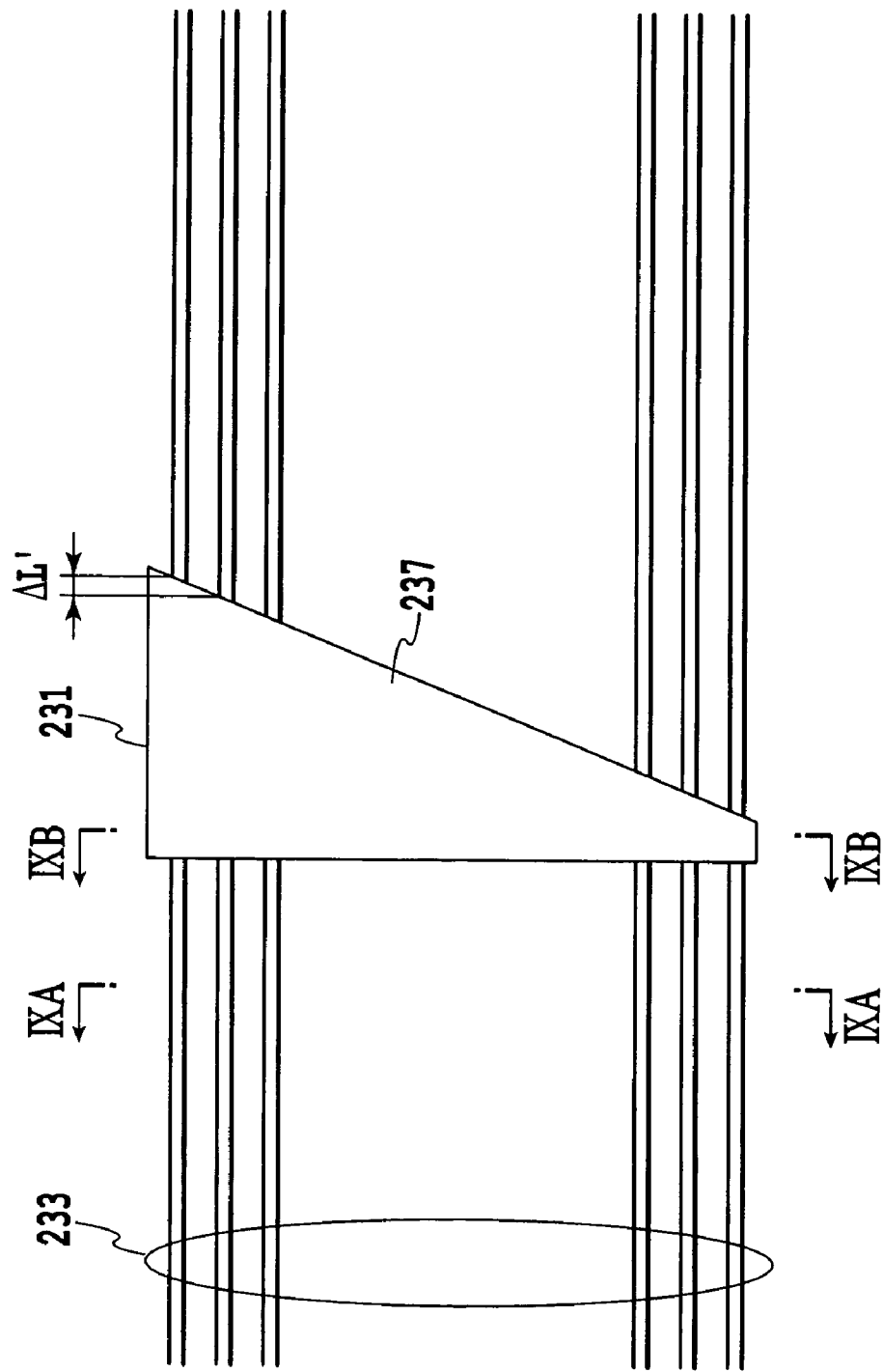

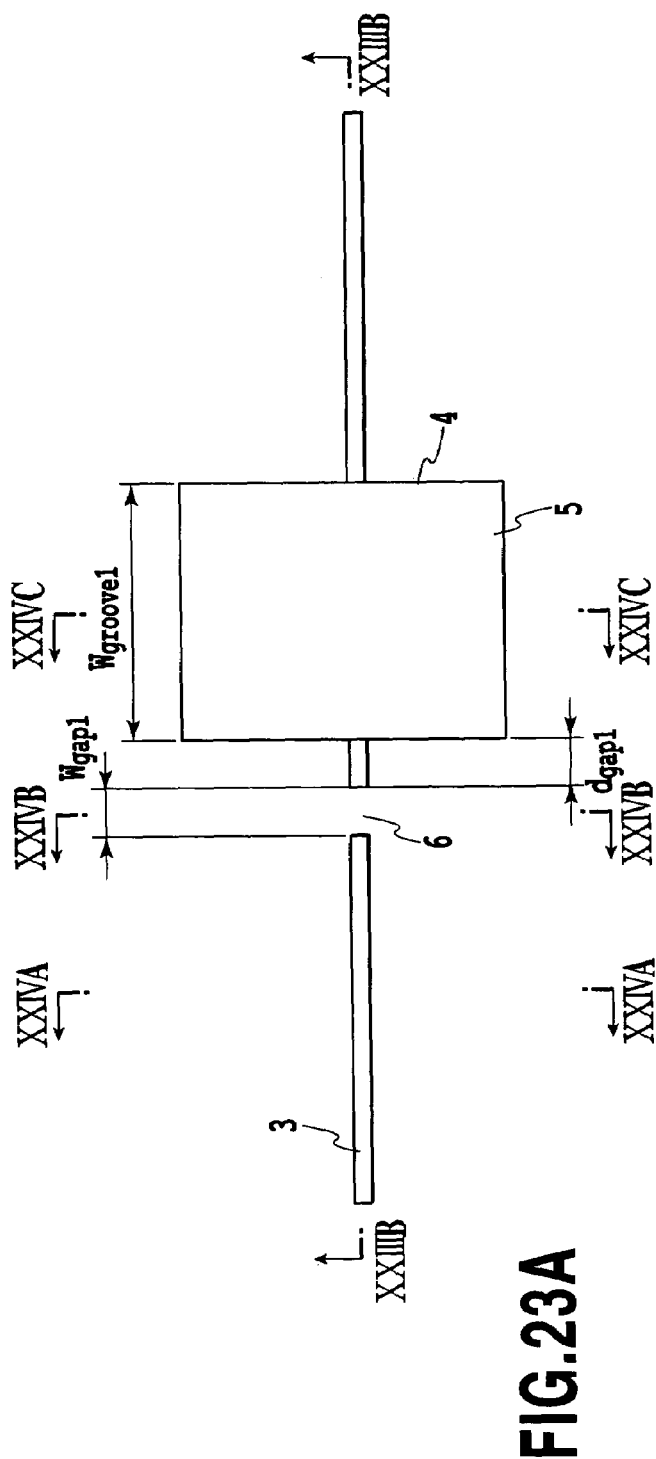
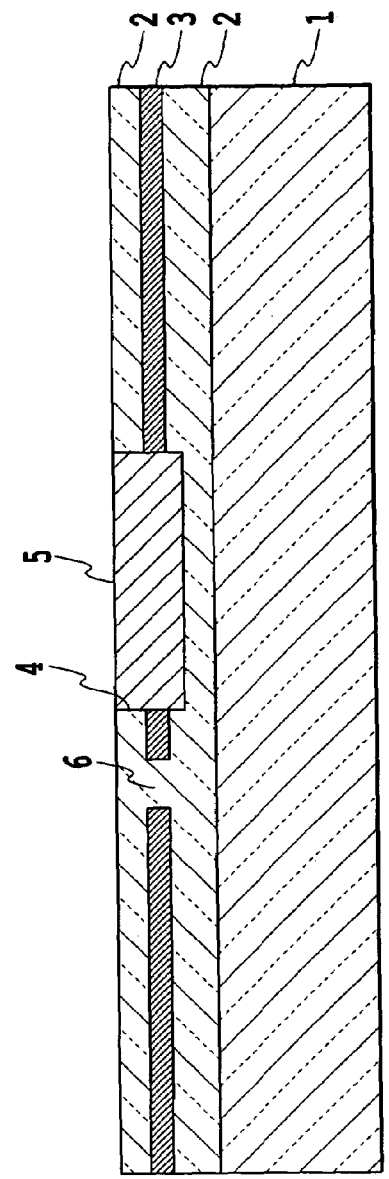
FIG.23A
FIG.23B

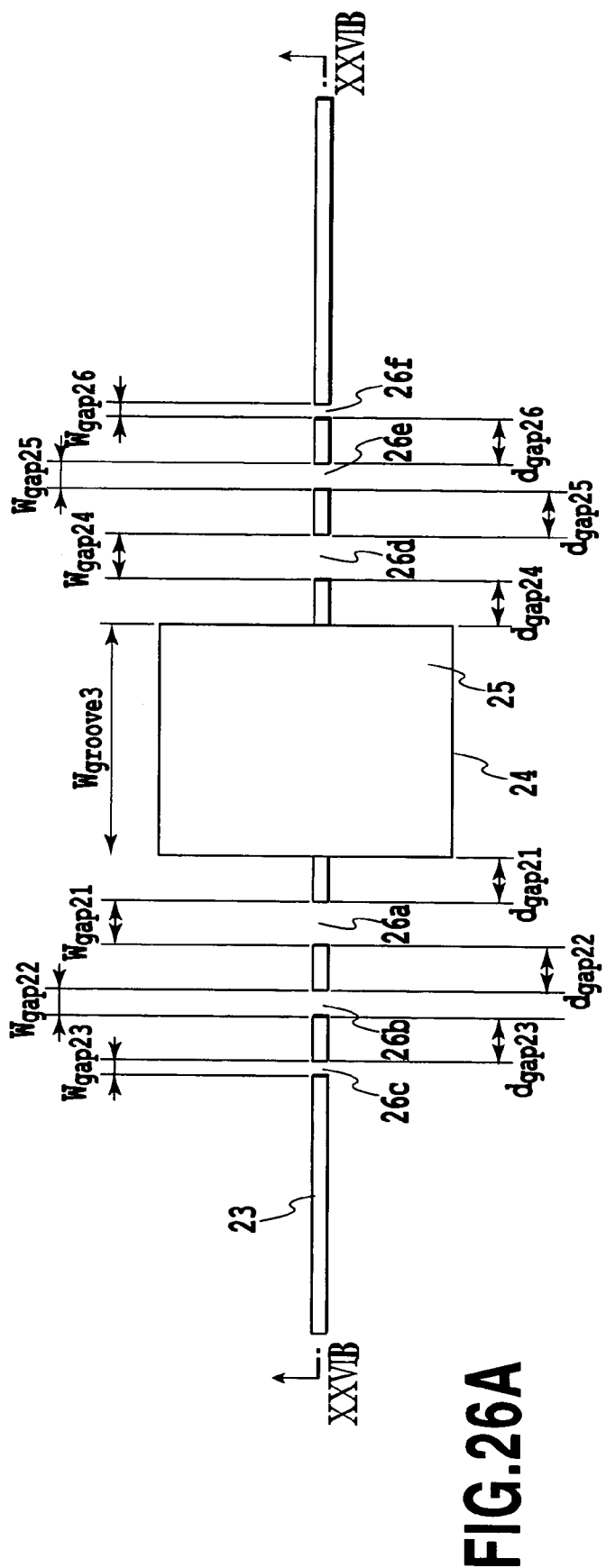
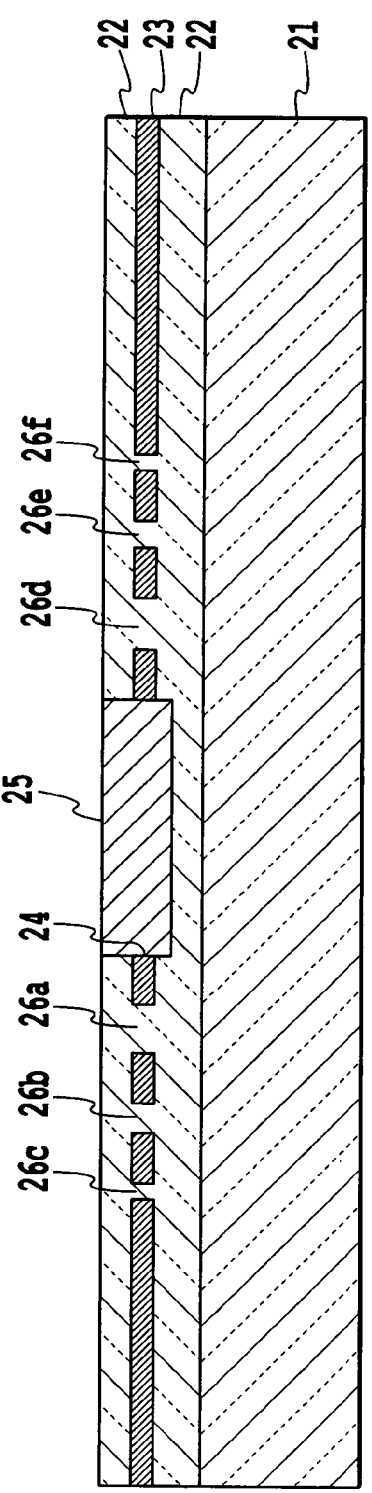
FIG.26A
FIG.26B

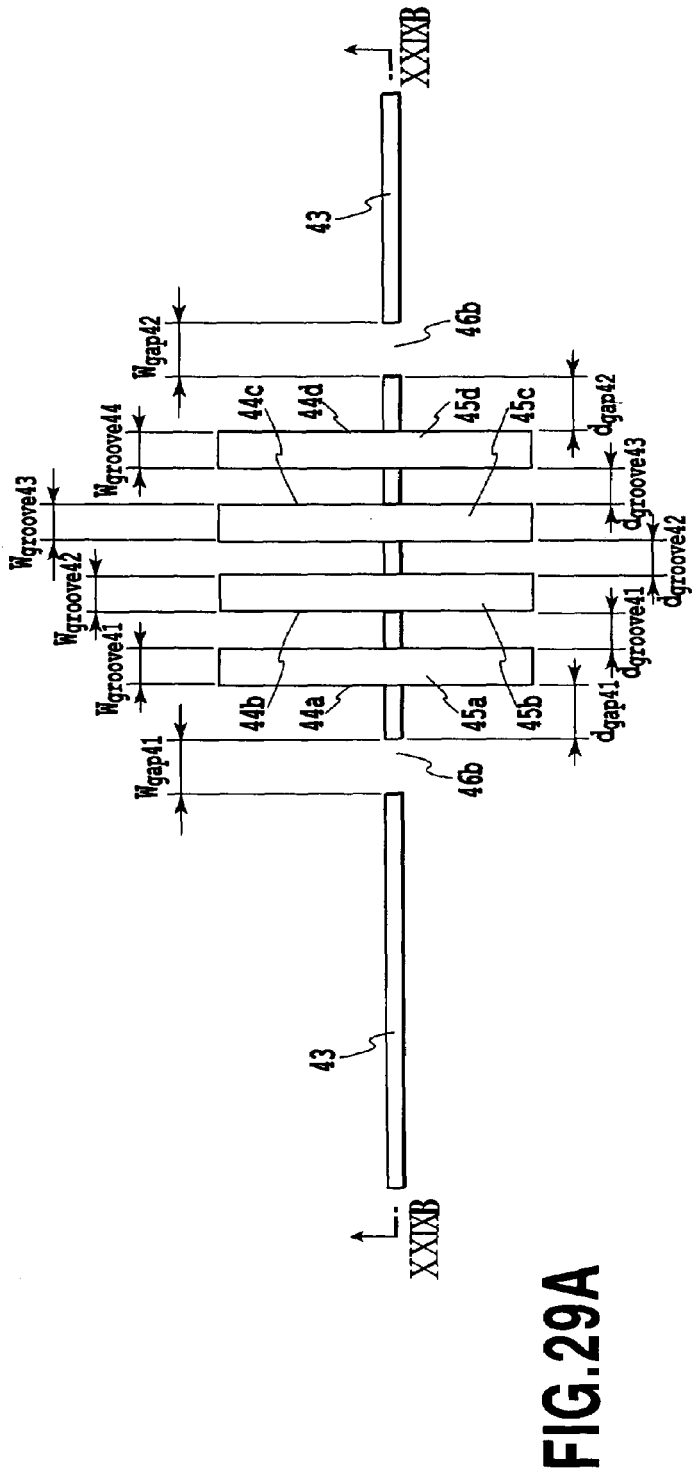
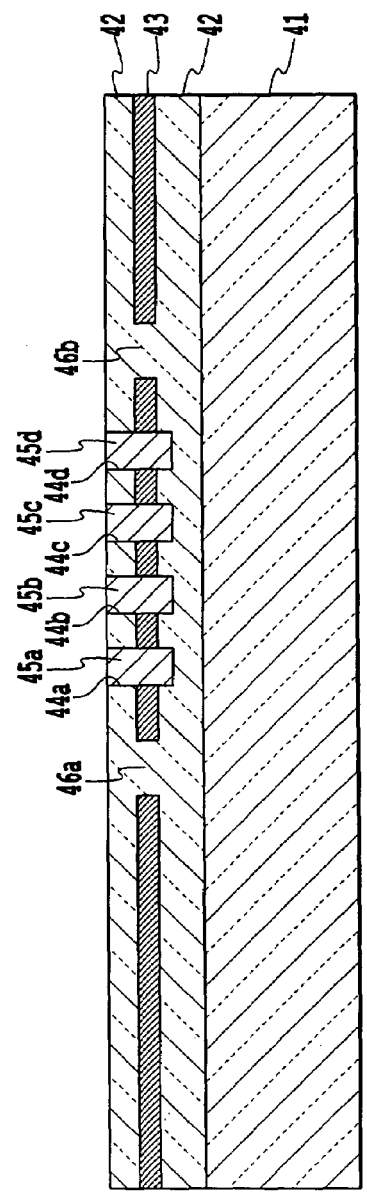
FIG.29A
FIG.29B

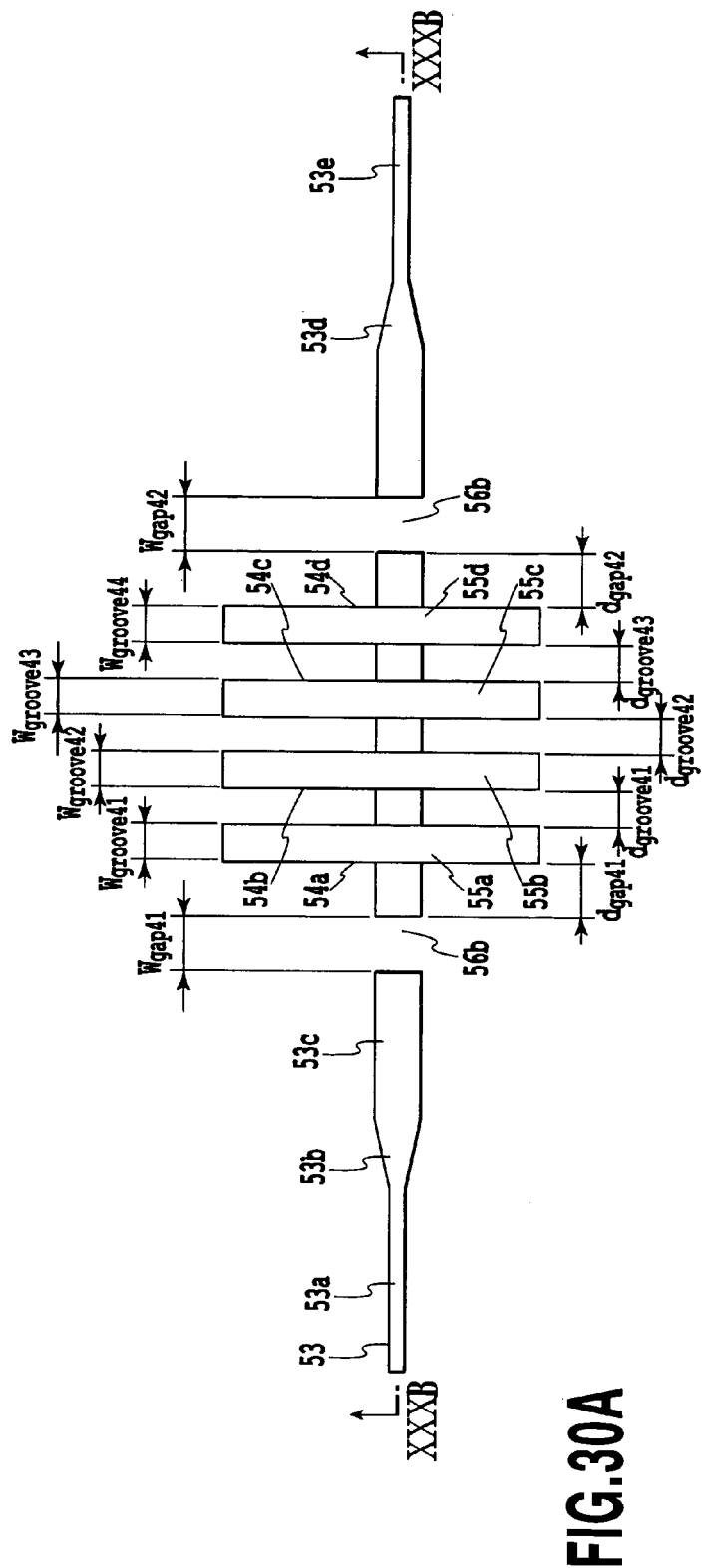
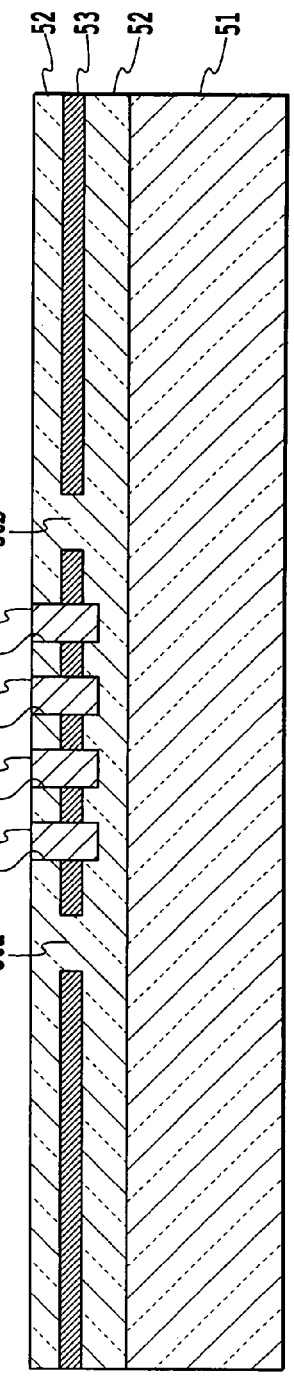
FIG.30A
FIG.30B

OPTICAL WAVEGUIDE CIRCUIT

This application claims priority from Japanese Patent Application No. 2002-335257 filed Nov. 19, 2002, which is incorporated hereinto by reference.

BACKGROUND OF THE INVENTION

1. Field of the Invention

The present invention relates to an optical waveguide circuit, and particularly to an optical waveguide circuit having a loss component that causes a diffraction loss to light propagating through an optical waveguide.

2. Description of the Related Art

Recently, research and development has been carried out intensively of planar lightwave circuits (PLC) composed of silica-based glass waveguides formed on silicon substrates.

There are various types of the planar lightwave circuits. For example, H. Takahashi, et al., "Arrayed-Waveguide Grating for Wavelength Division Multi/Demultiplexer With Nanometer Resolution" (Electron. Lett., vol. 26, no. 2, pp. 87–88, 1990) discloses an optical wavelength multi/demultiplexer like an arrayed-waveguide grating (AWG); and M. Okuno et al., "8×8 Optical Matrix Switch Using Silica-Based Planer Lightwave Circuits" (IEICE Trans. Electron., vol. 76-C, no. 7, pp. 1215–1223, 1993) discloses an optical path switching like a thermo-optic (TO) switch.

Furthermore, as for a hybrid planar lightwave circuit integrating a semiconductor optical device on a planar lightwave circuit, T. Tanaka et al., "Integrated Extra Cavity laser Composed of Spot-Size Converted LD and UV Written Grating in Silica Waveguide on Si" (Electron. Lett., vol. 32, no. 13, pp. 1202–1203, 1996) discloses an external cavity frequency-stabilized laser, for example.

FIG. 1 is a plan view showing a configuration of a conventional arrayed-waveguide grating; and FIG. 2 is a cross-sectional view taken along a line II—II of FIG. 1.

In FIGS. 1 and 2, a cladding layer 202 composed of silica-based glass is formed on a silicon substrate 201, and arrayed-waveguides 203 with cores composed of silica-based glass are formed in the cladding layer 202.

At both ends of the arrayed-waveguides 203, slab waveguides 205a and 205b are connected. In addition, input waveguides 204a are connected to the input side of the slab waveguide 205a, and output waveguides 204b are connected to the output side of the slab waveguide 205b.

FIG. 3 is a plan view showing a configuration of a conventional thermo-optic switch; and FIG. 4 is a cross-sectional view taken along a line IV—IV of FIG. 3.

In FIGS. 3 and 4, a cladding layer 212 composed of silica-based glass is formed on a silicon substrate 211, and arm waveguides 213a and 213b with cores composed of silica-based glass are formed in the cladding layer 212.

At both ends of the arm waveguides 213a and 213b, directional couplers 215 and 216 are connected. In addition, input waveguides 214a and 214b are connected to the input side of the directional coupler 215, and output waveguides 217a and 217b are connected to the output side of the directional coupler 216.

Furthermore, a thin-film heater 218 is formed on the cladding layer 212 at a position corresponding to the arm waveguide 213a, and the thin-film heater 218 is connected to wiring conductors 219a and 219b.

FIG. 5 is a perspective view showing a configuration of a conventional external cavity frequency-stabilized laser.

In FIG. 5, a cladding layer 222 composed of silica-based glass is formed on a silicon substrate 221. In addition, an optical waveguide 223 with a core composed of silica-based glass is formed in the cladding layer 222, and a UV written grating 224 is formed in the optical waveguide 223.

Furthermore, a silicon terrace 225 is formed on the silicon substrate 221 by removing part of the cladding layer 222, and a semiconductor laser 226 is installed on the silicon terrace 225.

The optical waveguide circuits such as the planar lightwave circuits described above can improve their characteristics or carry out a new function by forming a groove by removing part of the optical waveguides or by filling the groove with a material with appropriate characteristics.

In addition, the optical waveguide circuits such as the planar lightwave circuits described above can increase flexibility in their layout by intersecting the optical waveguides, thereby enabling a variety of circuit components to be integrated on the same substrate, and implementing a new function.

Here, it is unavoidable that diffraction losses are produced in the grooves formed in part of the optical waveguides or at the intersections of the optical waveguides. As a method to reduce such diffraction losses, a technique is proposed that is increasing or decreasing the width or thickness of the waveguide, in which the groove or intersection are included, by providing a taper waveguides. In the case of increasing the width or thickness of the waveguide, the mode spot size of the lightwave magnified in accordance with the waveguide width and thickness. In the case of decreasing the width or thickness of the waveguide, the mode spot size of the lightwave also magnified, because the light confinement to the waveguide is weakened. This magnification of the mode spot size decreases a radiation angle (diffraction angle) at the groove or intersection.

International publication No. WO98/36299 discloses an example of removing part of the optical waveguides to form a groove, and of filling the groove with a material with appropriate characteristics. It removes part of the cladding and cores of an arrayed-waveguide grating to form the groove, and fills the groove with a temperature compensation material with a refractive index temperature coefficient different in sign from the temperature coefficient of the effective refractive index of the optical waveguides, thereby eliminating the temperature dependence of the transmission wavelength of the arrayed-waveguide grating. This is called an athermal arrayed-waveguide grating.

Japanese Patent Application Laid-open No. 2000-29079 discloses another example of removing part of the optical waveguides to form a groove, and of filling the groove with a material with appropriate characteristics. It removes part of the cladding and cores of a thermo-optic switch to form the groove, and fills the groove with a temperature compensation material with a refractive index temperature coefficient different in sign from the temperature coefficient of the effective refractive index of the arm waveguides, thereby reducing the electrical power consumption of the thermo-optic switch. This is called a polymer assisted thermo-optic switch.

Japanese Patent Application Laid-open No. 11-97784 (1999) discloses still another example of removing part of the optical waveguide to form a groove, and of filling the groove with a material with appropriate characteristics. It removes part of the cladding and core of the waveguide between the UV written grating of the frequency-stabilized laser and the semiconductor laser, and fills the groove with a temperature compensation material with a refractive index temperature coefficient different in sign from the temperature coefficient of the refractive index of the semiconductor laser, thereby reducing the mode hopping of the frequency-stabilized laser due to temperature changes.

FIG. 6 is a plan view showing a configuration of a conventional athermal arrayed-waveguide grating; FIG. 7 is a plan view showing a single optical waveguide of FIG. 6; FIG. 8 is an enlarged plan view showing optical waveguides of FIG. 6; FIG. 9A is a cross-sectional view taken along a line IXA—IXA of FIG. 8; and FIG. 9B is a cross-sectional view taken along a line IXB—IXB of FIG. 8.

In FIGS. 6, 7, 8, 9A and 9B, a cladding layer 232 composed of silica-based glass is formed on a silicon substrate 231. In the cladding layer 232, arrayed-waveguides 236 with cores composed of silica-based glass are formed as shown in FIG. 6. In addition, linear waveguides 233 are added to the arrayed-waveguides 236. The arrayed-waveguides 236 are configured such that their lengths are increased by a fixed amount ΔL step by step toward outside.

Furthermore, a groove 237 is formed across the linear waveguides 233 by removing part of the cladding layer 232 and cores from the linear waveguides 233. Thus, focusing attention to the single optical waveguide 241 of the linear waveguides 233 as shown in FIG. 7, the optical waveguide 241 is configured such that it is divided by the groove 242 with a spacing W, and the gap is filled with a temperature compensation material 243.

Next, consider a configuration that has tapered optical waveguides inserted before and after the groove 237 to reduce the diffraction loss by the groove 237 and to increase the spacing between the optical waveguides 23.3 divided by the groove 237. FIG. 10 is a plan view showing a single optical waveguide of FIG. 6; and FIG. 11 is an enlarged plan view showing the optical waveguides of FIG. 6.

In FIG. 10, the optical waveguide 241 has a wide section 241c and narrow sections 241a and 241e. The wide section 241c is smoothly connected to the narrow sections 241a and 241e via tapered sections 241b and 241d, respectively. The groove 242 is formed such that it divides the wide section 241c.

In FIG. 11, the optical waveguides 233 have wide sections 233c and narrow sections 233a and 233e. The wide sections 233c are smoothly connected to the narrow sections 233a and 233e via tapered sections 233b and 233d. The groove 237 is formed such that it divides the wide sections 233c.

In addition, the groove 237 in each linear waveguide 233 is filled with a temperature compensation material 238 as shown in FIG. 9B. In particular, as for the temperature compensation material 238, it is preferable that its refractive index temperature coefficient dn'/dT differ in sign from the effective refractive index temperature coefficient dn/dT of the arrayed-waveguides 236, and that the absolute value |dn'/dT| of its refractive index temperature coefficient be sufficiently greater than the absolute value |dn/dT| of the effective refractive index temperature coefficient of the arrayed-waveguides 236. As an example of such a temperature compensation material 238, there is silicone with a refractive index temperature coefficient dn'/dT of about −40×(dn/dT).

The groove 237 in the linear waveguide 233 is formed such that its width is gradually increased by an amount ΔL' proportional to the fixed amount ΔL which is the incremental length of the arrayed-waveguides 236 as shown in FIG. 11. In addition, the amount ΔL' is designed to satisfy the relationship (ΔL−ΔL')/ΔL'=−(dn'/dT)/(dn/dT) to eliminate the temperature dependence of the transmission wavelength of the arrayed-waveguide grating.

In addition, slab waveguides 235a and 235b are connected to both ends of the arrayed-waveguides 236. Input waveguides 234a are connected to the input side of the slab waveguides 235a, and output waveguides 234b are connected to the output side of the slab waveguides 235b.

FIG. 12 is a plan view showing another configuration of the optical waveguides of FIG. 6, and FIG. 13 is a plan view showing a single optical waveguide of FIG. 12.

In FIGS. 12 and 13, a plurality of grooves 252a–252n are provided across the arrayed-waveguides 251, where n is an integer equal to or greater than two. These grooves 252a–252n are filled with temperature compensation materials 253a–253n. Focusing attention to a single optical waveguide 261 of the arrayed-waveguides 251, it has n grooves 262a–262n with widths $W_1, W_2, \ldots,$ and $W_n$, which are filled with temperature compensation materials 263a–263n as shown in FIG. 13, thereby being divided by spacings $d_1, d_2, \ldots,$ and $d_{n-1}$.

As for a configuration which has tapered optical waveguides inserted before and after the grooves 252a–252n to reduce the diffraction loss in the grooves 252a–252n and to increase the spacings between the optical waveguides 251 divided by the grooves 252a–252n, FIG. 14 is an enlarged plan view showing the optical waveguides of FIG. 6.

In FIG. 14, the optical waveguides 251 have a wide section 251c and narrow sections 251a and 251e, and the wide section 251c is smoothly connected to the narrow sections 251a and 251e via the tapered sections 251b and 251d. The grooves 252a–252n are provided such that they divide the wide section 251c.

In addition, as shown in FIG. 12, the grooves 252a–252n of the arrayed-waveguides 251 are lengthened by an amount ΔL'/n proportional to the fixed amount ΔL in accordance with the lengths of the arrayed-waveguides 251, which are increased by the fixed amount ΔL step by step.

FIG. 15 is a plan view showing a configuration of a conventional polymer assisted thermo-optic switch; and FIG. 16 is a cross-sectional view taken along a line XVI—XVI of FIG. 15.

In FIGS. 15 and 16, a cladding layer 272 composed of silica-based glass is formed on a silicon substrate 271, and arm waveguides 273a and 273b with cores composed of silica-based glass are formed in the cladding layer 272.

In addition, a thin-film heater 274 is formed on the cladding layer 272 in such a manner that the thin-film heater 274 is placed between the arm waveguides 273a and 273b, and is connected to the wiring conductors 275a and 275b.

A groove 276 formed across the arm waveguide 273a by removing part of the cladding layer 272 and core. The groove 276 is filled with a temperature compensation material 277 with a refractive index temperature coefficient different in sign from the temperature coefficient of the effective refractive index of the arm waveguide 273a. As the temperature compensation material 277, silicone can be used, for example. Besides, as shown in FIG. 13, a plurality of grooves can be used instead of the single groove 276.

FIG. 17 is a plan view showing a configuration of a conventional external cavity frequency-stabilized laser whose mode hopping is supressed; FIG. 18A is a cross-sectional view taken along a line XVIIIA—XVIIIA of FIG. 17; and FIG. 18B is a cross-sectional view taken along a line XVIIIB—XVIIIB of FIG. 17. In FIGS. 17, 18A and 18B, a cladding layer 282 composed of silica-based glass is formed on the silicon substrate 281. An optical waveguide 283 with a core composed of silica-based glass is formed in the cladding layer 282, and a UV written grating 284 is formed in the optical waveguide 283.

In addition, a silicon terrace 285 is formed on the silicon substrate 281 by removing the cladding layer 282, and a semiconductor laser 286 is mounted on the silicon terrace 285.

Furthermore, a groove 287 is formed in the optical waveguide 283 by removing part of the cladding layer 282 and core. The groove 287 is filled with a temperature compensation material 288 with a refractive index temperature coefficient different in sign from the temperature coefficient of the effective refractive index of the optical waveguide 283. As the temperature compensation material 288, silicone can be used, for example. Besides, as shown in FIG. 13, a plurality of grooves can be used instead of the single groove 287.

FIG. 19 is a plan view showing a configuration of a conventional crossed optical waveguide. In FIG. 19, optical waveguides 291 and 292 whose cladding and cores are each composed of silica-based glass are placed on a silicon substrate such that they intersect with each other. The intersection angle a of the optical waveguides 291 and 292 can be determined in accordance with the layout of the entire planar lightwave circuit.

FIG. 20 is a plan view showing another configuration of a conventional temperature compensated arrayed-waveguide grating; and FIG. 21 is an enlarged plan view showing the neighborhood of a slab waveguide 303a of FIG. 20.

In FIGS. 20 and 21, arrayed-waveguides 302, slab waveguides 303a and 303b, and input and output waveguides 304a and 304b, the cores and cladding of all of which are composed of silica-based glass, are formed on a silicon substrate 301. The arrayed-waveguides 302 are configured such that their lengths each increase by the fixed amount ΔL toward outside.

In addition, a groove 305 is formed in the slab waveguide 303a in such a manner that the width of the groove 305 increases by an amount ΔL' proportional to the fixed amount ΔL step by step as the groove is crossed by the lines connecting the input waveguide and the arrayed-waveguides 302 as shown in FIG. 21. Furthermore, the groove 305 is filled with a temperature compensation material 306 with the refractive index temperature coefficient different in sign from the temperature coefficient of the effective refractive index of the arrayed-waveguides 302. As the temperature compensation material 306, silicone can be used, for example. In addition, a plurality of grooves can be used instead of the single groove 305.

On the other hand, as for the planar lightwave circuit, S. Suzuki et al., "High-Density Integrated Planar Lightwave Circuits Using $SiO_2$—$GeO_2$ Waveguides with a High Refractive Index Difference" (J. Lightwave Technol., vol. 12, no. 5, pp. 790–796, 1994) discloses a technique that miniaturizes the circuit by reducing the radius of curvature of the optical waveguides by increasing the refractive index contrast of the optical waveguides.

For example, a passive planar lightwave circuit such as the arrayed-waveguide grating or thermo-optic switch described above can reduce its size by using high refractive index contrast optical waveguides.

In addition, a hybrid planar lightwave circuit integrating a semiconductor laser can reduce the coupling loss between the semiconductor laser and silica-based glass waveguide by using a high refractive index contrast optical waveguide.

Today, the total reduction in size and cost of the arrayed-waveguide grating is required. Therefore it is important not only to reduce the size by using the high refractive index contrast optical waveguides, but also to eliminate the temperature control by using the technique for athermalizing the transmission wavelength.

In addition, the reduction in size and electrical power consumption of the thermo-optic switch is also required. Thus, it is important to apply the high refractive index contrast optical waveguides to the polymer assisted thermo-optic switch described above.

As described above, it is necessary for the planar lightwave circuits to form the groove or grooves by removing part of the optical waveguides and to fill the groove or grooves with a material with an appropriate characteristics in order to eliminate the temperature dependence of the transmission wavelength of the arrayed-waveguide grating, or to reduce the electrical power consumption of the thermo-optic switch, or to suppress the mode hopping of the frequency-stabilized laser due to the temperature change.

Thus, the conventional planar lightwave circuits have a problem of increasing the diffraction loss in the groove or grooves formed in the optical waveguides. As a result, the arrayed-waveguide grating and thermo-optic switch have a problem of degrading the loss characteristics, and the frequency-stabilized laser has a problem of increasing the threshold current during oscillation.

Furthermore, the planar lightwave circuits have their optical waveguides intersect with each other to increase flexibility in the circuit layout, and to give new functions by integrating a variety of circuit components on the same substrate.

However, in the intersection of the optical waveguides in the planar lightwave circuits presents, there is a problem of degrading the loss characteristics of the planar lightwave circuits because of the diffraction loss at the intersection.

Moreover, as for the technique using the high refractive index contrast optical waveguides to miniaturize the arrayed-waveguide grating and thermo-optic switch, and to reduce the coupling loss between the semiconductor device and optical waveguide in the frequency-stabilized laser, the diffraction loss in the groove or grooves is greater when using the high refractive index contrast optical waveguides than when using ordinary refractive index contrast optical waveguides. Thus, it offers a problem of degrading the loss characteristics of the arrayed-waveguide grating or thermo-optic switch, and of further increasing the threshold current during the oscillation of the frequency-stabilized laser.

FIG. 22 is a graph illustrating the relationships between the length of the optical waveguide removed by the groove and the diffraction loss. FIG. 22 illustrates a comparison between the diffraction loss in an optical waveguide with the refractive index contrast of 0.75% and the core width×core thickness=6.0 μm×6.0 μm (solid line), and the diffraction loss in the optical waveguide with the refractive index contrast of 1.5% and the core width×core thickness=4.5 μm×4.5 μm (dotted line). It is seen from FIG. 22 that the optical waveguide with the refractive index contrast of 1.5% and the core width×core thickness=4.5 μmμ4.5 μm has the excess loss twice or more in terms of dB.

As for the technique applying the high refractive index contrast optical waveguides to the optical waveguide circuit including the intersection of the optical waveguides, its excess loss at the intersection is greater than that of the circuit using the ordinary refractive index contrast optical waveguides, thereby causing a problem of further degrading the loss characteristics of the planar lightwave circuit.

For example, consider the excess loss when the optical waveguides with the same structure intersect only once at an intersection angle of 45°. In this case, although the excess loss in the optical waveguides with the refractive index contrast of 0.75% and core width×core thickness=6.0 μm×6.0 μm is 0.020 dB, that of the optical waveguides with the refractive index contrast of 1.5% and core width×core thickness=4.5 μm×4.5 μm is 0.035 dB.

As a conventional technique to reduce the diffraction loss in the groove or grooves formed in part of the optical waveguides or the diffraction loss at the intersection of the optical waveguides, there is a method of widening or narrowing the optical waveguides by providing tapered waveguides before and after the groove or intersection as described above. The method, however, has a problem of increase in the size because of the addition of the tapered waveguides. Besides, as for the planar lightwave circuits, an additional fabrication process required for forming the vertically tapered waveguides causes a problem of increase in the fabrication time and cost.

When only the horizontally tapered waveguides are installed to circumvent the foregoing problem, the reduction of the diffraction loss is halved as compared with the case where the tapered waveguides are installed in both the vertical and horizontal directions.

SUMMARY OF THE INVENTION

It is therefore an object of the present invention to provide an optical waveguide circuit capable of reducing the diffraction loss of an optical waveguide including a loss component with little increasing the circuit size and without adding any fabrication process.

To solve the foregoing problems, according to a first aspect of the present invention, there is provided an optical waveguide circuit comprising: an optical waveguide; a first loss component for causing a diffraction loss of light propagating through the optical waveguide; and a second loss component provided at least one of before and after the first loss component, for causing a diffraction loss less than the diffraction loss in the first loss component to the light propagating through the optical waveguide.

Thus using the second loss component can magnify the beam spot size seemingly of the lightwave launched into the first loss component, and reduce the radiation angle (diffraction angle) of the lightwave at the first loss component.

Accordingly, it can reduce the diffraction loss of the lightwave in the first loss component. In addition, it can reduce the excess loss involved in the propagation of the light through the optical waveguide, thereby making it possible to suppress the degradation in the characteristics of the optical waveguide circuit.

The optical waveguide circuit may further comprise a beam spot size varying section for varying a beam spot size of a lightwave launched into the second loss component. Thus, it can magnify the beam spot size of the lightwave launched into the second loss component, which can reduce, in conjunction with the seeming magnification of the beam spot size of the lightwave by using the second loss component, the diffraction loss of the lightwave in the first loss component, thereby being able to reduce the excess loss involved in the propagation of the light through the optical waveguide.

According to a second aspect of the present invention, there is provided an optical waveguide circuit comprising: a first optical waveguide having a first width and first thickness; a second optical waveguide having a second width and second thickness; a tapered section connected between the first optical waveguide and the second optical waveguide, for varying the first width and first thickness to the second width and second thickness; a first loss component for causing a diffraction loss of light propagating through the second optical waveguide; and a second loss component provided at least one of before and after the first loss component, for causing a diffraction loss less than the diffraction loss in the first loss component to the light propagating through the second optical waveguide.

Thus, it can magnify the beam spot size of the lightwave launched into the second loss component, which can reduce, in conjunction with the seeming magnification of the beam spot size of the lightwave by using the second loss component, the diffraction loss of the lightwave in the first loss component, thereby being able to reduce the excess loss involved in the propagation of the light through the optical waveguide.

The optical waveguide circuit may satisfy one of the following conditions: the first width is less than the second width; the first thickness is less than the second thickness; both the first width and first thickness are less than the second width and second thickness; the first width is greater than the second width; the first thickness is greater than the second thickness; both the first width and first thickness are greater than the second width and second thickness. Thus varying the width or thickness of the optical waveguide can vary the beam spot size of the lightwave propagating through the optical waveguide. Accordingly, it is easy to reduce the excess loss involved in the propagation of the light through the optical waveguide even when the optical waveguide is provided with the loss component.

According to a third aspect of the present invention, there is provided an optical waveguide circuit comprising: a first optical waveguide having a first width and first thickness; a second optical waveguide having a second width and second thickness; a third optical waveguide having a third width and third thickness; a first tapered section connected between the first optical waveguide and the second optical waveguide, for varying the first width and first thickness to the second width and second thickness; a second tapered section connected between the second optical waveguide and the third optical waveguide, for varying the second width and second thickness to the third width and third thickness; a first loss component for causing a diffraction loss of light propagating through the second optical waveguide; and a second loss component provided at least one of before and after the first loss component, for causing a diffraction loss less than the diffraction loss in the first loss component to the light propagating through the second optical waveguide.

Thus, it can vary the beam spot size of the lightwave before or after the second loss component, thereby making it possible to incorporate the optical waveguide circuit with a loss component into a variety of planar lightwave circuits with reducing the excess loss involved in the propagation of the light through the loss component.

The optical waveguide circuit may satisfy one of the following conditions: the first width and the third width are less than the second width; the first thickness and the third thickness are less than the second thickness; the first width and the first thickness and the third width and the third thickness are less than the second width and second thickness; the first width and the third width are greater than the second width; the first thickness and the third thickness are greater than the second thickness; the first width and the first thickness and the third width and the third thickness are greater than the second width and the second thickness.

Thus changing the width or thickness of the optical waveguide can vary the beam spot size of the lightwave before or after the second loss component, thereby making it possible to incorporate the optical waveguide circuit with a loss component into a variety of planar lightwave circuits with reducing the excess loss involved in the propagation of the light through the loss component.

The optical waveguide may comprise a cladding and core composed of silica-based glass. Thus, it can form the optical waveguide on the silicon substrate easily, thereby being able to configure a variety of planar lightwave circuits.

The first loss component may be a groove formed by removing part of a cladding and core from the optical waveguide. Thus, it can add a new function to the optical waveguide without changing the geometry and size of the optical waveguide.

The groove may consist of a plurality of grooves disposed at specified spacings. Thus, it can add a plurality of new functions to the optical waveguide.

The groove may be filled with a material different from the core. Thus, it can improve the characteristics of the planar lightwave circuit by filling the groove with the material with appropriate characteristics.

The material filling the groove may have a refractive index temperature coefficient different in sign from a temperature coefficient of an effective refractive index of the optical waveguide. Thus, the groove is filled with the material with the refractive index temperature coefficient different in sign from the effective refractive index of the temperature coefficient of the optical waveguide, thereby being able to eliminate the temperature dependence of the transmission wavelength of the arrayed-waveguide grating, to reduce the electrical power consumption of the thermo-optic switch, or to curb the mode hopping of the frequency-stabilized laser due to the temperature change.

The groove may include an element with a specified function, and the element may be fixed with an adhesive filling the groove. The element may consist of a half wavelength plate, or a wavelength pass filter that transmits only light with a specified wavelength.

The second loss component may consist of a waveguide gap formed by replacing part of a core of the optical waveguide with a cladding. Thus, it can form the loss component in the optical waveguide by removing part of the core. Accordingly, it can reduce the excess loss involved in the propagation of the light through the optical waveguide including the loss component, with preventing the fabrication process from being complicated.

The waveguide gap may consist of a plurality of waveguide gaps disposed at least one of before and after the first loss component with a specified spacing, and the waveguide gaps reduce their width as they are distant from the first loss component. Thus, it can gradually magnify the beam spot size of the lightwave launched into the first loss component, thereby being able to reduce the excess loss involved in the propagation of the light through the first loss component with curbing the excess loss in the waveguide gaps.

The optical waveguide may comprise a plurality of arrayed-waveguides; the groove may be formed across the arrayed-waveguides; and the optical waveguide circuit may further comprise: slab waveguides connected to both ends of the arrayed-waveguides. Thus, it can eliminate the temperature dependence of the transmitted wavelength with curbing the deterioration in the loss characteristics of the arrayed-waveguide grating. In addition, it enables the application of the high refractive index contrast optical waveguide, thereby making it possible to miniaturize the arrayed-waveguide grating.

The optical waveguide may comprise two arm waveguides with different length; the groove may be formed across at least one of the arm waveguides; and the optical waveguide circuit may further comprise directional couplers connected to both ends of the arm waveguides. Thus, it can reduce the electrical power consumption with curbing the deterioration in the loss characteristics of the thermo-optic switch. In addition, it enables the application of the high refractive index contrast optical waveguide, thereby making it possible to miniaturize the thermo-optic switch.

The optical waveguide circuit may further comprise a UV written grating in the optical waveguide; and a semiconductor laser diode mounted at an end of the optical waveguide, and the groove may be formed across the optical waveguide between the UV written grating and the semiconductor laser diode. Thus, it can reduce the mode hopping due to the temperature change, while curbing an increase in the threshold current during the oscillation of the frequency-stabilized laser. In addition, it enables the application of the high refractive index contrast optical waveguide, thereby making it possible to reduce the coupling loss between the semiconductor laser and the silica-based glass waveguide.

The first loss component may consist of an intersection of the optical waveguide and another optical waveguide. Thus, it can increase flexibility in the circuit layout. In addition, it enables a plurality of circuit components to be integrated on the same substrate, thereby being able to provide a new function.

The optical waveguide of the optical waveguide circuit according to the first aspect of the present invention may consist of a slab waveguide. The groove may consist of a plurality of grooves that divide the slab waveguide, and have uneven widths in accordance with positions of dividing the slab waveguide. The waveguide gap may consist of a plurality of waveguide gaps that divide the slab waveguide, and have uneven widths in accordance with positions of dividing the slab waveguide. The optical waveguide circuit may comprise: two slab waveguides consisting of first and second slab waveguides; arrayed-waveguides for interconnecting first ends of the first and second slab waveguides; and input and output waveguides connected to second ends of the first and second slab waveguides, respectively, and the groove may be formed across at least one of the two slab waveguides.

The second loss component may consist of a stripe-like core formed by replacing part of the core of the optical waveguide with the cladding in a stripe-like shape; may consist of a distributed core formed by replacing part of the core of the optical waveguide with the cladding in a dotted shape; or may consist of a groove formed by removing part of the cladding and core from the optical waveguide, and the groove may be filled with air or a material with a specified refractive index.

Alternatively, the second loss component may consist of an intersection of the optical waveguide and another optical waveguide; or may consist of a region having, by laser irradiation of part of the cladding of the optical waveguide, a refractive index higher than a refractive index of a region of the cladding not subjected to the laser irradiation.

The above and other objects, effects, features and advantages of the present invention will become more apparent from the following description of embodiments thereof taken in conjunction with the accompanying drawings.

BRIEF DESCRIPTION OF THE DRAWINGS

FIG. 8 is an enlarged plan view showing optical waveguides of FIG. 6;

FIG. 23A is a plan view showing a configuration of an optical waveguide of a first embodiment in accordance with the present invention, and FIG. 23B is a cross-sectional view taken along a line XXIIIB—XXIIIB of FIG. 23A;

FIG. 26A is a plan view showing a configuration of an optical waveguide of a third embodiment in accordance with the present invention, and FIG. 26B is a cross-sectional view taken along a line XXVIB—XXVIB of FIG. 26A;

FIG. 29A is a plan view showing a configuration of an optical waveguide of a fifth embodiment in accordance with the present invention, and FIG. 29B is a cross-sectional view taken along a line XXIXB—XXIXB of FIG. 29A;

FIG. 30A is a plan view showing a configuration of an optical waveguide of a sixth embodiment in accordance with the present invention, and FIG. 30B is a cross-sectional view taken along a line XXXB—XXXB of FIG. 30A;

DETAILED DESCRIPTION OF PREFERRED EMBODIMENTS

The optical waveguide circuits of the embodiments in accordance with the present invention will now be described with reference to the accompanying drawings.

First Embodiment

Figure 24A:
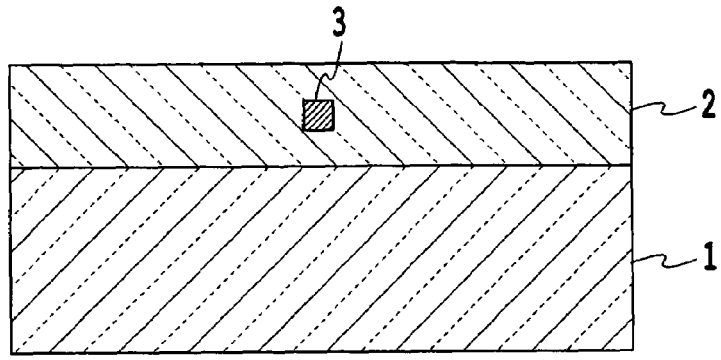
FIG. 24A is a cross-sectional view taken along a line XXIVA—XXIVA of FIG. 23A.
Figure 24B:
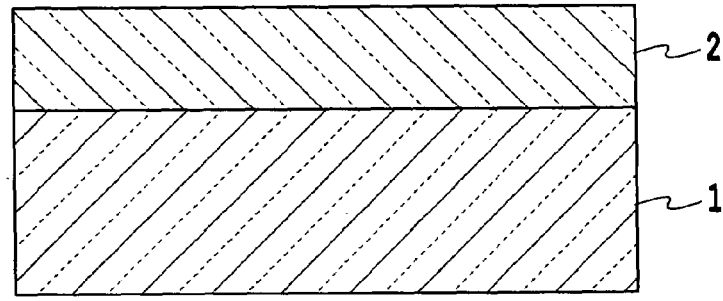
FIG. 24B is a cross-sectional view taken along a line XXIVB—XXIVB of FIG. 23A.
Figure 24C:
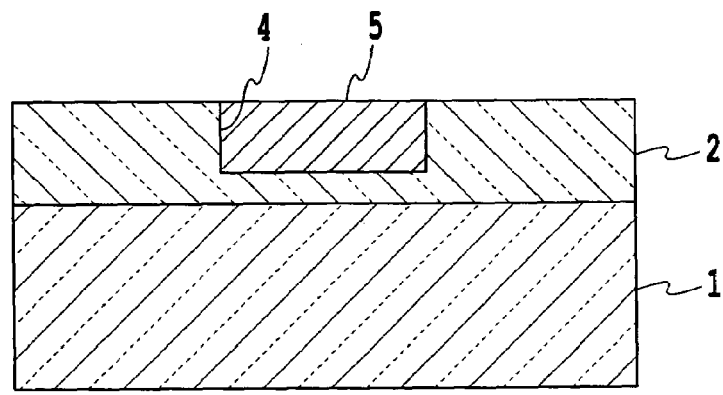
FIG. 24C is a cross-sectional view taken along a line XXIVC—XXIVC of FIG. 23A.

FIG. 23A is a plan view showing a configuration of an optical waveguide of a first embodiment in accordance with the present invention; FIG. 23B is a cross-sectional view taken along a line XXIIIB—XXIIIB of FIG. 23A; FIG. 24A is a cross-sectional view taken along a line XXIVA—XXIVA of FIG. 23A; FIG. 24B is a cross-sectional view taken along a line XXIVB—XXIVB of FIG. 23A; and FIG. 24C is a cross-sectional view taken along a line XXIVC—XXIVC of FIG. 23A. The first embodiment is characterized by using a temperature compensation material 5 that fills a groove 4 as a first loss component, and by providing a waveguide gap 6 before the groove 4 as a second loss component.

In FIGS. 23A and 23B and FIGS. 24A–24C, a cladding layer 2 composed of silica-based glass is formed on a silicon substrate 1. In the cladding layer 2, an optical waveguide 3 with a core composed of silica-based glass is formed as shown in FIG. 24A.

In addition, a groove 4 with a width $W_{groove1}$ is formed across the optical waveguide 3 by removing part of the cladding layer 2 and core from the optical waveguide 3 as shown in FIG. 24C.

The groove 4 is filled with a temperature compensation material 5 as shown in FIG. 24C. In particular, as for the temperature compensation material 5, it is preferable that its refractive index temperature coefficient dn'/dT differ in sign from the effective refractive index temperature coefficient dn/dT of the optical waveguide 3, and that the absolute value |dn'/dT| of its refractive index temperature coefficient be sufficiently greater than the absolute value |dn/dT| of the effective refractive index temperature coefficient of the optical waveguide 3. As an example of such a temperature compensation material 5, there is silicone with a refractive index temperature coefficient dn'/dT of about −40×(dn/dT).

The optical waveguide 3 includes a waveguide gap 6 with a width $W_{gap1}$, which is placed before the groove 4 with a spacing $d_{gap1}$. The waveguide gap 6 is formed by replacing part of the core of the optical waveguide 3 by the cladding layer 2 without adding any fabrication process. The width $W_{gap1}$ of the waveguide gap 6 can be determined such that the diffraction loss in the waveguide gap 6 becomes smaller than the diffraction loss in the groove 4 filled with the temperature compensation material 5. In addition, the spacing $d_{gap1}$ between the groove 4 and the waveguide gap 6 can be determined at such a distance that the lightwave passing through the waveguide gap 6 can reach the groove 4 before the leakage of the lightwave at the waveguide gap 6 completely turns to radiation.

For example, it is possible to set the refractive index contrast of the optical waveguide 3 at 1.5%, the core width×core thickness at 4.5 μm×4.5 μm, the width $W_{groove1}$ of the groove 4 at 130 μm, the width $W_{gap1}$ of the waveguide gap 6 at 20 μm, and the spacing $d_{gap1}$ between the groove 4 and the waveguide gap 6 at 20 μm. Thus, the light propagating through the optical waveguide 3 passes through the waveguide gap 6 with the diffraction loss, proceeds through the groove 4 filled with the temperature compensation material 5, and propagates through the optical waveguide 3, again.

The groove 4 produces the diffraction loss when the light propagating through the optical waveguide 3 passes through the groove 4. To reduce the diffraction loss at the groove 4, the radiation angle of the lightwave at the groove 4 must be reduced, and to reduce the radiation angle of the lightwave, increasing the beam spot size of the lightwave is effective.

On the other hand, the leakage of the propagating lightwave at the loss component such as the waveguide gap 6 does not radiate completely immediately after passing through the waveguide gap 6, but gradually radiates while proceeding through the neighborhood of the optical waveguide 3 for some time. Accordingly, immediately after passing through the waveguide gap 6, the lightwave propagating through the optical waveguide 3 is mixed with the leaked lightwave proceeding through the neighborhood of the optical waveguide 3 before turning to complete radiation, thereby bringing about a condition in which the beam spot size of the lightwave propagating through the optical waveguide 3 is magnified seemingly. In addition, the diffraction loss at the waveguide gap 6 leaks to both the horizontal and vertical directions.

Thus, the beam spot size of the lightwave launched into the groove 4 can be seemingly magnified to both the horizontal and vertical directions by providing the waveguide gap 6 before the groove 4, which can reduce the excess loss involved in the propagation of the lightwave through the optical waveguide 3 including the loss component.

Figure 1:
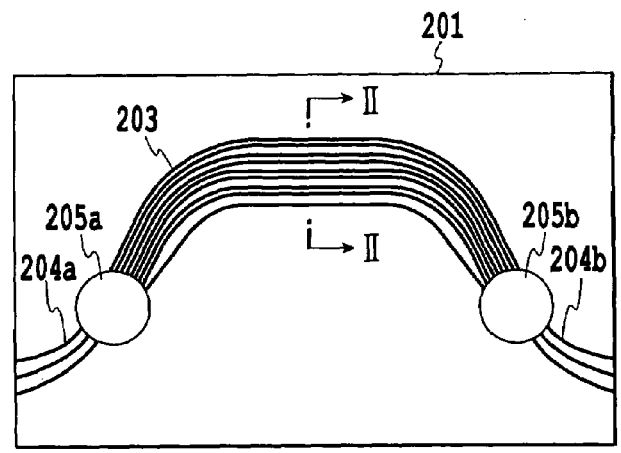
FIG. 1 is a plan view showing a configuration of a conventional arrayed-waveguide grating.
Figure 2:
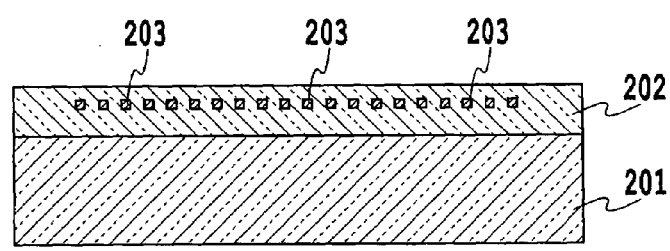
FIG. 2 is a cross-sectional view taken along a line II—II of FIG. 1.
Figure 3:
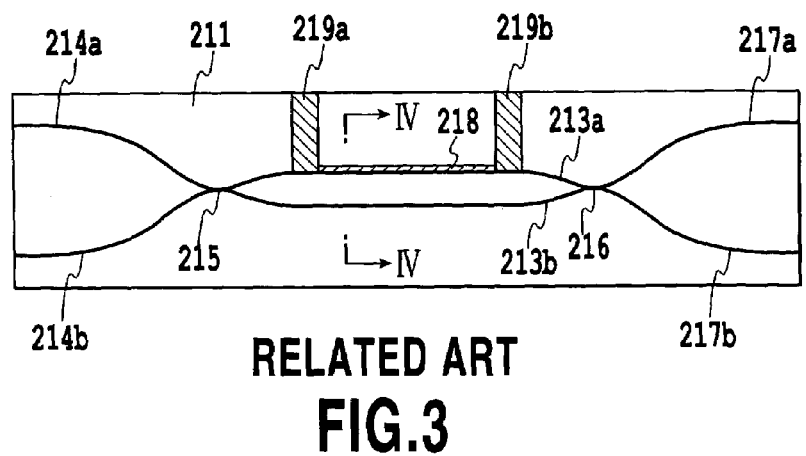
FIG. 3 is a plan view showing a configuration of a conventional thermo-optic switch.
Figure 4:
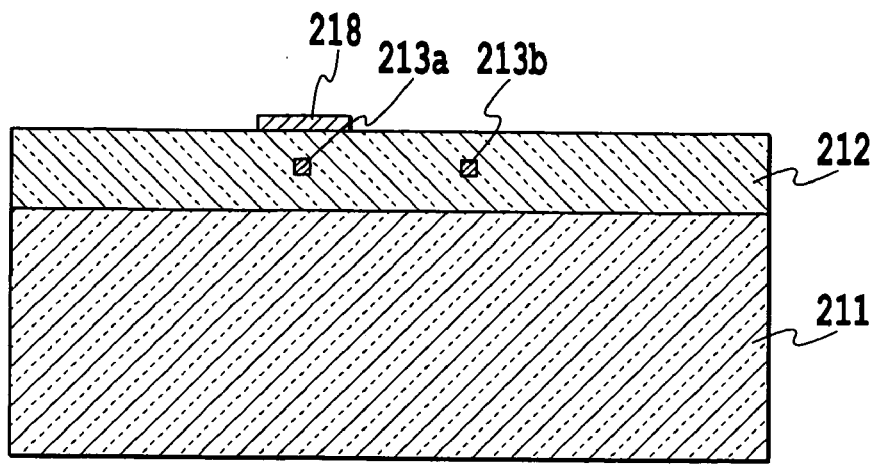
FIG. 4 is a cross-sectional view taken along a line IV—IV of FIG. 3.
Figure 5:
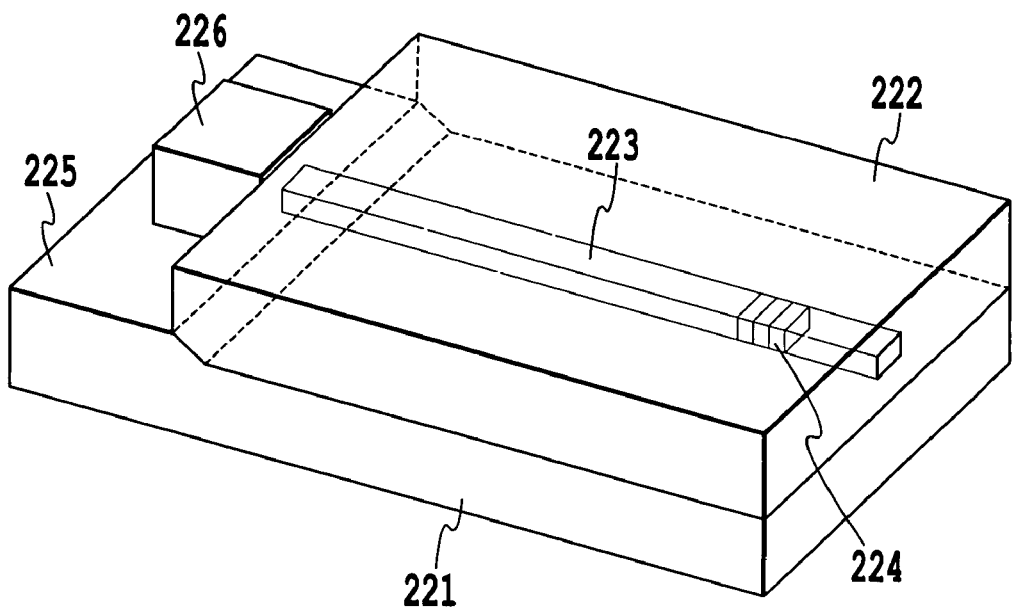
FIG. 5 is a perspective view showing a configuration of a conventional external cavity frequency-stabilized laser.
Figure 6:
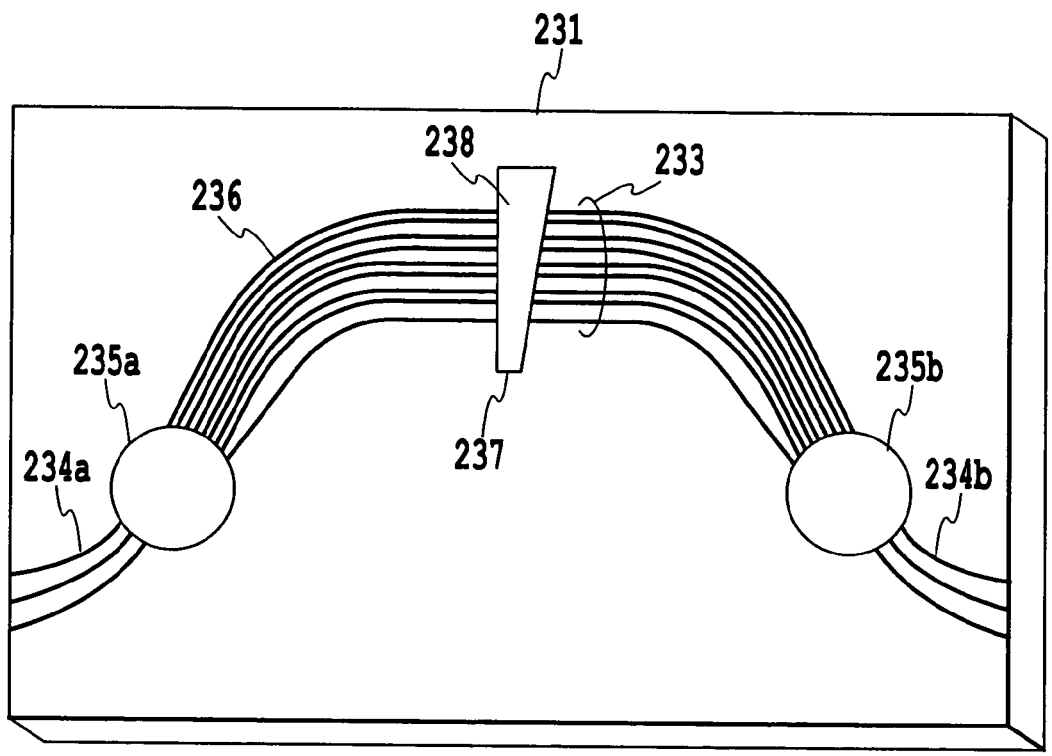
FIG. 6 is a plan view showing a configuration of a conventional athermal arrayed-waveguide grating.
Figure 7:
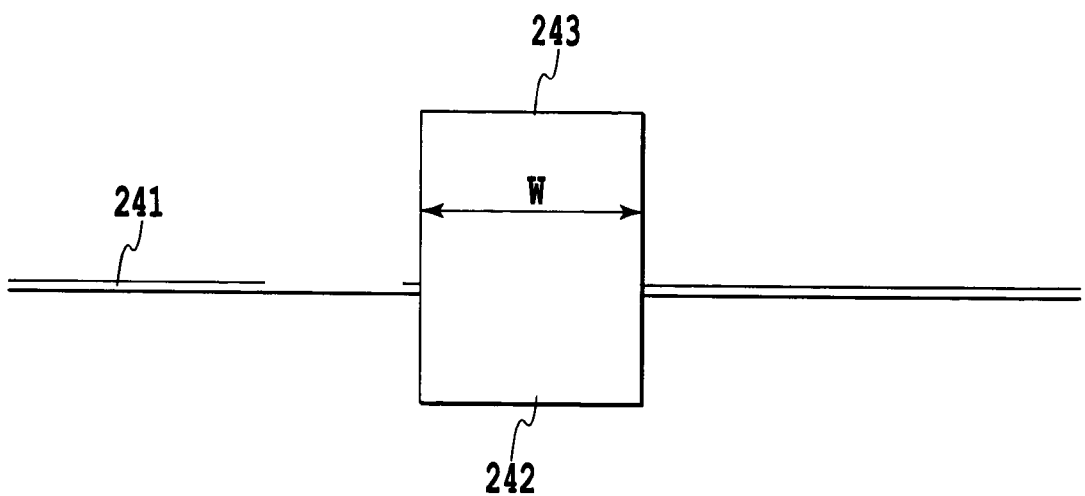
FIG. 7 is a plan view showing a single optical waveguide of FIG. 6.
Figure 9A:
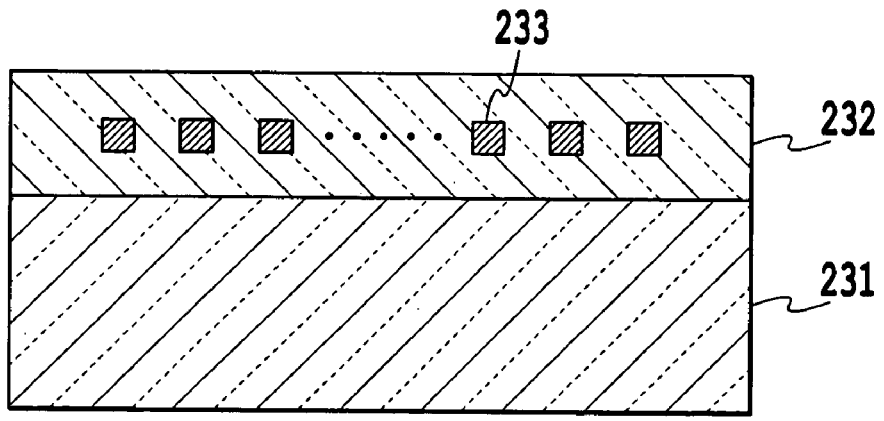
FIG. 9A is a cross-sectional view taken along a line IXA—IXA of FIG. 8.
Figure 9B:
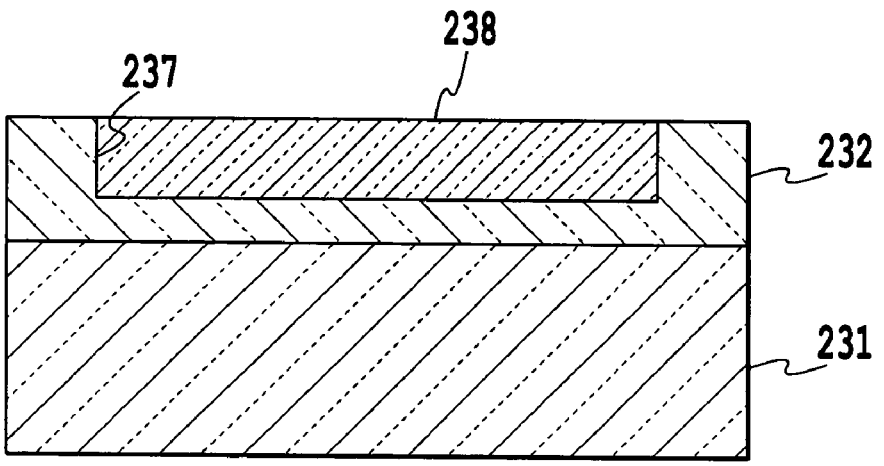
FIG. 9B is a cross-sectional view taken along a line IXB—IXB of FIG. 8.
Figure 10:
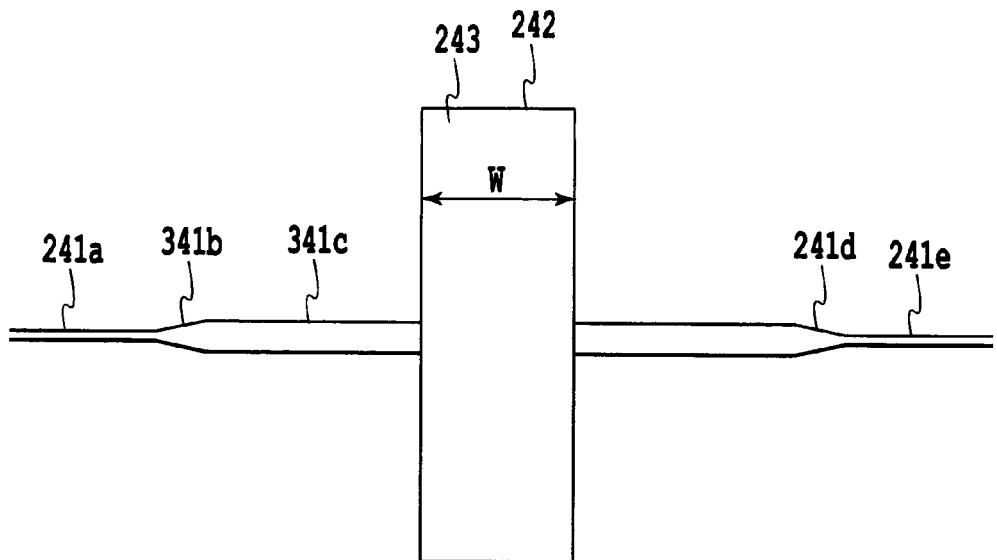
FIG. 10 is a plan view showing a single optical waveguide of FIG. 6.
Figure 11:
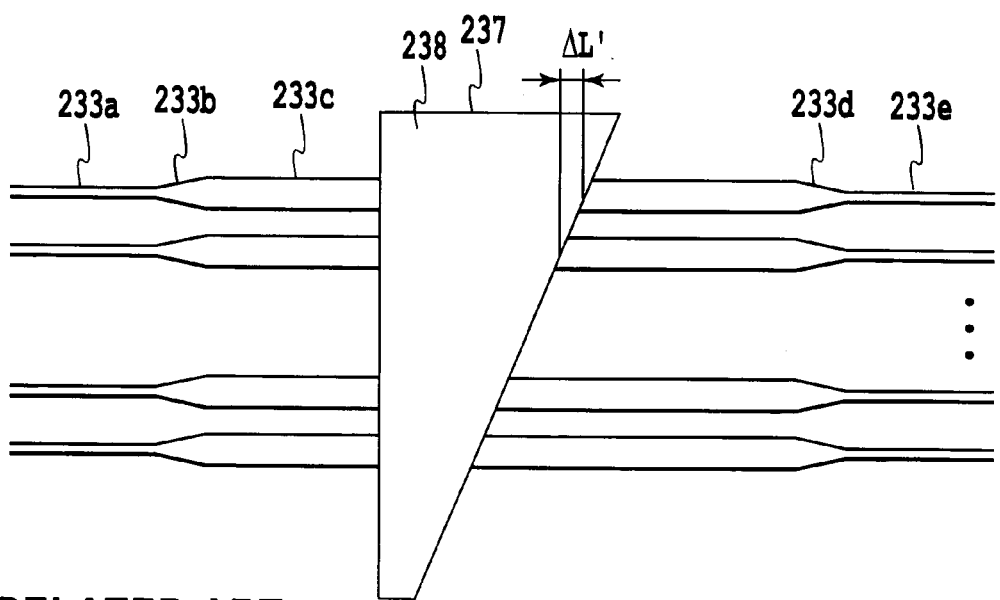
FIG. 11 is an enlarged plan view showing the optical waveguides of FIG. 6.

For example, although the excess loss of the optical waveguide 241 including the groove 242 of FIG. 7 is 8.9 dB, the total excess loss of the optical waveguide 1 including the groove 4 and waveguide gap 6 of FIGS. 23A and 23B is 7.7 dB, which means that it can reduce the excess loss by 1.2 dB as compared with the configuration of FIG. 7.

Second Embodiment

Figure 25A:
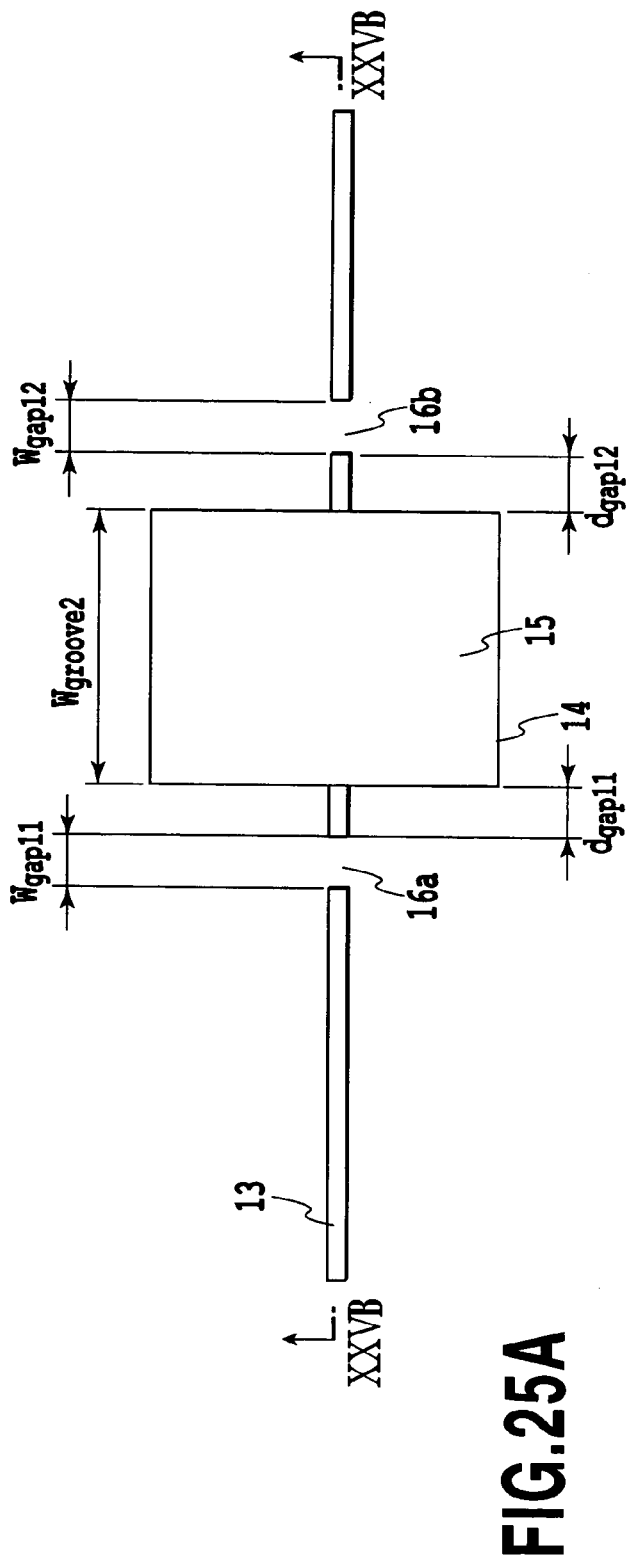
FIG. 25A is a plan view showing a configuration of an optical waveguide of a second embodiment in accordance with the present invention.
Figure 25B:
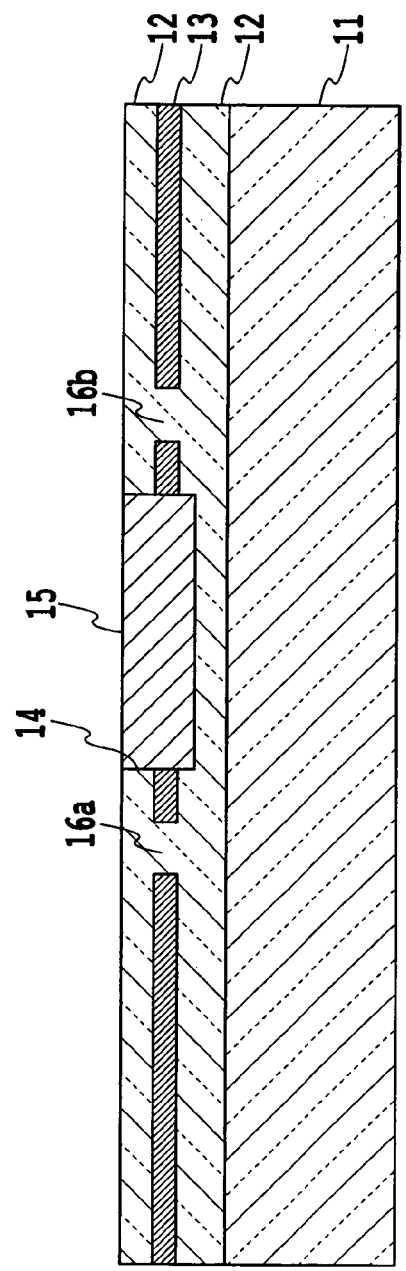
FIG. 25B is a cross-sectional view taken along a line XXVB—XXVB of FIG. 25A.

FIG. 25A is a plan view showing a configuration of an optical waveguide of a second embodiment in accordance with the present invention; and FIG. 25B is a cross-sectional view taken along a line XXVB—XXVB of FIG. 25A. The second embodiment is characterized by using a temperature compensation material 15 that fills a groove 14 as a first loss component, and by providing waveguide gaps 16a and 16b before and after the groove 14 as a second loss component.

In FIGS. 25A and 25B, a cladding layer 12 composed of silica-based glass is formed on a silicon substrate 11. In the cladding layer 12, an optical waveguide 13 with a core composed of silica-based glass is formed.

In addition, the groove 14 with a width $W_{groove2}$ is formed across the optical waveguide 13 by removing part of the cladding layer 12 and core from the optical waveguide 13.

Furthermore, the groove 14 is filled with a temperature compensation material 15 with a refractive index temperature coefficient different in sign from the temperature coefficient of the effective refractive index of the optical waveguide 13.

The optical waveguide 13 includes a waveguide gap 16a with a width $W_{gap11}$, which is placed before the groove 14 with a spacing $d_{gap11}$, and a waveguide gap 16b with a width $W_{gap12}$, which is placed after the groove 14 with a spacing $d_{gap12}$. The waveguide gaps 16a and 16b are each formed by replacing part of the core of the optical waveguide 13 by the cladding layer 12 without adding any fabrication process.

The widths $W_{gap11}$ and $W_{gap12}$ of the waveguide gaps 16a and 16b can be determined such that the total diffraction loss in the waveguide gaps 16a and 16b becomes smaller than the diffraction loss in the groove 14 filled with the temperature compensation material 15. On the other hand, the spacing $d_{gap11}$ between the groove 14 and the waveguide gap 16a can be determined at such a distance that the lightwave passing through the waveguide gap 16a can reach the groove 14 before the leakage of the lightwave at the waveguide gap 16a completely turns to radiation. Furthermore, the spacing $d_{gap12}$ between the groove 14 and the waveguide gap 16b can be determined at such a distance that the lightwave passing through the groove 14 can reach the waveguide gap 16b before the leakage of the lightwave completely turns to radiation.

For example, it is possible to set the refractive index contrast of the optical waveguide 13 at 1.5%, the core width×core thickness at 4.5 μm×4.5 μm, the width $W_{groove2}$ of the groove 14 at 130 μm, the width $W_{gap11}$ of the waveguide gap 16a at 20 μm, the spacing $d_{gap11}$ between the groove 14 and the waveguide gap 16a at 20 μm, the width $W_{gap12}$ of the waveguide gap 16b at 20 μm, and the spacing $d_{gap12}$ between the groove 14 and the waveguide gap 16b at 20 μm. As the temperature compensation material 15, silicone can be used.

Thus, the light propagating through the optical waveguide 13 passes through the waveguide gap 16a with the diffraction loss, proceeds through the groove 14 filled with the temperature compensation material 15, passes through the waveguide gap 16b, and propagates through the optical waveguide 13, again.

Thus, the beam spot size of the lightwave launched into the groove 14 can be seemingly magnified to both the horizontal and vertical directions by providing the waveguide gap 16a before the groove 14, and the beam spot size of the lightwave output from the groove 14 can be seemingly reduced to both the horizontal and vertical directions by providing the waveguide gap 16b after the groove 14 according to the time reversal invariance of lightwave. This makes it possible to reduce the excess loss involved in the propagation of the lightwave through the optical waveguide 13 including the loss components.

For example, although the excess loss of the optical waveguide 241 including the groove 242 of FIG. 7 is 8.9 dB, the total excess loss of the optical waveguide 13 including the groove 14 and waveguide gaps 16a and 16b of FIGS. 25A and 25B is 6.5 dB, which means that it can reduce the excess loss by 2.4 dB as compared with the configuration of FIG. 7.

Third Embodiment

FIG. 26A is a plan view showing a configuration of an optical waveguide of a third embodiment in accordance with the present invention; and FIG. 26B is a cross-sectional view taken along a line XXVIB—XXVIB of FIG. 26A. The third embodiment is characterized by using a temperature compensation material 25 that fills a groove 24 as a first loss component, and by providing a plurality of waveguide gaps 26a–26c and 26d–26f before and after the groove 24 as a second loss component.

In FIGS. 26A and 26B, a cladding layer 22 composed of silica-based glass is formed on a silicon substrate 21. In the cladding layer 22, an optical waveguide 23 with a core composed of silica-based glass is formed.

In addition, the groove 24 with a width $W_{groove3}$ is formed across the optical waveguide 23 by removing part of the cladding layer 22 and core from the optical waveguide 23.

The groove 24 is filled with a temperature compensation material 25 with a refractive index temperature coefficient different in sign from the temperature coefficient of the effective refractive index of the optical waveguide 23. The optical waveguide 23 includes a waveguide gap 26a with a width $W_{gap21}$, which is placed before the groove 24 with a spacing $d_{gap21}$. Besides, a waveguide gap 26b with a width $W_{gap22}$ is provided before the waveguide gap 26a with a spacing $d_{gap22}$, and a waveguide gap 26c with a width $W_{gap23}$ is provided before the waveguide gap 26b with a spacing $d_{gap23}$. Likewise, a waveguide gap 26d with a width $W_{gap24}$ is provided after the groove 24 with a spacing $d_{gap24}$ followed by a waveguide gap 26e with a width $W_{gap25}$ provided after the waveguide gap 26d with a spacing $d_{gap25}$, and a waveguide gap 26f with a width $W_{gap26}$ provided after the waveguide gap 26e with a spacing $d_{gap26}$. The waveguide gaps 26a–26f are each formed by replacing part of the core of the optical waveguide 23 by the cladding layer 22 without adding any fabrication process.

The widths $W_{gap21}$–$W_{gap26}$ of the waveguide gaps 26a–26f can be determined such that the total diffraction loss in the waveguide gaps 26a–26f becomes smaller than the diffraction loss in the groove 24 filled with the temperature compensation material 25. In addition, it is preferable that the widths $W_{gap21}$–$W_{gap26}$ be narrowed as the gaps are distant from the groove 24.

On the other hand, the spacing $d_{gap21}$ between the groove 24 and the waveguide gap 26a can be determined at such a distance that the lightwave passing through the waveguide gap 26a can reach the groove 24 before the leakage of the lightwave completely turns to radiation. Furthermore, the spacing $d_{gap22}$ between the waveguide gaps 26a and 26b can be determined at such a distance that the lightwave passing through the waveguide gap 26b can reach the waveguide gap 26a before the leakage of the lightwave completely turns to radiation. Likewise, the spacing $d_{gap23}$ between the waveguide gaps 26b and 26c can be determined at such a distance that the lightwave passing through the waveguide gap 26c can reach the waveguide gap 26b before the leakage of the lightwave completely turns to radiation.

Furthermore, the spacing $d_{gap24}$ between the groove 24 and the waveguide gap 26d can be determined at such a distance that the lightwave passing through the groove 24 can reach the waveguide gap 26d before the leakage of the lightwave completely turns to radiation. In addition, the spacing $d_{gap25}$ between the waveguide gaps 26d and 26e can be determined at such a distance that the lightwave passing through the waveguide gap 26d can reach the waveguide gap 26e before the leakage of the lightwave completely turns to radiation. Likewise, the spacing $d_{gap26}$ between the waveguide gaps 26e and 26f can be determined at such a distance that the lightwave passing through the waveguide gap 26e can reach the waveguide gap 26f before the leakage of the lightwave completely turns to radiation.

For example, it is possible to set the refractive index contrast of the optical waveguide 23 at 1.5%, the core width×core thickness at 4.5 μm×4.5 μm, the width $W_{groove3}$ of the groove 24 at 130 μm, the width $W_{gap21}$ of the waveguide gap 26a at 20 μm, the spacing $d_{gap21}$ between the groove 24 and the waveguide gap 26a at 20 μm, the width $W_{gap22}$ of the waveguide gap 26b at 10 μm, the spacing $d_{gap22}$ between the waveguide gaps 26a and 26b at 20 μm, the width $W_{gap23}$ of the waveguide gap 26c at 5 µm, the spacing $d_{gap23}$ between the waveguide gaps 26b and 26c at 20 µm, the width $W_{gap24}$ of the waveguide gap 26d at 20 µm, the spacing $d_{gap24}$ between the groove 24 and the waveguide gap 26d at 20 µm, the width $W_{gap25}$ of the waveguide gap 26e at 10 µm, the spacing $d_{gap25}$ between the waveguide gaps 26d and 26e at 20 µm, the width $W_{gap26}$ of the waveguide gap 26f at 5 µm, and the spacing $d_{gap26}$ between the waveguide gaps 26e and 26f at 20 µm. As the temperature compensation material 25, silicone can be used.

The light propagating through the optical waveguide 23 passes through the waveguide gaps 26a–26c with the diffraction loss, proceeds through the groove 24 filled with the temperature compensation material 25, passes through the waveguide gaps 26d–26f, and propagates through the optical waveguide 23, again.

Thus, the magnification amount of the beam spot size of the lightwave launched into the groove 24 can be increased seemingly by providing the plurality of waveguide gaps 26a–26c before the groove 24, and the magnified beam spot size of the lightwave output from the groove 24 can be effectively reduced by providing the plurality of waveguide gaps 26d–26f after the groove 24. This makes it possible to further reduce the excess loss involved in the propagation of the lightwave through the optical waveguide 23 including the loss components.

For example, although the excess loss of the optical waveguide 241 including the groove 242 of FIG. 7 is 8.9 dB, the total excess loss of the optical waveguide 23 including the groove 24 and the plurality of waveguide gaps 26a–26f of FIGS. 26A and 26B is 5.6 dB, which means that it can reduce the excess loss by 3.6 dB as compared with the configuration of FIG. 7.

Fourth Embodiment

Figures 27A, 27B:
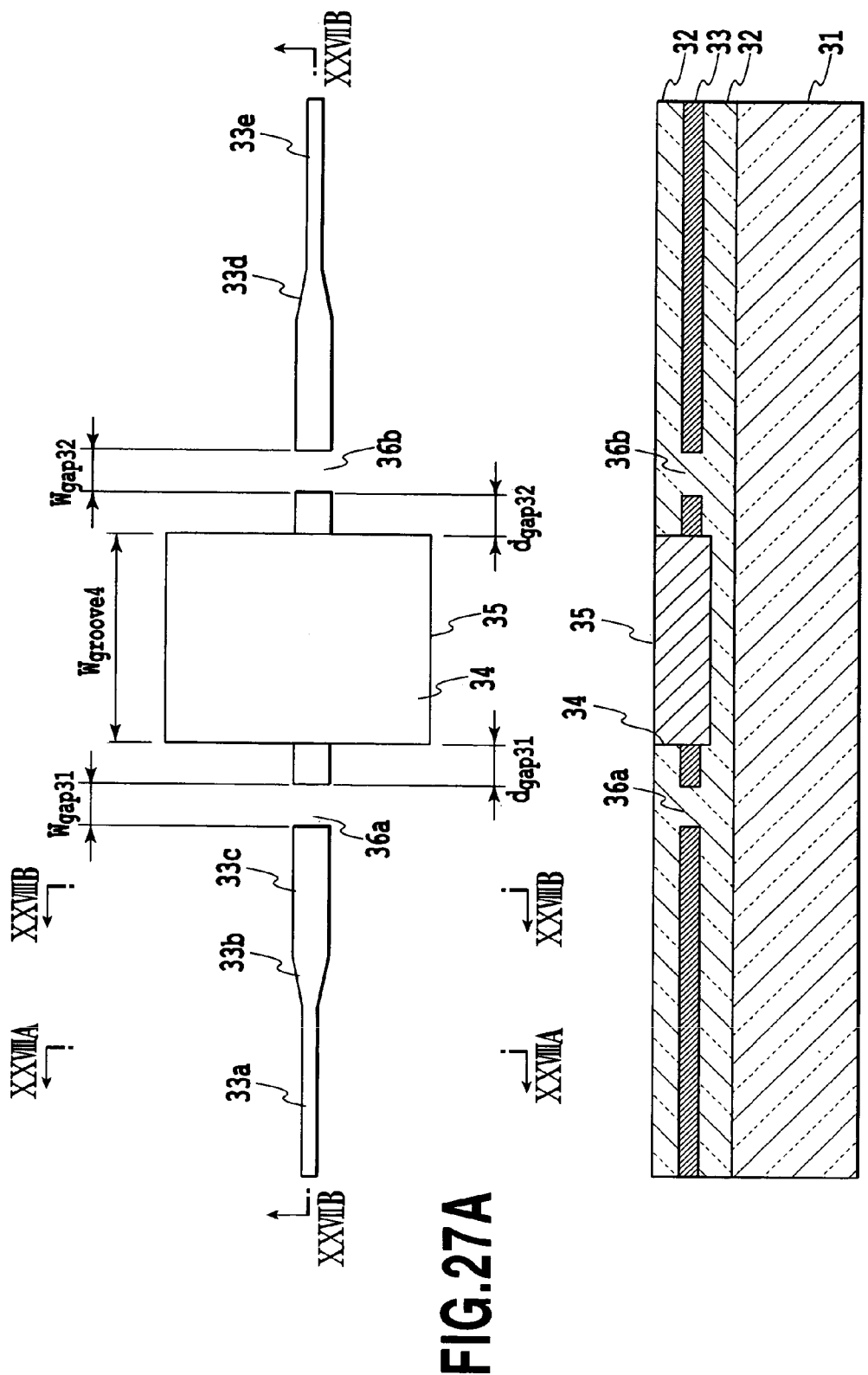
FIG. 27A is a plan view showing a configuration of an optical waveguide of a fourth embodiment in accordance with the present invention.
FIG. 27B is a cross-sectional view taken along a line XXVIIB—XXVIIB of FIG. 27A.
Figure 28A:
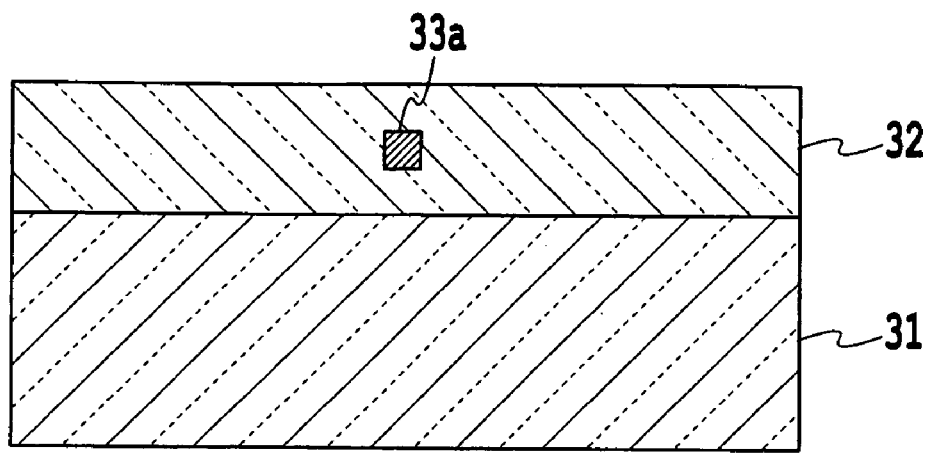
FIG. 28A is a cross-sectional view taken along a line XXVIIIA—XXVIIIA of FIG. 27A.
Figure 28B:
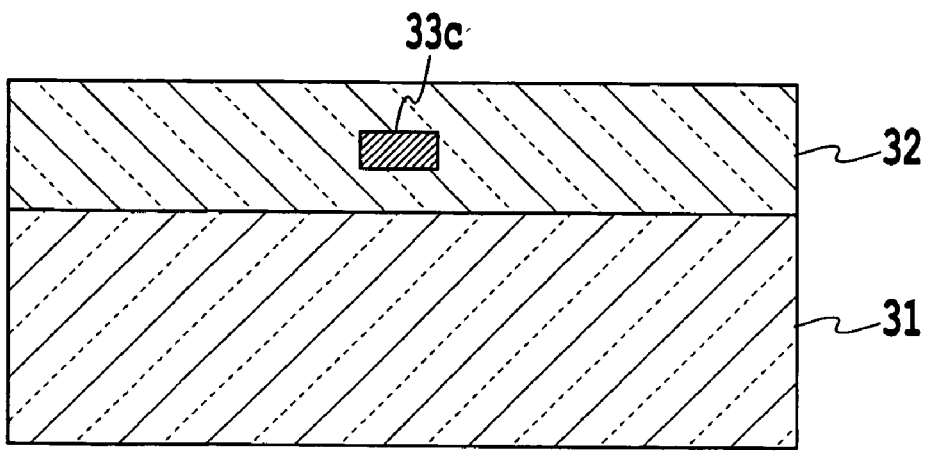
FIG. 28B is a cross-sectional view taken along a line XXVIIIB—XXVIIIB of FIG. 27A.

FIG. 27A is a plan view showing a configuration of an optical waveguide of a fourth embodiment in accordance with the present invention; FIG. 27B is a cross-sectional view taken along a line XXVIIB—XXVIIB of FIG. 27A; FIG. 28A is a cross-sectional view taken along a line XXVIIIA—XXVIIIA of FIG. 27A; and FIG. 28B is a cross-sectional view taken along a line XXVIIIB—XXVIIIB of FIG. 27A. The fourth embodiment is characterized by using a temperature compensation material 35 that fills a groove 34 as a first loss component, by providing waveguide gaps 36a and 36b before and after the groove 34 as a second loss component, and by increasing the width of the optical waveguide 33 divided by the groove 34 and the waveguide gaps 36a and 36b.

In FIGS. 27A and 27B and FIGS. 28A and 28B, a cladding layer 32 composed of silica-based glass is formed on a silicon substrate 31. In the cladding layer 32, an optical waveguide 33 with a core composed of silica-based glass is formed. The optical waveguide 33 includes a wide section 33c and narrow sections 33a and 33e. The wide section 33c is connected to the narrow sections 33a and 33e smoothly via tapered sections 33b and 33d.

In addition, the groove 34 with a width $W_{groove4}$ is formed across the wide section 33c of the optical waveguide 33 by removing part of the cladding layer 32 and core from the optical waveguide 33.

The groove 34 is filled with a temperature compensation material 35 with a refractive index temperature coefficient different in sign from the temperature coefficient of the effective refractive index of the optical waveguide 33.

The wide section 33c of the optical waveguide 33 includes a waveguide gap 36a with a width $W_{gap31}$, which is placed before the groove 34 with a spacing $d_{gap31}$, and a waveguide gap 36b with a width $W_{gap32}$, which is placed after the groove 34 with a spacing $d_{gap32}$. The waveguide gaps 36a and 36b are each formed by replacing part of the core of the optical waveguide 33 by the cladding layer 32 without adding any fabrication process.

The widths $W_{gap31}$ and $W_{gap32}$ of the waveguide gaps 36a and 36b can be determined such that the total diffraction loss in the waveguide gaps 36a and 36b becomes smaller than the diffraction loss in the groove 34 filled with the temperature compensation material 35. On the other hand, the spacing $d_{gap31}$ between the groove 34 and the waveguide gap 36a can be determined at such a distance that the lightwave passing through the waveguide gap 36a can reach the groove 34 before the leakage of the lightwave completely turns to radiation. Furthermore, the spacing $d_{gap32}$ between the groove 34 and the waveguide gap 36b can be determined at such a distance that the lightwave passing through the groove 34 can reach the waveguide gap 36b before the leakage of the lightwave completely turns to radiation.

For example, it is possible to set the refractive index contrast of the optical waveguide 33 at 1.5%, the core width×core thickness of the narrow sections 33a and 33e at 4.5 µm×4.5 µm, the core width×core thickness of the wide section 33c at 9.0 µm×4.5 µm, the width $W_{groove4}$ of the groove 34 at 130 µm, the width $W_{gap31}$ of the waveguide gap 36a at 20 µm, the spacing $d_{gap31}$ between the groove 34 and the waveguide gap 36a at 20 µm, the width $W_{gap32}$ of the waveguide gap 36b at 20 µm, and the spacing $d_{gap32}$ between the groove 34 and the waveguide gap 36b at 20 µm. As the temperature compensation material 35, silicone can be used.

The light propagating through the optical waveguide 33 passes through the waveguide gap 36a with the diffraction loss, after its beam spot size is widened when it is launched from the narrow section 33a to the wide section 33c. Then, the light proceeds through the groove 34 filled with the temperature compensation material 35, and propagates through the optical waveguide 33 with its beam spot size being narrowed when it is launched from the wide section 33c to the narrow section 33a.

Thus, the widened beam spot size of the lightwave launched into the groove 34 can be further magnified seemingly to both the horizontal and vertical directions by providing the waveguide gap 36a before the groove 34, and the magnified beam spot size of the lightwave output from the groove 34 can be reduced seemingly to both the horizontal and vertical directions by providing the waveguide gap 36b after the groove 34, which can further reduce the excess loss involved in the propagation of the lightwave through the optical waveguide 13 including the loss components.

For example, although the excess loss of the optical waveguide 241 including the groove 242 of FIG. 7 is 8.9 dB, the total excess loss is 5.0 dB of the optical waveguide 33 including the wide section 33c in addition to the groove 34 and waveguide gaps 36a and 36b of FIGS. 27A and 27B, which means that it can reduce the excess loss by 3.9 dB as compared with the configuration of FIG. 7.

Fifth Embodiment

FIG. 29A is a plan view showing a configuration of an optical waveguide of a fifth embodiment in accordance with the present invention; and FIG. 29B is a cross-sectional view taken along a line XXIXB—XXIXB of FIG. 29A. The fifth embodiment is characterized by using temperature compensation materials 45a–45d that fill a plurality of grooves 44a–44d as a first loss component, and by providing waveguide gaps 46a and 46b before and after the grooves 44a–44d as a second loss component.

In FIGS. 29A and 29B, a cladding layer 42 composed of silica-based glass is formed on a silicon substrate 41. In the cladding layer 42, an optical waveguide 43 with a core composed of silica-based glass is formed.

In addition, the plurality of grooves 44a–44d with the widths $W_{groove41}$–$W_{groove44}$ are formed across the optical waveguide 43 with interposing spacings $d_{groove41}$–$d_{groove43}$ between the grooves by removing part of the cladding layer 42 and core from the optical waveguide 43.

Furthermore, the grooves 44a–44d are filled with the temperature compensation materials 45a–45d with a refractive index temperature coefficient different in sign from the temperature coefficient of the effective refractive index of the optical waveguide 43.

The optical waveguide 43 includes a waveguide gap 46a with a width $W_{gap41}$, which is placed before the groove 44a with a spacing $d_{gap41}$, and a waveguide gap 46b with a width $W_{gap42}$, which is placed after the groove 44d with a spacing $d_{gap42}$. The waveguide gaps 46a and 46b are each formed by replacing part of the core of the optical waveguide 43 by the cladding layer 42 without adding any fabrication process.

The widths $W_{gap41}$ and $W_{gap42}$ of the waveguide gaps 46a and 46b can be determined such that the total diffraction loss in the waveguide gaps 46a and 46b becomes smaller than the total diffraction loss in the grooves 44a–44d filled with the temperature compensation materials 45a–45d. In addition, the spacing $d_{gap41}$ between the groove 44a and the waveguide gap 46a can be determined at such a distance that the lightwave passing through the waveguide gap 46a can reach the groove 44a before the leakage of the lightwave completely turns to radiation. Furthermore, the spacing $d_{gap42}$ between the groove 44d and the waveguide gap 46b can be determined at such a distance that the lightwave passing through the groove 44d can reach the waveguide gap 46b before the leakage of the lightwave completely turns to complete radiation.

For example, it is possible to set the refractive index contrast of the optical waveguide 43 at 1.5%, the core width×core thickness at 4.5 µm×4.5 µm, the widths $W_{groove41}$–$W_{groove44}$ of the grooves 44a–44d at 40 µm each, the spacings $d_{groove41}$–$d_{groove43}$ between the grooves 44a–44d at 20 µm each, the width $W_{gap41}$ of the waveguide gap 46a at 20 µm, the spacing $d_{gap41}$ between the groove 44a and the waveguide gap 46a at 20 µm, the width $W_{gap42}$ of the waveguide gap 46b at 20 µm, and the spacing $d_{gap42}$ between the groove 44d and the waveguide gap 46b at 20 µm. As the temperature compensation materials 45a–45d, silicone can be used.

The light propagating through the optical waveguide 43 passes through the waveguide gap 46a with the diffraction loss, proceeds through the grooves 44a–44d filled with the temperature compensation materials 45a–45d, passes through the waveguide gap 46b, and propagates through the optical waveguide 43, again.

Thus, the beam spot size of the lightwave launched into the grooves 44a–44d can be magnified seemingly to both the horizontal and vertical directions, and the beam spot size of the lightwave output from the grooves 44a–44d can be reduced seemingly to both the horizontal and vertical directions. This makes it possible to further reduce the excess loss involved in the propagation of the lightwave through the optical waveguide 43 including the loss components.

Figure 13:
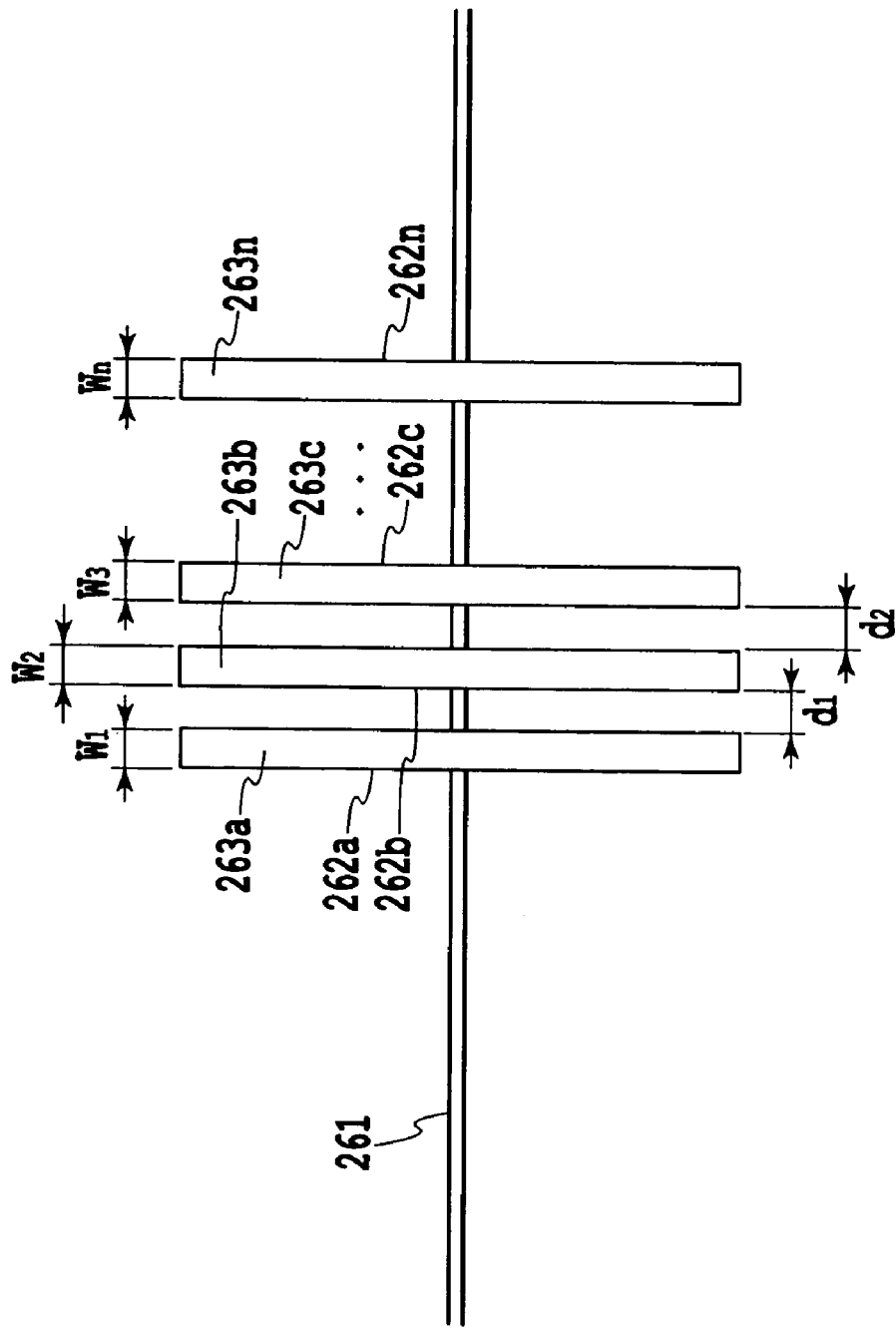
FIG. 13 is a plan view showing a single optical waveguide of FIG. 12.
Figure 14:
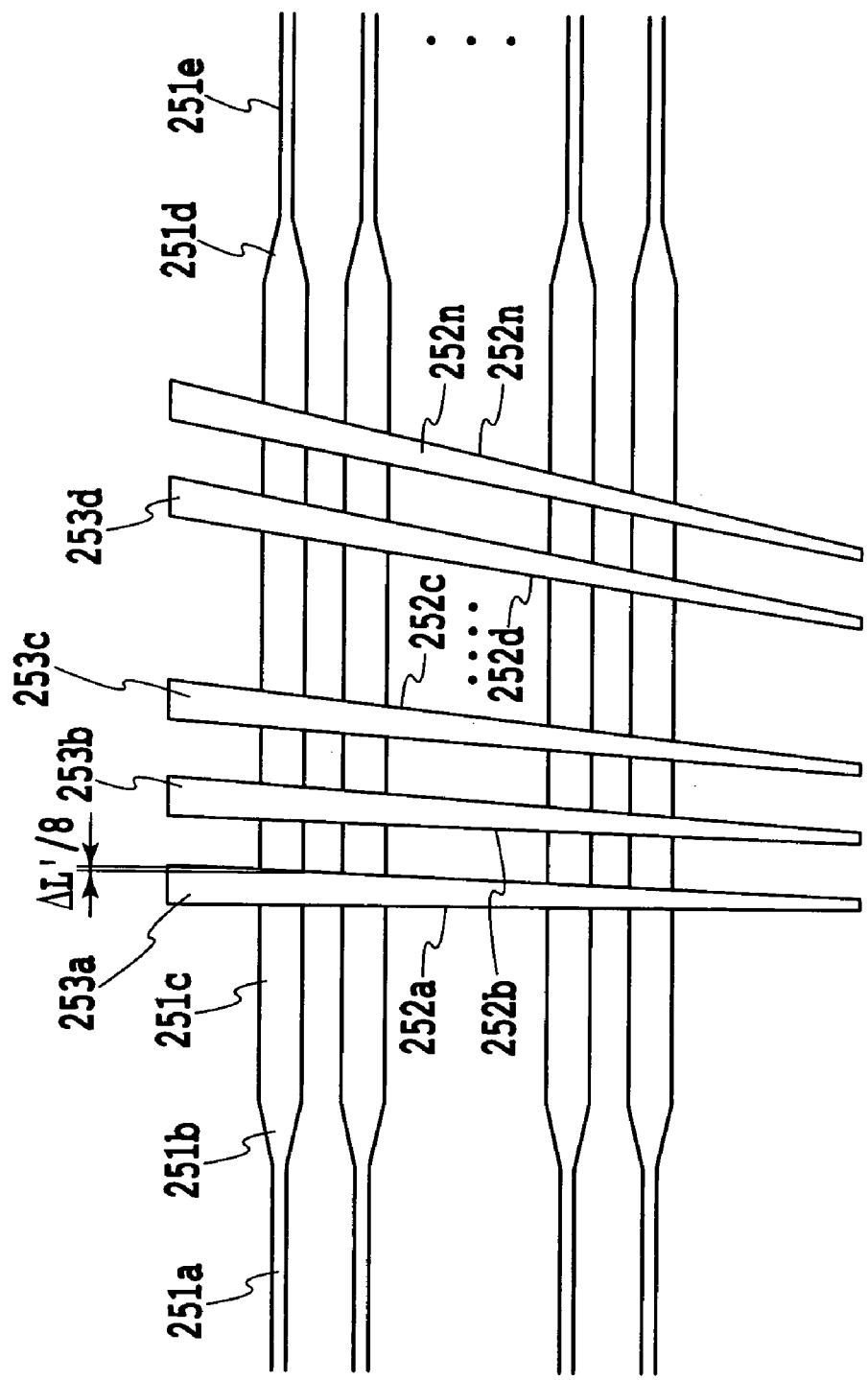
FIG. 14 is an enlarged plan view showing the optical waveguides of FIG. 6.
Figure 15:
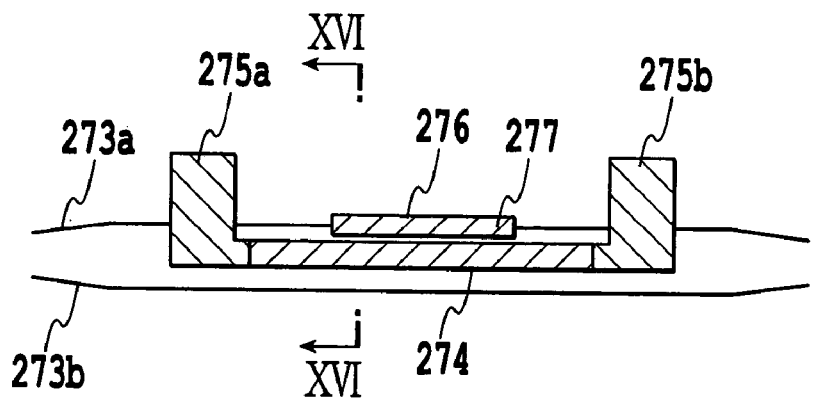
FIG. 15 is a plan view showing a configuration of a conventional polymer assisted thermo-optic switch.
Figure 16:
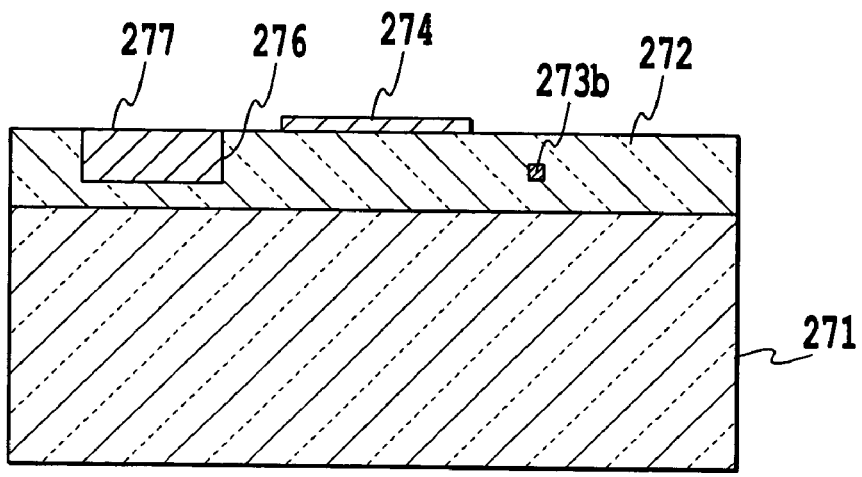
FIG. 16 is a cross-sectional view taken along a line XVI—XVI of FIG. 15.
Figure 17:
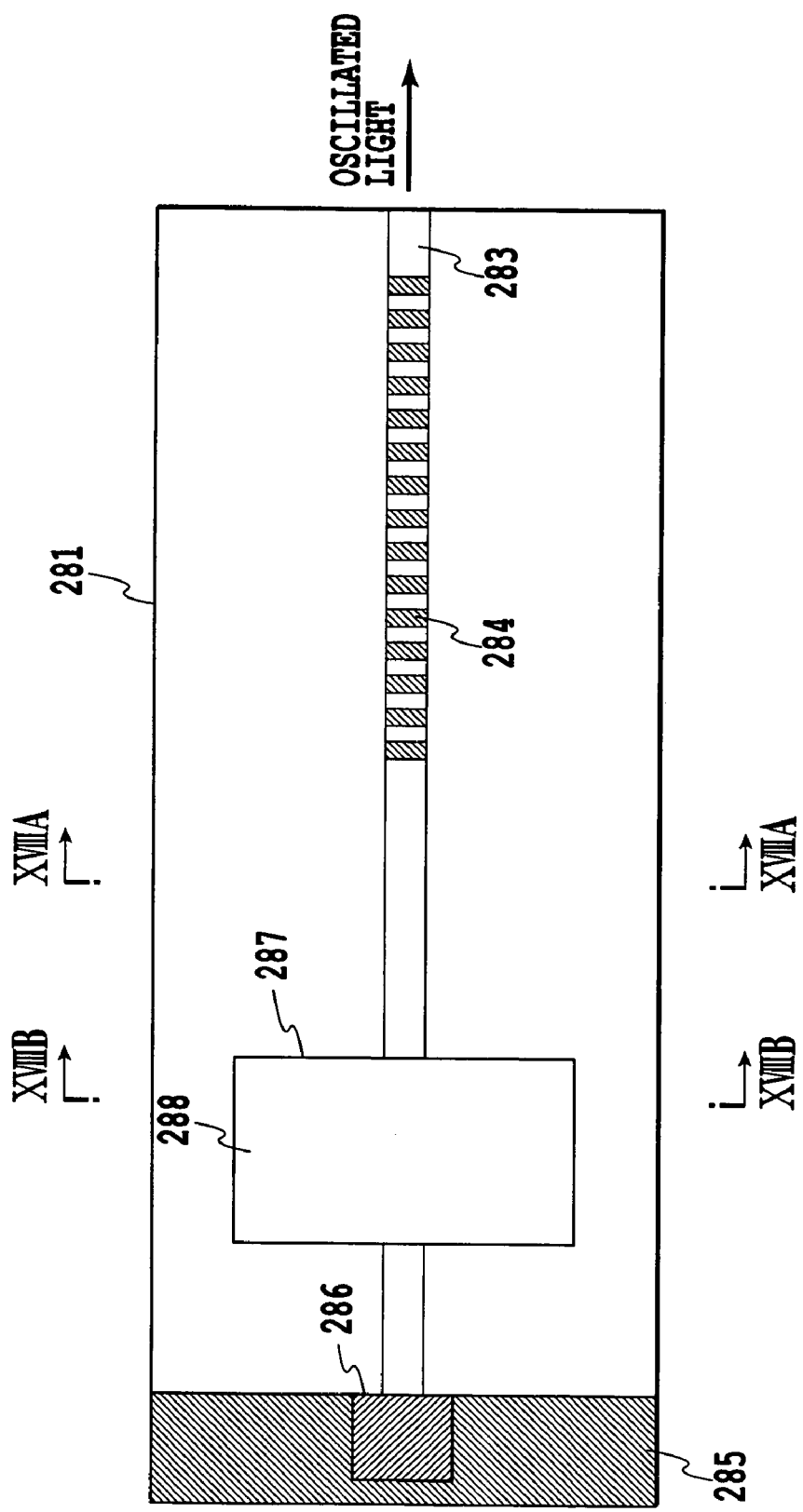
FIG. 17 is a perspective view showing a configuration of a conventional external cavity frequency-stabilized laser whose mode hopping is curbed.
Figure 18A:
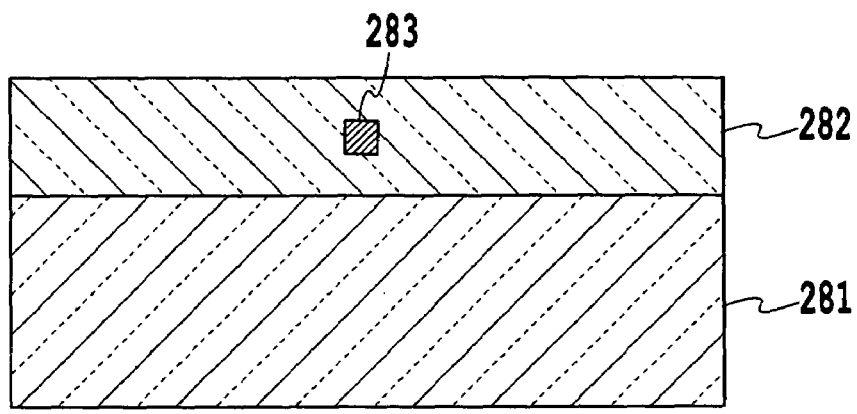
FIG. 18A is a cross-sectional view taken along a line XVIIIA—XVIIIA of FIG. 17.
Figure 18B:
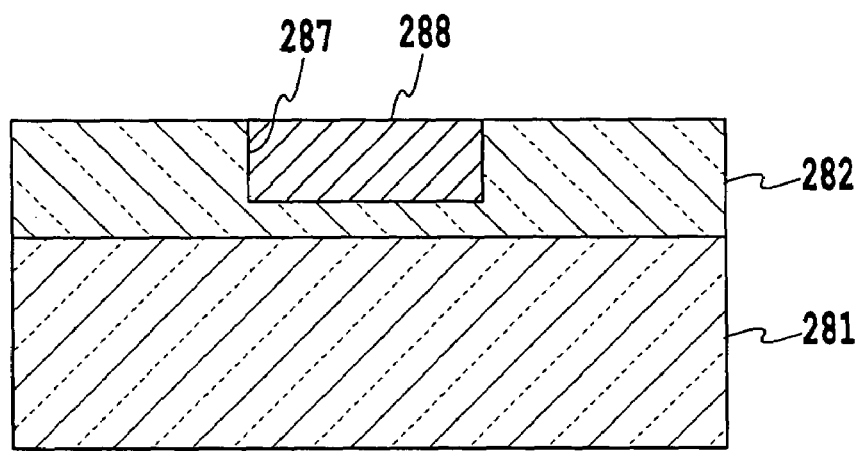
FIG. 18B is a cross-sectional view taken along a line XVIIIB—XVIIIB of FIG. 17.

For example, although the excess loss of the optical waveguide 261 including the grooves 262a–262n of FIG. 13 is 4.6 dB, the total excess loss of the optical waveguide 43 including the grooves 44a–44d and waveguide gaps 46a and 46b of FIGS. 29A and 29B is 3.4 dB, which means that it can reduce the excess loss by 1.2 dB as compared with the configuration of FIG. 13.

Sixth Embodiment

FIG. 30A is a plan view showing a configuration of an optical waveguide of a sixth embodiment in accordance with the present invention; and FIG. 30B is a cross-sectional view taken along a line XXXB—XXXB of FIG. 30A. The sixth embodiment is characterized by using temperature compensation materials 55a–55d that fill a plurality of grooves 54a–54d as a first loss component, by providing waveguide gaps 56a and 56b before and after the grooves 54a–54d as a second loss component, and by increasing the width of the optical waveguide 53 divided by the grooves 54a–54d and waveguide gaps 56a and 56b.

In FIGS. 30A and 30B, a cladding layer 52 composed of silica-based glass is formed on a silicon substrate 51. In the cladding layer 52, an optical waveguide 53 with a core composed of silica-based glass is formed. The optical waveguide 53 includes a wide section 53c and narrow sections 53a and 53e. The wide section 53c is connected to the narrow sections 53a and 53e smoothly via tapered sections 53b and 53d.

In addition, the plurality of grooves 54a–54d with the widths $W_{groove51}$–$W_{groove54}$ are formed across the wide section 53c of the optical waveguide 53 with interposing spacings $d_{groove51}$–$d_{groove53}$ between the grooves by removing part of the cladding layer 52 and core from the optical waveguide 53.

Furthermore, the grooves 54a–54d are filled with temperature compensation materials 55a–55d with a refractive index temperature coefficient different in sign from the temperature coefficient of the effective refractive index of the optical waveguide 53.

The wide section 53c of the optical waveguide 53 includes a waveguide gap 56a with a width $W_{gap51}$, which is placed before the groove 54a with a spacing $d_{gap51}$, and a waveguide gap 56b with a width $W_{gap52}$, which is placed after the groove 54d with a spacing $d_{gap52}$. The waveguide gaps 56a and 56b are each formed by replacing part of the core of the optical waveguide 53 by the cladding layer 52 without adding any fabrication process.

The widths $W_{gap51}$ and $W_{gap52}$ of the waveguide gaps 56a and 56b can be determined such that the total diffraction loss in the waveguide gaps 56a and 56b becomes smaller than the total diffraction loss in the grooves 54a–54d filled with the temperature compensation materials 55a–55d. In addition, the spacing $d_{gap51}$ between the groove 54a and the waveguide gap 56a can be determined at such a distance that the lightwave passing through the waveguide gap 56a can reach the groove 54a before the leakage of the lightwave completely turns to radiation. Furthermore, the spacing $d_{gap52}$ between the groove 54d and the waveguide gap 56b can be determined at such a distance that the lightwave passing through the groove 54d can reach the waveguide gap 56b before the leakage of the lightwave completely turns to complete radiation.

For example, it is possible to set the refractive index contrast of the optical waveguide 53 at 1.5%, the core width×core thickness of the narrow sections 53a and 53e at 4.5 µm×4.5 µm, the core width×core thickness of the wide section 53c at 9.0 µm×4.5 µm, the widths $W_{groove51}$–$W_{groove54}$ of the grooves 54a–54d at 25 µm each, the spacings $d_{groove51}$–$d_{groove53}$ between the grooves 54a–54d at 20 µm each, the width $W_{gap51}$ of the waveguide gap 56a at 15 µm, the spacing $d_{gap51}$ between the groove 54a and the waveguide gap 56a at 15 µm, the width $W_{gap52}$ of the waveguide gap 56b at 15 µm, and the spacing $d_{gap52}$ between the groove 54d and the waveguide gap 56b at 15 µm. As the temperature compensation materials 55a–55d, silicone can be used.

The light propagating through the optical waveguide 53 passes through the waveguide gap 56a with the diffraction loss, after its beam spot size is widened when it is launched from the narrow section 53a to the wide section 53c. Then, the light proceeds through the grooves 54a–54d filled with the temperature compensation materials 55a–55d, passes through the waveguide gap 56b, and propagates through the optical waveguide 53 with its beam spot size narrowed when it is launched from the wide section 53c to the narrow section 53a.

Thus, the widened beam spot size of the lightwave launched into the grooves 54a–54d can be further magnified seemingly to both the horizontal and vertical directions by providing the waveguide gap 56a before the grooves 54a–54d, and the magnified beam spot size of the lightwave output from the grooves 54a–54d can be reduced seemingly to both the horizontal and vertical directions by providing the waveguide gap 56b after the grooves 54a–54d. In addition, the beam spot size of the lightwave passing through the waveguide gaps 56a and 56b can be magnified. Thus it becomes possible to further reduce the excess loss involved in the propagation of the lightwave through the optical waveguide 53 including the loss components.

For example, although the excess loss of the optical waveguide 261 including the grooves 262a–262n of FIG. 13 is 4.6 dB, the total excess loss of the optical waveguide 43 including the wide section 53c in addition to the grooves 54a–54d and waveguide gaps 56a and 56b of FIGS. 30A and 30B is 2.1 dB, which means that it can reduce the excess loss by 2.5 dB as compared with the configuration of FIG. 13.

Seventh Embodiment

Figure 31:
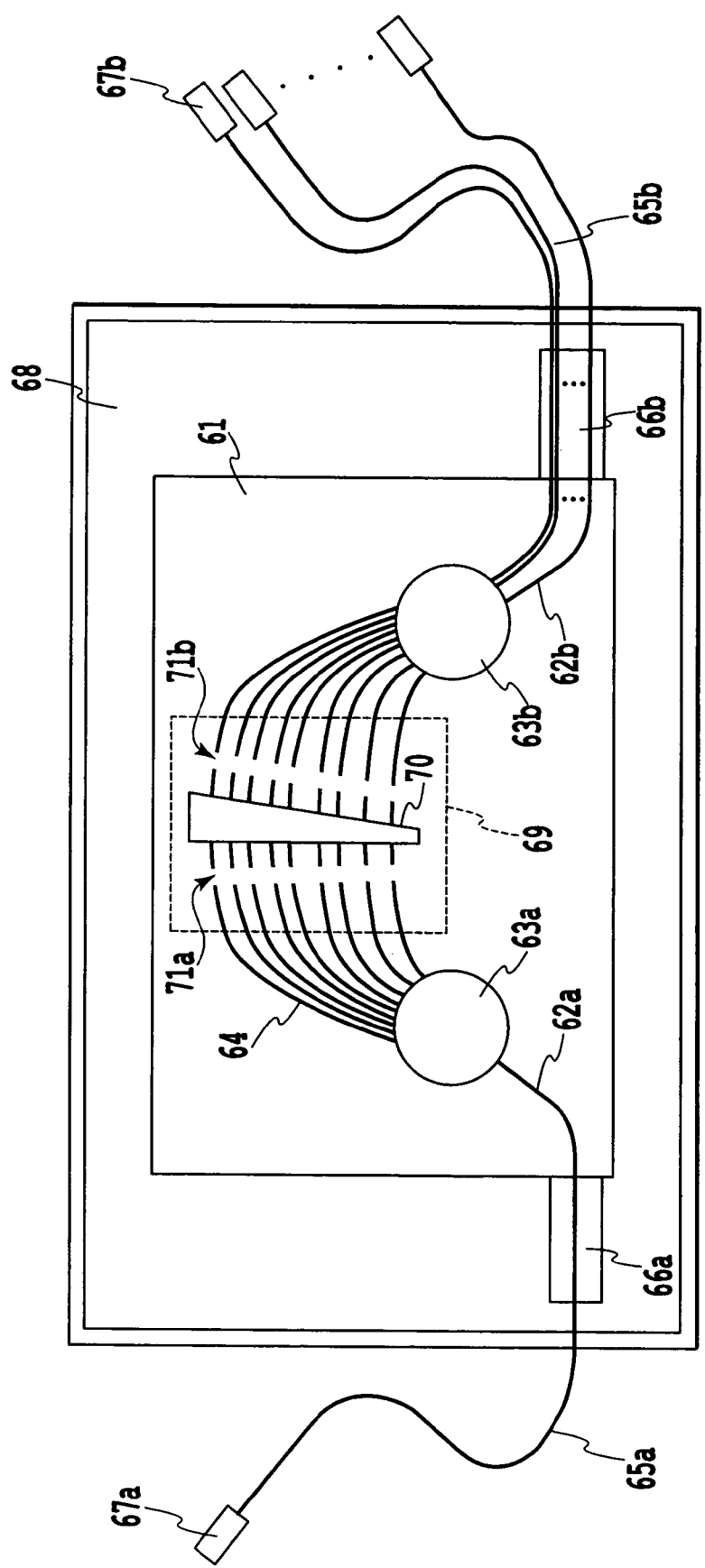
FIG. 31 is a plan view showing a schematic configuration of an optical waveguide circuit of a seventh embodiment in accordance with the present invention.

FIG. 31 is a plan view showing a schematic configuration of an optical waveguide circuit of a seventh embodiment in accordance with the present invention. The seventh embodiment is characterized by comprising a temperature compensation material that fills a groove 70 as the first loss component, and a characteristic compensation region 69 that includes waveguide gaps 71a and 71b provided before and after the groove 70 as the second loss component, which are incorporated into an arrayed-waveguide grating.

In FIG. 31, arrayed-waveguides 64 with a cladding and cores composed of silica-based glass are formed on a silicon substrate 61. The arrayed-waveguides 64 have each waveguide lengthened toward the outside by a fixed amount ΔL.

The arrayed-waveguides 64 include the characteristic compensation region 69 to athermalize the transmission wavelength. The characteristic compensation region 69 includes the groove 70 that is formed across the arrayed-waveguides 64 by removing part of the cladding and cores from the arrayed-waveguides 64. The groove 70 provided in the arrayed-waveguides 64 can be formed such that its width is gradually increased by an amount ΔL' proportional to the fixed amount ΔL which is the incremental length of the arrayed-waveguides 64.

The groove 70 is filled with a temperature compensation material with a refractive index temperature coefficient different in sign from the temperature coefficient of the effective refractive index of the arrayed-waveguides 64.

The characteristic compensation region 69 further includes a waveguide gap 71a with a predetermined width, which is provided before the groove 70 with a specified spacing, and a waveguide gap 71b with a predetermined width, which is provided after the groove 70 with a specified spacing. The waveguide gaps 71a and 71b can be formed by replacing part of the cores of the arrayed-waveguides 64 by the cladding without adding any fabrication process.

In addition, slab waveguides 63a and 63b are connected to both ends of the arrayed-waveguides 64. The input side of the slab waveguides 63a is connected to an input waveguide 62a, and the output side of the slab waveguides 63b is connected to output waveguides 62b.

The input waveguide 62a is connected to an optical fiber 65a via an optical fiber connector 66a, and the optical fiber 65a is connected to an optical fiber connecting terminal 67a. On the other hand, the output waveguides 62b are connected to optical fibers 65b via an optical fiber connector 66b, and the optical fibers 65b are connected to optical fiber connecting terminals 67b. The main components are accommodated in a circuit casing 68.

Thus, the light propagating through the arrayed-waveguides 64 passes through the waveguide gap 71a with involving the diffraction loss, proceeds through the groove 70 filled with the temperature compensation material, passes through the waveguide gap 71b, and propagates through the arrayed-waveguides 64, again.

Consequently, the beam spot size of the lightwave launched into the groove 70 can be magnified seemingly, and the beam spot size of the lightwave output from the groove 70 can be reduced seemingly. Thus, the excess loss involved in the propagation of the lightwave through the arrayed-waveguides 64 can be reduced with athermalizing the transmitted wavelength of the arrayed-waveguide grating.

Eighth Embodiment

A plan view showing a configuration of an optical waveguide of a eighth embodiment in accordance with the present invention is the same as that of the seventh embodiment of FIG. 31.

Figure 32:
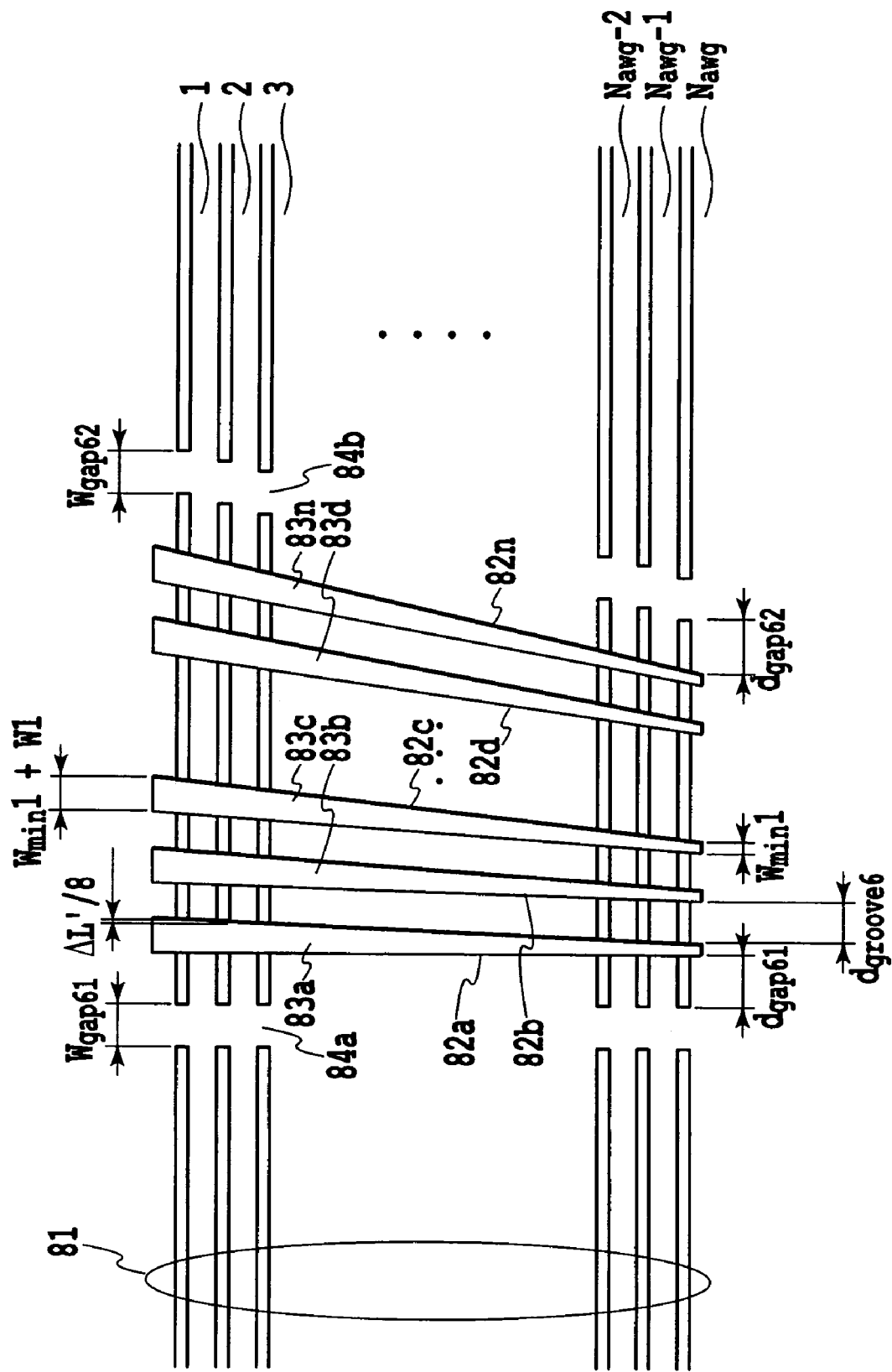
FIG. 32 is a plan view showing a configuration of optical waveguides of an eighth embodiment in accordance with the present invention.

FIG. 32 is an enlarged plan view showing the characteristic compensation region of FIG. 31 of the eighth embodiment. The eighth embodiment is characterized by comprising temperature compensation materials 83a–83n that fill a plurality of grooves 82a–82n as the first loss component, and a characteristic compensation region that includes waveguide gaps 84a and 84b provided before and after the grooves 82a–82n as the second loss component, which are incorporated into an arrayed-waveguide grating.

In FIG. 32, the plurality of grooves 82a–82n are provided across arrayed-waveguides 81 at regular spacings of $d_{groove6}$. The grooves 82a–82n are formed by removing part of the cladding and cores from the arrayed-waveguides 81.

The grooves 82a–82n across the arrayed-waveguides 81 are each formed such that their width monotonically increases from $W_{min1}$ to $W1+W_{min1}$. In addition, in accordance with the length of the arrayed-waveguides 81, each of which increases by the fixed amount ΔL, the width of the grooves 82a–82n is increased by an amount ΔL'/n proportional to the fixed amount ΔL.

The grooves 82a–82n are filled with the temperature compensation materials 83a–83n with the refractive index temperature coefficient different in sign from the temperature coefficient of the effective refractive index of the arrayed-waveguides 81.

The arrayed-waveguides 81 include a waveguide gap 84a with a width $W_{gap61}$, which is placed before the groove 82a with a spacing $d_{gap61}$, and a waveguide gap 84b with a width $W_{gap62}$, which is placed after the groove 82n with a spacing $d_{gap62}$. The waveguide gaps 84a and 84b are each formed by replacing part of the cores of the arrayed-waveguides 81 by the cladding without adding any fabrication process.

The widths $W_{gap61}$ and $W_{gap62}$ of the waveguide gaps 84a and 84b can be determined such that the total diffraction loss in the waveguide gaps 84a and 84b becomes smaller than the total diffraction loss in the grooves 82a–82n filled with the temperature compensation materials 83a–83n. In addition, the spacing $d_{gap61}$ between the groove 82a and the waveguide gap 84a can be determined at such a distance that the lightwave passing through the waveguide gap 84a can reach the groove 82a before the leakage of the lightwave completely turns to radiation. Likewise, the spacing $d_{gap62}$ between the groove 82n and the waveguide gap 84b can be determined at such a distance that the lightwave passing through the groove 82n can reach the waveguide gap 84b before the leakage of the lightwave completely turns to radiation.

For example, it is possible to set the number $N_{awg}$ of the arrayed-waveguides 81 at 130, the length difference ΔL between adjacent arrayed-waveguides 81 at 60 μm, the refractive index contrast of the arrayed-waveguides 81 at 1.5%, and the core width×core thickness at 4.5 μm×4.5 μm. The design can implement an arrayed-waveguide grating with a wavelength channel spacing of 0.8 nm, and the number of channels of 16. In this case, the length difference ΔL' between the adjacent arrayed-waveguides 81 removed by all the grooves 82a–82n is 1.25 μm.

Furthermore, it is possible to set the number of grooves at eight, and the spacing $d_{groove\,6}$ between the adjacent grooves 82a–82n at 20 μm. In this case, the length difference ΔL'/n between the adjacent arrayed-waveguides 81 by one of the grooves 82a–82n is 1.25/8=0.16 μm, and the difference W1 between the maximum groove width and the minimum groove width of each of the grooves 82a–82n is W1=ΔL'/n×($N_{awg}$−1)=20.2 μm. The grooves 82a–82n can be formed by photolithography and reactive ion etching. Considering the repeatability of etching, the minimum groove width can be determined at $W_{min1}$=5 μm.

It is possible to set the width $W_{gap61}$ of the waveguide gap 84a at 20 μm, the spacing $d_{gap61}$ between the groove 82a and the waveguide gap 84a at 20 μm, the width $W_{gap62}$ of the waveguide gap 86b at 20 μm, and the spacing $d_{gap62}$ between the groove 82n and the waveguide gap 86b at 20 μm. As the temperature compensation materials 83a–83n, silicone can be used.

Figure 12:
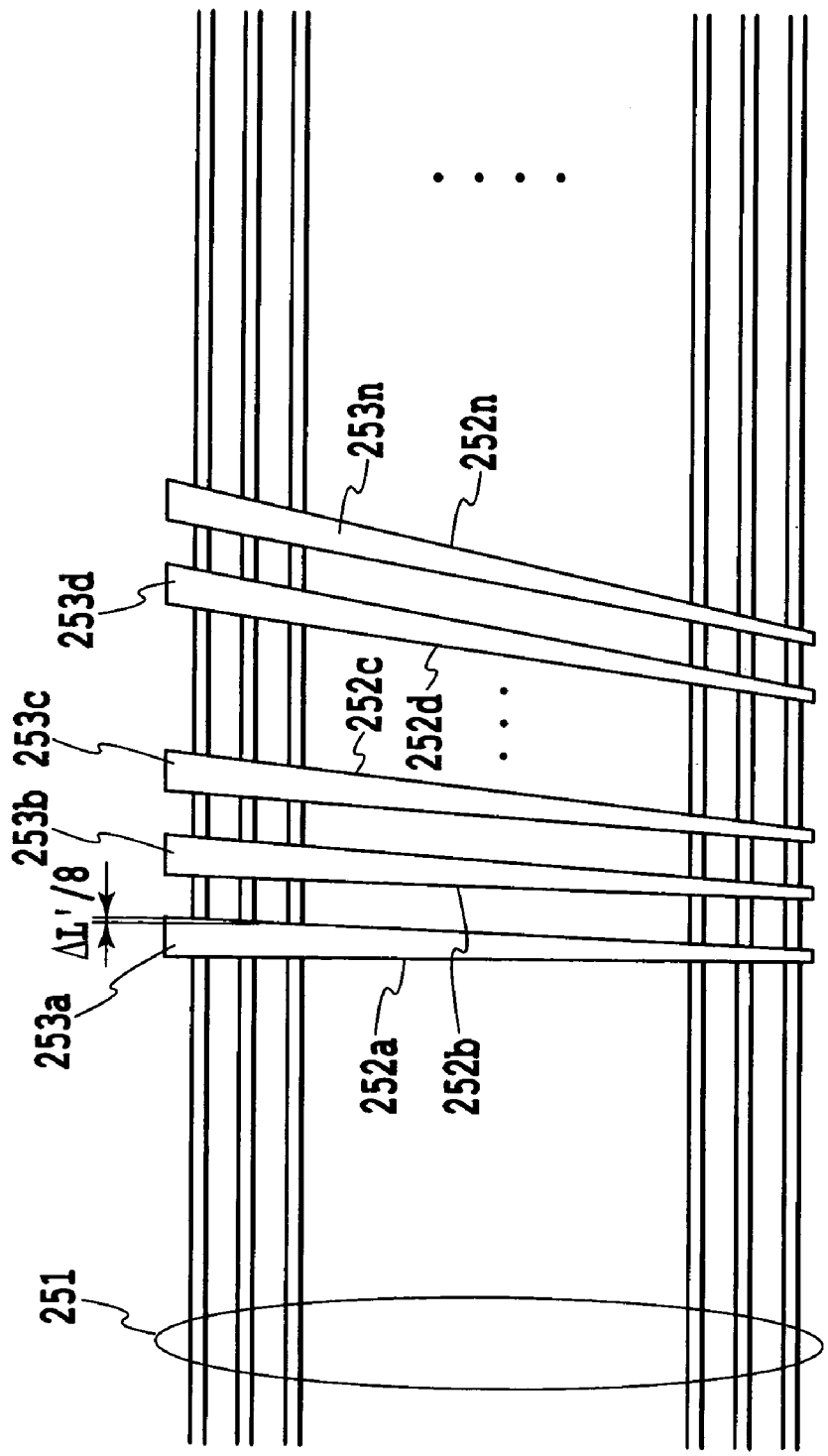
FIG. 12 is a plan view showing another configuration of the optical waveguides of FIG. 6.

In this case, although the excess loss of the arrayed-waveguides 251 with the grooves 252a–252n shown in FIG. 12 is 2.6 dB, the total excess loss of the arrayed-waveguides 81 with the grooves 82a–82n and waveguide gaps 84a and 84b shown in FIG. 32 is 1.8 dB, which means that it can reduce the excess loss by 0.8 dB as compared with the configuration of FIG. 12.

Ninth Embodiment

A plan view showing a configuration of an optical waveguide of a ninth embodiment in accordance with the present invention is the same as that of the seventh embodiment of FIG. 31.

Figure 33:
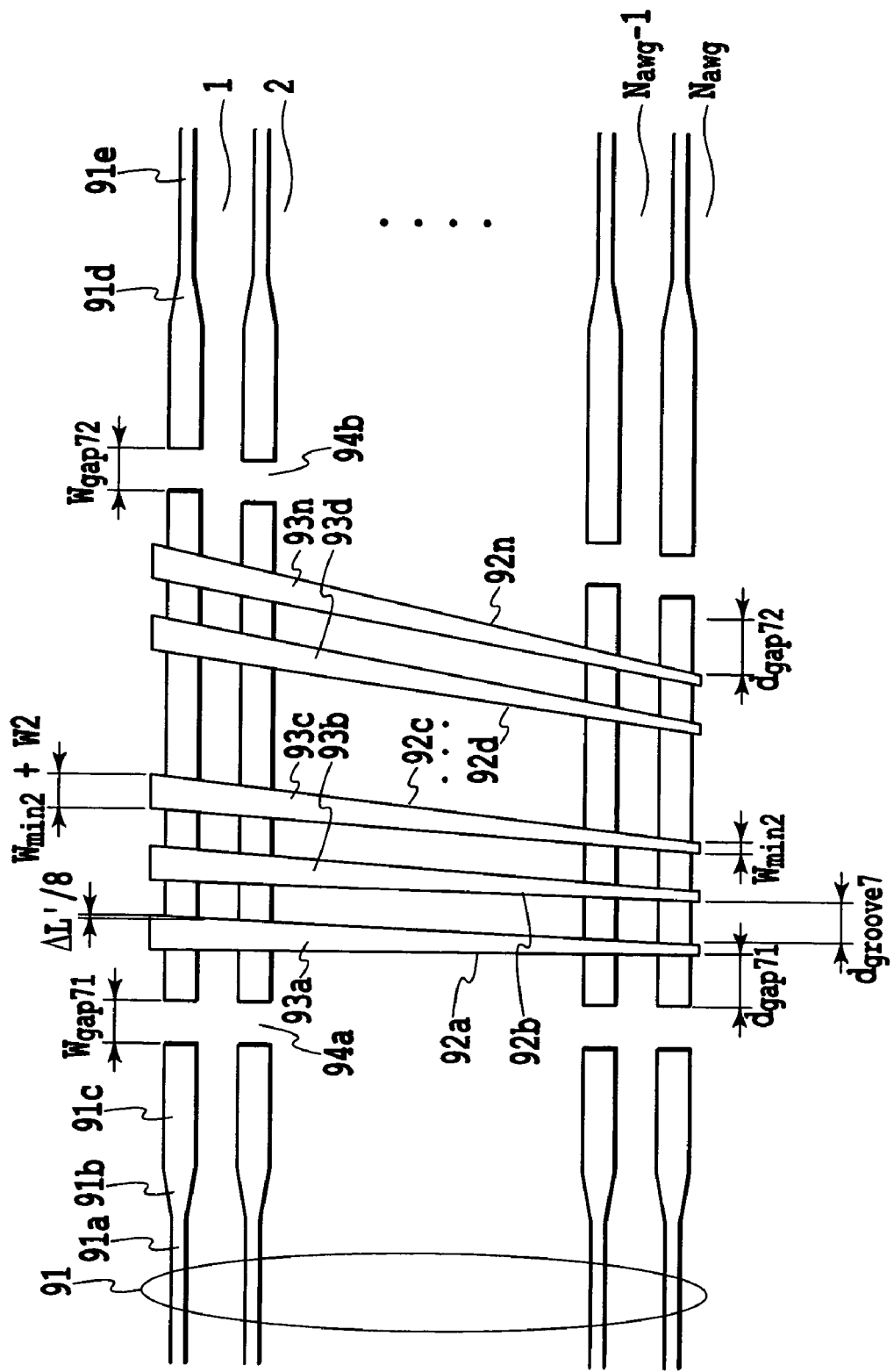
FIG. 33 is a plan view showing a configuration of optical waveguides of a ninth embodiment in accordance with the present invention.

FIG. 33 is an enlarged plan view showing the characteristic compensation region of FIG. 31 of the eighth embodiment.

The ninth embodiment is characterized by including temperature compensation materials 93a–93n that fill a plurality of grooves 92a–92n as a first loss component, by providing waveguide gaps 94a and 94b before and after the grooves 92a–92n as a second loss component, and by incorporating into the arrayed-waveguide grating a characteristic compensation region in which the width of optical waveguides 91 divided by the grooves 92a–92n and waveguide gaps 94a and 94b is increased.

In FIG. 33, the arrayed-waveguides 91 include a wide section 91c and narrow sections 91a and 91e. The wide section 91c is connected smoothly to the narrow sections 91a and 91e via tapered sections 91b and 91d. In addition, a plurality of grooves 92a–92n are formed across the wide section 91c of the arrayed-waveguides 81 with interposing spacings $d_{groove7}$ by removing part of the cladding and cores from the arrayed-waveguides 91.

The grooves 92a–92n across the arrayed-waveguides 91 are each formed such that their width monotonically increases from $W_{min2}$ to W2+$W_{min2}$. In addition, in accordance with the length of the arrayed-waveguides 91, each of which increases step by step by the fixed amount ΔL, the width of the grooves 92a–92n is increased by an amount ΔL'/n proportional to the fixed amount ΔL.

The grooves 92a–92n are filled with the temperature compensation materials 93a–93n with the refractive index temperature coefficient different in sign from the temperature coefficient of the effective refractive index of the arrayed-waveguides 91. The wide section 91c of the arrayed-waveguides 91 includes a waveguide gap 94a with a width $W_{gap71}$, which is placed before the groove 92a with a spacing $d_{gap71}$, and a waveguide gap 94b with a width $W_{gap72}$, which is placed after the groove 92n with a spacing $d_{gap72}$. The waveguide gaps 94a and 94b can be formed by replacing part of the cores of the arrayed-waveguides 91 by the cladding without adding any fabrication process. In addition, the width $W_{gap71}$ and $W_{gap72}$ of the waveguide gaps 94a and 94b can be determined such that the total diffraction loss in the waveguide gaps 94a and 94b becomes smaller than the total diffraction loss in the grooves 92a–92n filled with the temperature compensation materials 93a–93n.

On the other hand, the spacing $d_{gap71}$ between the groove 92a and the waveguide gap 94a can be determined at such a distance that the lightwave passing through the waveguide gap 94a can reach the groove 92a before the leakage of the lightwave completely turns to radiation. Likewise, the spacing $d_{gap72}$ between the groove 92n and the waveguide gap 94b can be determined at such a distance that the lightwave passing through the groove 92n can reach the waveguide gap 94b before the leakage of the lightwave completely turns to radiation.

For example, it is possible to set the number $N_{awg}$ of the arrayed-waveguides 91 at 130, the length difference ΔL between adjacent arrayed-waveguides 91 at 60 μm, the refractive index contrast of the arrayed-waveguides 91 at 1.5%, the core width×core thickness of the narrow sections 91a and 91e at 4.5 μm×4.5 μm, the core width×core thickness of the wide section 91c at 4.5 μm×4.5 μm, the number of grooves at eight, the spacing $d_{groove7}$ between the adjacent grooves 92a–92n at 20 μm, the minimum groove width of the grooves 92a–92n at $W_{min2}$=5 μm, the width $W_{gap71}$ of the waveguide gap 94a at 20 μm, the spacing $d_{gap71}$ between the groove 92a and the waveguide gap 94a at 15 μm, the width $W_{gap72}$ of the waveguide gap 94b at 20 μm, and the spacing $d_{gap72}$ between the groove 92n and the waveguide gap 94b at 15 μm. As the temperature compensation materials 93a–93n, silicone can be used.

In this case, although the excess loss of the arrayed-waveguides 251 with the grooves 252a–252n shown in FIG. 12 is 2.6 dB, the total excess loss of the arrayed-waveguides 91 with the wide section 91c in addition to the grooves 92a–92n and waveguide gaps 94a and 94b shown in FIG. 33 is 1.0 dB, which means that it can reduce the excess loss by 1.6 dB as compared with the configuration of FIG. 12.

Tenth Embodiment

Figure 34:
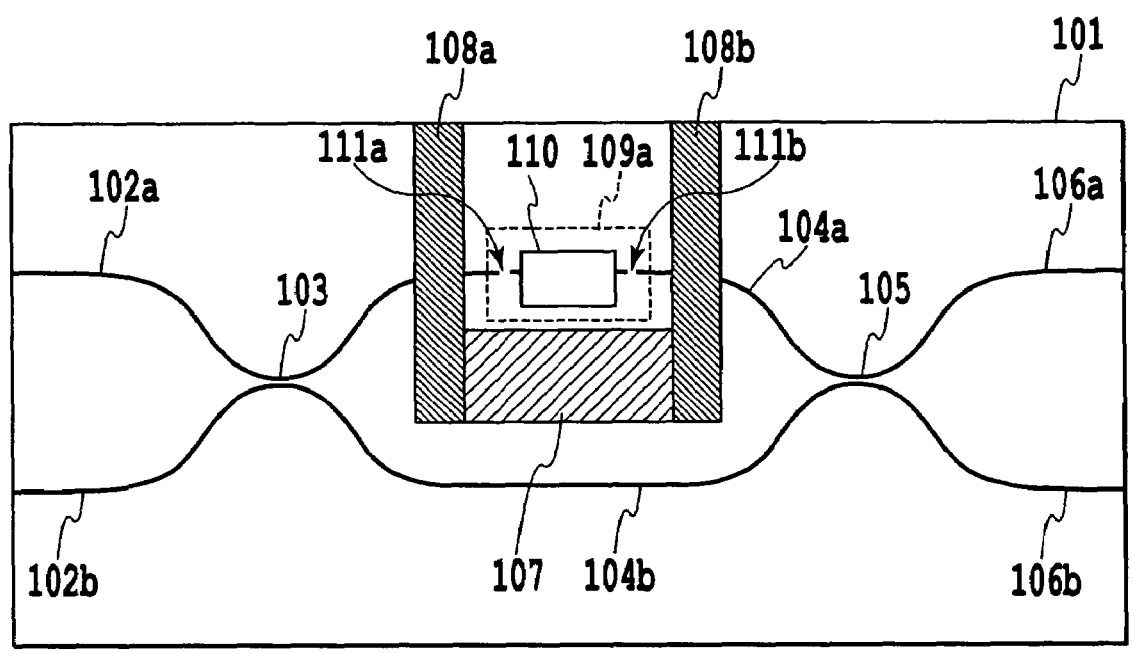
FIG. 34 is a plan view showing a schematic configuration of an optical waveguide circuit of a tenth embodiment in accordance with the present invention.

FIG. 34 is a plan view showing a schematic configuration of an optical waveguide circuit of a tenth embodiment in accordance with the present invention. The tenth embodiment is characterized by including a temperature compensation material that fills a groove 110 as a first loss component, and a characteristic compensation region 109 that has waveguide gaps 111a and 111b provided before and after the groove 110 as the second loss component, which are incorporated into a thermo-optic switch.

In FIG. 34, arm waveguides 104a and 104b with a cladding and cores composed of silica-based glass are formed on a silicon substrate 101.

The arm waveguide 104a has the characteristic compensation region 109 for reducing the electrical power consumption of the thermo-optic switch. The characteristic compensation region 109 includes a groove 110 across the arm waveguide 104a. The groove 110 can be formed by removing part of the cladding and core from the arm waveguide 104a.

The groove 110 is filled with a temperature compensation material with a refractive index temperature coefficient different in sign from the temperature coefficient of the effective refractive index of the arm waveguide 104a.

The characteristic compensation region 109 includes a waveguide gap 111a with a predetermined width, which is provided before the groove 110 with a specified spacing, and a waveguide gap 111b with a predetermined width, which is provided after the groove 110 with a specified spacing. The waveguide gaps 111a and 111b can be formed by replacing part of the core of the arm waveguide 104a by the cladding without adding any fabrication process.

In addition, directional couplers 103 and 105 are connected to both ends of the arm waveguides 104a and 104b.

The input side of the directional coupler 103 is connected to input waveguides 102a and 102b, and the output side of the directional coupler 105 is connected to output waveguides 106a and 106b.

Furthermore, a thin-film heater 107 is formed in parallel to the arm waveguide 104a, and is connected to wiring conductors 108a and 108b.

The light traveling through the arm waveguide 104a passes through the waveguide gap 111a with involving the diffraction loss, propagates through the groove 110 filled with the temperature compensation material, passes through the waveguide gap 111b, and propagates through the arm waveguide 104a, again. Consequently, the beam spot size of the lightwave launched into the groove 110 can be magnified seemingly to both the horizontal and vertical directions, and the beam spot size of the lightwave output from the groove 110 can be reduced to both the horizontal and vertical directions. Thus, the excess loss involved in the propagation of the lightwave through the arm waveguide 104a can be reduced with decreasing the electrical power consumption of the thermo-optic switch.

Eleventh Embodiment

A plan view showing a configuration of an optical waveguide of a 11th embodiment in accordance with the present invention is the same as that of the tenth embodiment of FIG. 34.

Figure 35:
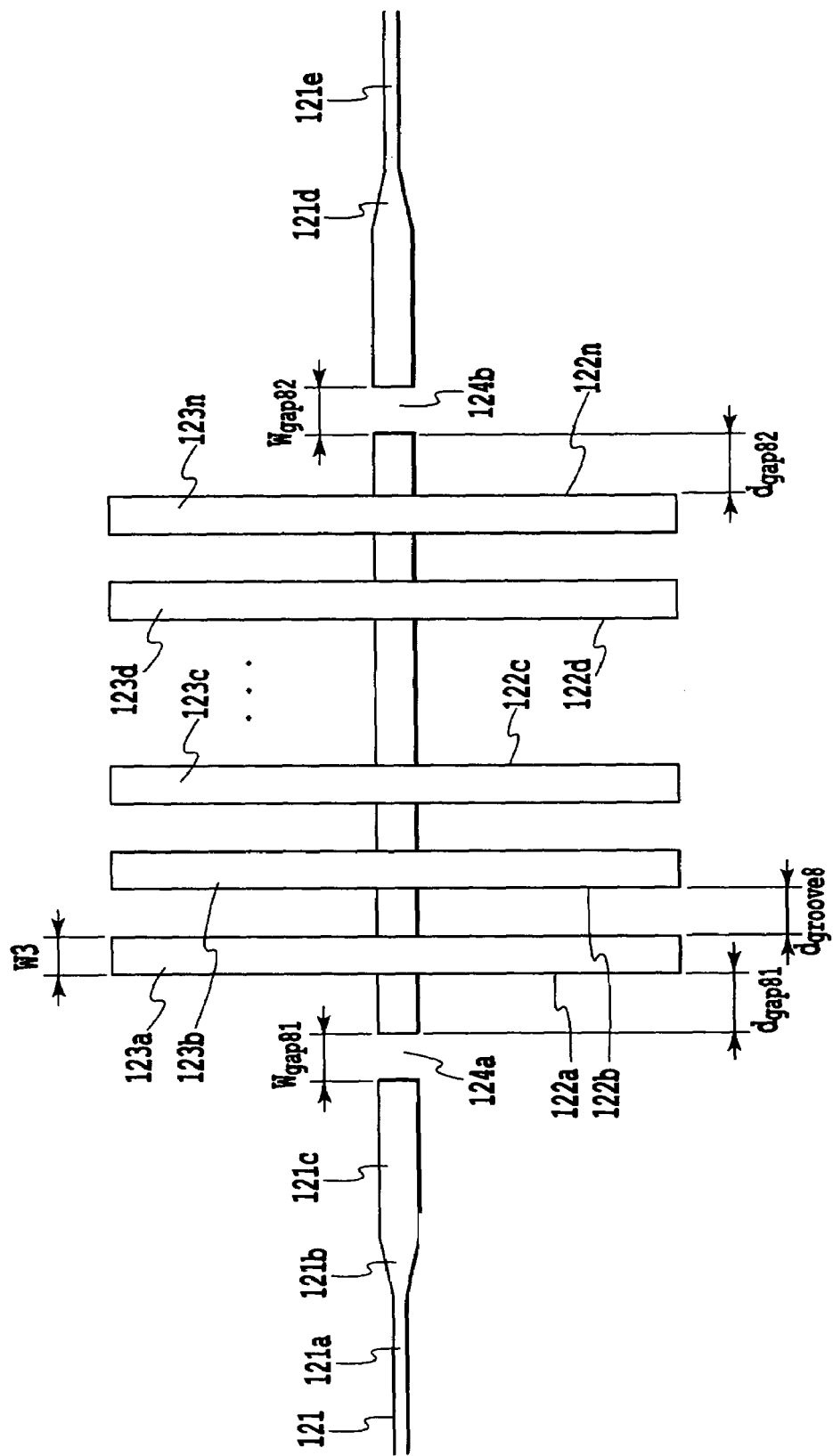
FIG. 35 is a plan view showing a configuration of an optical waveguide of an 11th embodiment in accordance with the present invention.

FIG. 35 is an enlarged plan view showing the characteristic compensation region of FIG. 31 of the 11th embodiment. The 11th embodiment is characterized by using temperature compensation materials 123a–123n that fill a plurality of grooves 122a–122n as a first loss component, by providing waveguide gaps 124a and 124b before and after the grooves 122a–122n as a second loss component, and by incorporating into the thermo-optic switch a characteristic compensation region where the width of an arm waveguide 121 divided by the grooves 122a–122n and waveguide gaps 124a and 124b is increased.

In FIG. 35, the arm waveguide 121 includes a wide section 121c and narrow sections 121a and 121e. The wide section 121c is connected to the narrow sections 121a and 121e smoothly via tapered sections 121b and 121d. In addition, a plurality of grooves 122a–122n with a width W3 are formed across the wide section 121c of the arm waveguide 121 at regular spacings $d_{grooves}$ by removing part of the cladding and core from the arm waveguide 121.

The grooves 122a–122n are filled with temperature compensation materials 123a–123n with a refractive index temperature coefficient different in sign from the temperature coefficient of the effective refractive index of the arm waveguide 121.

The wide section 121c of the arm waveguide 121 includes a waveguide gap 124a with a width $W_{gap81}$, which is placed before the groove 122a with a spacing $d_{gap81}$, and a waveguide gap 124b with a width $W_{gap82}$, which is placed after the groove 122n with a spacing $d_{gap82}$. The waveguide gaps 124a and 124b can be formed by replacing part of the core of the arm waveguide 121 by the cladding without adding any fabrication process.

The widths $W_{gap81}$ and $W_{gap82}$ of the waveguide gaps 124a and 124b can be determined such that the total diffraction loss in the waveguide gaps 124a and 124b becomes smaller than the total diffraction loss in the grooves 122a–122n filled with the temperature compensation materials 123a–123n. On the other hand, the spacing $d_{gap81}$ between the groove 122a and the waveguide gap 124a can be determined at such a distance that the lightwave passing through the waveguide gap 124a can reach the groove 122a before the leakage of the lightwave completely turns to radiation. Likewise, the spacing $d_{gap82}$ between the groove 122n and the waveguide gap 124b can be determined at such a distance that the lightwave passing through the groove 122n can reach the waveguide gap 124b before the leakage of the lightwave completely turns to radiation.

For example, it is possible to set the number of grooves at 12, the width W3 of the grooves 122a–122n at 25 μm, the spacing $d_{grooves}$ between the adjacent grooves 122a–122n at 20 μm, and the total length of the arm waveguide 121 removed by the grooves 122a–122n at 300 μm. The grooves 122a–122n can be formed by photolithography and reactive ion etching.

In addition, it is possible to set the refractive index contrast of the arm waveguide 121 at 1.5%, the core width× core thickness of the narrow sections 121a and 121e at 4.5 μm×4.5 μm, the core width×core thickness of the wide section 121c at 9.0 μm×4.5 μm, the width $W_{gap81}$ of the waveguide gap 124a at 20 μm, the spacing $d_{gap81}$ between the groove 122a and the waveguide gap 124a at 15 μm, the width $W_{gap82}$ of the waveguide gap 124b at 20 μm, and the spacing $d_{gap82}$ between the groove 122n and the waveguide gap 124b at 15 μm. As the temperature compensation materials 123a–123n, silicone can be used.

In this case, although the excess loss of the optical waveguide 261 with the grooves 262a–262n shown in FIG. 13 is 3.1 dB, the total excess loss of the arm waveguide 121 with the wide section 121c in addition to the grooves 122a–122n and waveguide gaps 124a and 124b shown in FIG. 35 is 2.1 dB, which means that it can reduce the excess loss by 1.0 dB as compared with the configuration of FIG. 13.

Twelfth Embodiment

Figure 36:
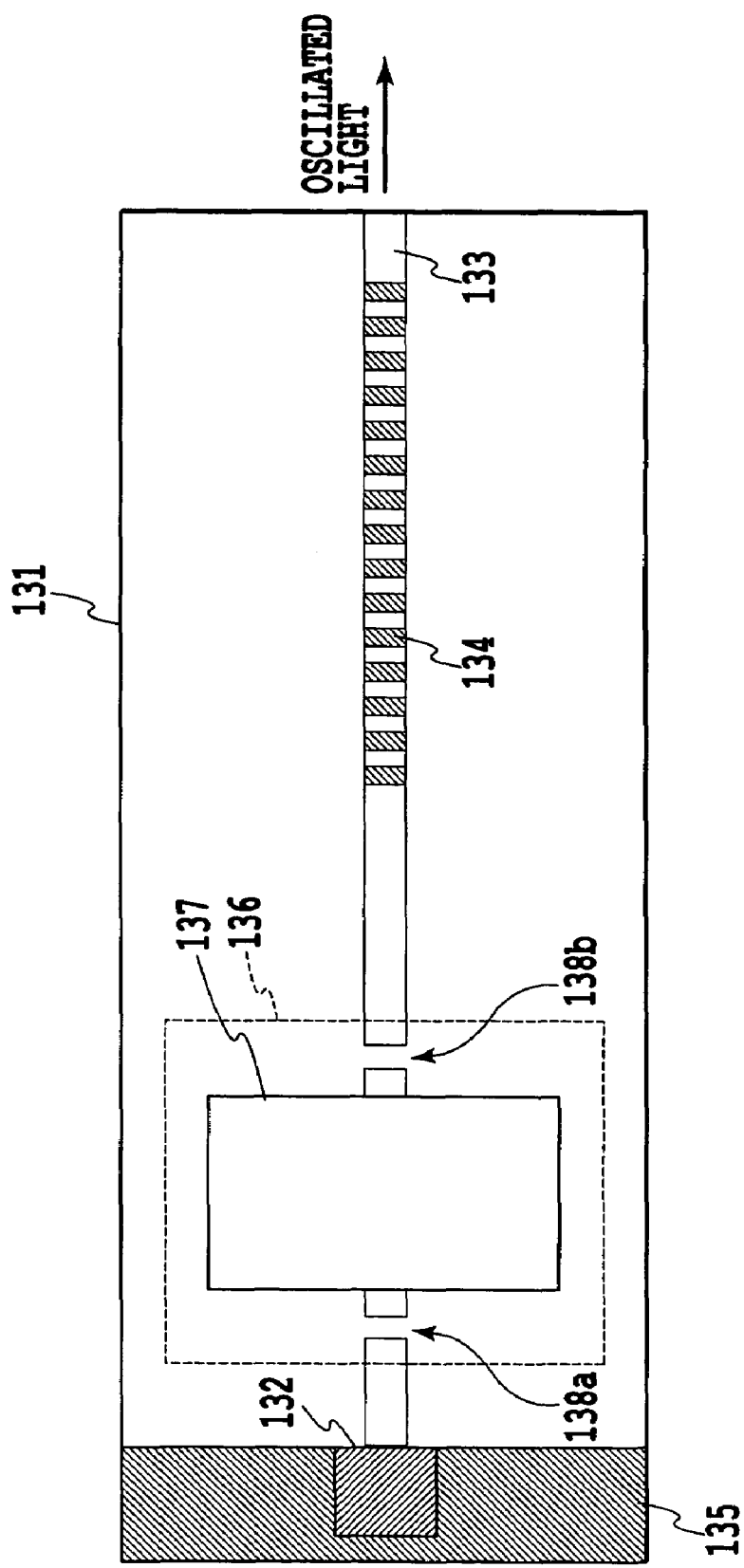
FIG. 36 is a plan view showing a schematic configuration of an optical waveguide circuit of a 12th embodiment in accordance with the present invention.

FIG. 36 is a plan view showing a schematic configuration of an optical waveguide circuit of a 12th embodiment in accordance with the present invention. The 12th embodiment is characterized by including a temperature compensation material that fills a groove 137 as a first loss component, and a characteristic compensation region 136 that has waveguide gaps 138a and 138b provided before and after the groove 137 as the second loss component, which are incorporated into an external cavity frequency-stabilized laser.

In FIG. 36, an optical waveguide 133 with a cladding and core composed of silica-based glass is formed on a silicon substrate 131. The optical waveguide 133 includes a UV written grating 134.

The optical waveguide 133 is equipped with the characteristic compensation region 136 to curb the mode hopping due to temperature changes. The characteristic compensation region 136 includes the groove 137 across the optical waveguide 133. The groove 137 can be formed by removing part of the cladding and core from the optical waveguide 133.

The groove 137 is filled with a temperature compensation material with a refractive index temperature coefficient different in sign from the temperature coefficient of the effective refractive index of the optical waveguide 133.

The characteristic compensation region 136 includes a waveguide gap 138a with a predetermined width, which is provided before the groove 137 with a specified spacing, and a waveguide gap 138b with a predetermined width, which is provided after the groove 137 with a specified spacing. The waveguide gaps 138a and 138b can be formed by replacing part of the core of the optical waveguide 133 by the cladding without adding any fabrication process.

In addition, a silicon terrace 135 is formed on the silicon substrate 131 by removing the cladding layer. The silicon terrace 135 is equipped by a semiconductor laser 132.

The light propagating through the optical waveguide 133 passes through the waveguide gap 138a with involving the diffraction loss, propagates through the groove 137 filled with the temperature compensation material, passes through the waveguide gap 138b, and propagates through the optical waveguide 133, again.

Consequently, the beam spot size of the lightwave launched into the groove 137 can be magnified seemingly to both the horizontal and vertical directions, and the magnified beam spot size of the lightwave output from the groove 137 can be reduced seemingly to both the horizontal and vertical directions. Thus, the excess loss involved in the propagation of the lightwave through the optical waveguide 133 can be reduced with curbing the mode hopping of the external cavity frequency-stabilized laser due to the temperature change.

Thirteenth Embodiment

A plan view showing a configuration of an optical waveguide of a 13th embodiment in accordance with the present invention is the same as that of the tenth embodiment of FIG. 36.

Figure 37:
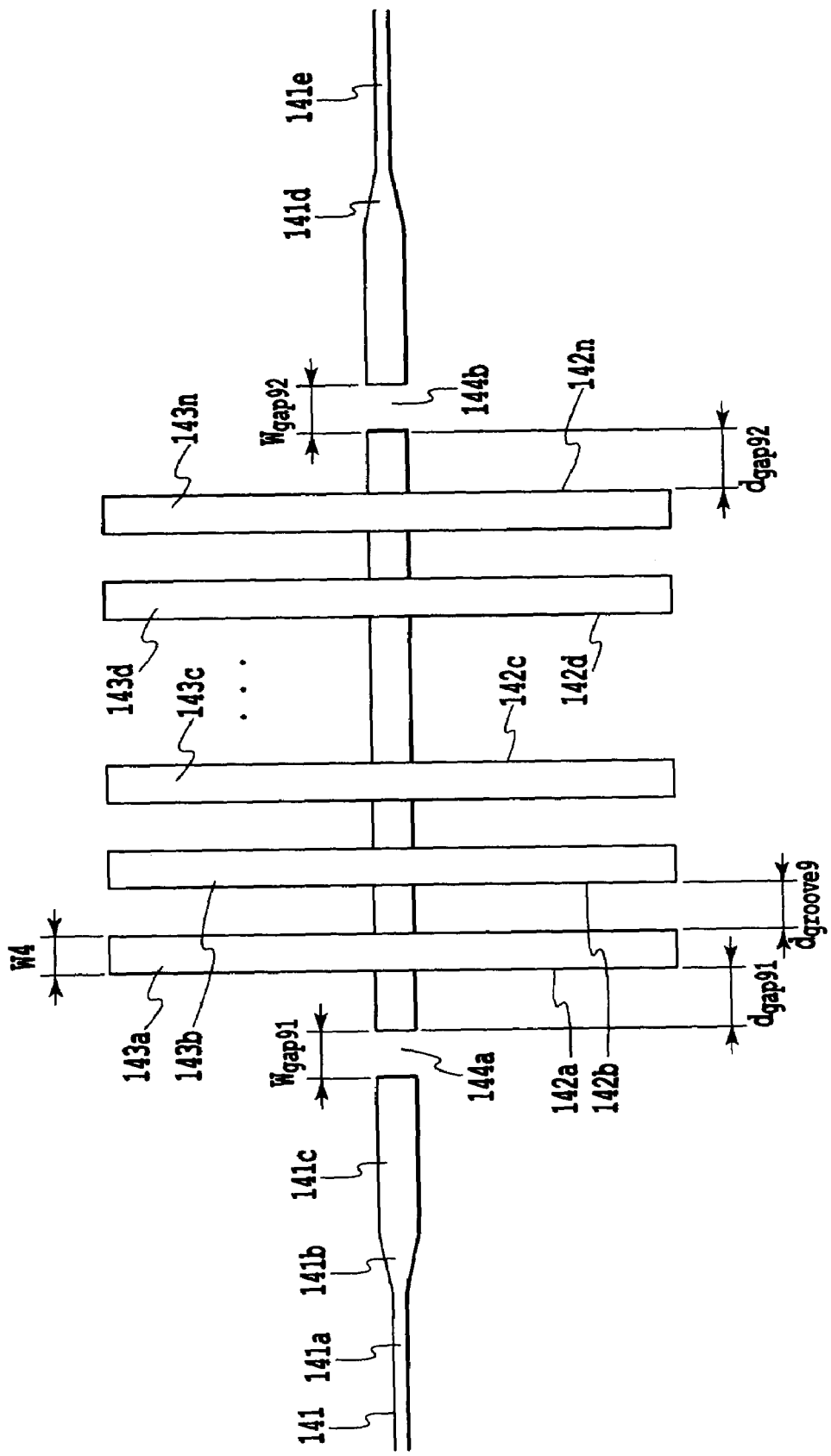
FIG. 37 is a plan view showing a configuration of an optical waveguide of a 13th embodiment in accordance with the present invention.

FIG. 37 is an enlarged plan view showing the characteristic compensation region of FIG. 36 of the 13th embodiment.

The 13th embodiment is characterized by using temperature compensation materials 143a–143n that fill a plurality of grooves 142a–142n as a first loss component, by providing waveguide gaps 144a and 144b before and after the grooves 142a–142n as a second loss component, and by incorporating into the external cavity frequency-stabilized laser a characteristic compensation region where the width of an optical waveguide 141 divided by the grooves 142a–142n and waveguide gaps 144a and 144b is increased.

In FIG. 37, the optical waveguide 141 includes a wide section 141c and narrow sections 141a and 141e. The wide section 141c is connected to the narrow sections 141a and 141e smoothly via tapered sections 141b and 141d. In addition, the plurality of grooves 142a–142n with a width W4 are formed across the wide section 141c of the optical waveguide 141 at regular spacings $d_{groove9}$ by removing part of the cladding and core from the optical waveguide 141.

The grooves 142a–142n are filled with temperature compensation materials 143a–143n with a refractive index temperature coefficient different in sign from the temperature coefficient of the effective refractive index of the optical waveguide 141.

The wide section 141c of the optical waveguide 141 includes a waveguide gap 144a with a width $W_{gap91}$, which is placed before the groove 142a with a spacing $d_{gap91}$, and a waveguide gap 144b with a width $W_{gap92}$, which is placed after the groove 142n with a spacing $d_{gap92}$. The waveguide gaps 144a and 144b can be formed by replacing part of the core of the optical waveguide 141 by the cladding without adding any fabrication process.

The widths $W_{gap91}$ and $W_{gap92}$ of the waveguide gaps 144a and 144b can be determined such that the total diffraction loss in the waveguide gaps 144a and 144b becomes smaller than the total diffraction loss in the grooves 142a–142n filled with the temperature compensation materials 143a–143n. On the other hand, the spacing $d_{gap91}$ between the groove 142a and the waveguide gap 144a can be determined at such a distance that the lightwave passing through the waveguide gap 144a can reach the groove 142a before the leakage of the lightwave completely turns to radiation. Likewise, the spacing $d_{gap92}$ between the groove 142n and the waveguide gap 144b can be determined at such a distance that the lightwave passing through the groove 142n can reach the waveguide gap 144b before the leakage of the lightwave completely turns to radiation.

For example, it is possible to set the number of grooves at 12, the width W4 of the grooves 142a–142n at 25 μm, the spacing $d_{groove9}$ between the adjacent grooves 142a–142n at 20 μm, and the total length of the optical waveguide 141 removed by the grooves 142a–142n at 300 μm. The grooves 142a–142n can be formed by photolithography and reactive ion etching.

In addition, it is possible to set the refractive index contrast of the optical waveguide 141 at 1.5%, the core width×core thickness of the narrow sections 141a and 141e at 4.5 μm×4.5 μm, the core width×core thickness of the wide section 141c at 9.0 μm×4.5 μm, the width $W_{gap91}$ of the waveguide gap 144a at 20 μm, the spacing $d_{gap91}$ between the groove 142a and the waveguide gap 144a at 15 μm, the width $W_{gap92}$ of the waveguide gap 144b at 20 μm, and the spacing $d_{gap92}$ between the groove 142n and the waveguide gap 144b at 15 μm. As the temperature compensation materials 143a–143n, silicone can be used.

In this case, although the excess loss of the optical waveguide 261 with the grooves 262a–262n shown in FIG. 13 is 3.1 dB, the total excess loss of the optical waveguide 141 with the wide section 141c in addition to the grooves 142a–142n and waveguide gaps 144a and 144b shown in FIG. 37 is 2.1 dB, which means that it can reduce the excess loss by 1.0 dB as compared with the configuration of FIG. 13.

Fourteenth Embodiment

Figure 38:
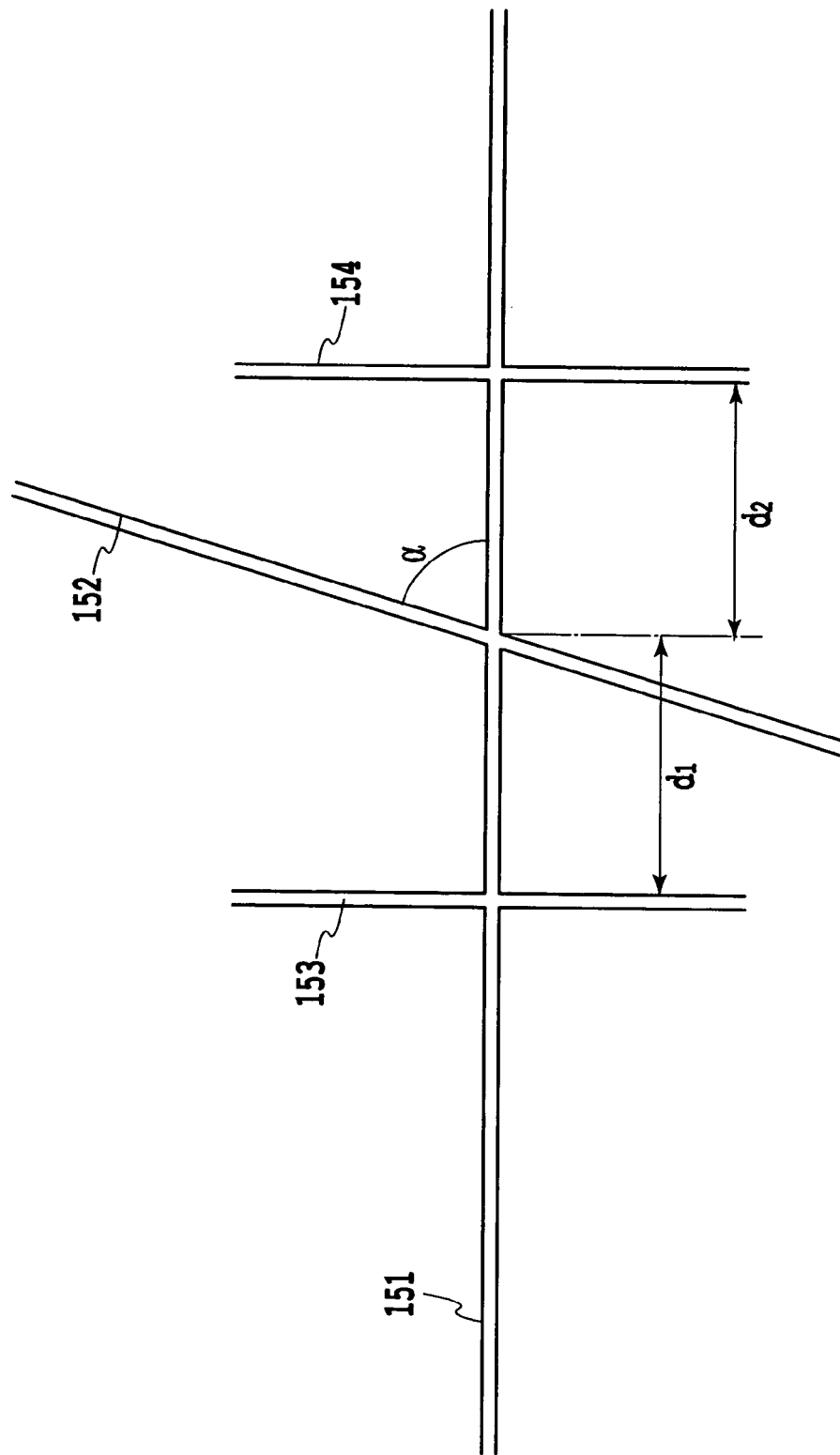
FIG. 38 is a plan view showing a configuration of an optical waveguide of a 14th embodiment in accordance with the present invention.

FIG. 38 is a plan view showing a configuration of an optical waveguide circuit of a 14th embodiment in accordance with the present invention. The 14th embodiment is characterized in that dummy waveguides intersect an optical waveguide before and after the intersection of optical waveguides.

In FIG. 38, optical waveguides 151 and 152 with a cladding and core composed of silica-based glass are placed such that they intersect with each other. The intersection angle a between the optical waveguides 151 and 152 can be determined depending on the layout of the entire planar lightwave circuit. In addition, the dummy waveguides 153 and 154 are placed before and after the intersection of the optical waveguides 151 and 152 such that they intersect the optical waveguide 151.

The width of the dummy waveguides 153 and 154 can be determined such that the total diffraction loss at the intersections of the dummy waveguides 153 and 154 and the optical waveguide 151 becomes smaller than the diffraction loss at the intersection of the optical waveguides 151 and 152. In addition, the spacing $d_1$ between the intersection of the optical waveguides 151 and 152 and the intersection of the optical waveguide 151 and the dummy waveguide 153 can be determined at such a distance that the lightwave passing through the intersection of the optical waveguide 151 and the dummy waveguide 153 can reach the intersection of the optical waveguides 151 and 152 before the leakage of the lightwave completely turns to radiation. Likewise, the spacing $d_2$ between the intersection of the optical waveguides 151 and 152 and the intersection of the optical waveguide 151 and the dummy waveguide 154 can be determined at such a distance that the lightwave passing through the intersection of the optical waveguides 151 and 152 can reach the intersection of the optical waveguide 151 and the dummy waveguide 154 before the leakage of the lightwave completely turns to radiation.

For example, it is possible to set the intersection angle a between the optical waveguides 151 and 152 at 15°, the refractive index contrast of the optical waveguides 151 and 152 and the dummy waveguides 153 and 154 at 1.5%, the core width×core thickness of the optical waveguides 151 and 152 at 4.5 μm×4.5 μm, the core width×core thickness of the dummy waveguides 153 and 154 at 1.5 μm×4.5 μm, the spacing $d_1$ between the intersection of the optical waveguides 151 and 152 and the intersection of the optical waveguide 151 and the dummy waveguide 153 at 25 μm, and the spacing $d_2$ between the intersection of the optical waveguides 151 and 152 and the intersection of the optical waveguide 151 and the dummy waveguide 154 at 25 μm.

The light traveling through the optical waveguide 151 passes through the intersection of the optical waveguide 151 and the dummy waveguide 153 with involving the diffraction loss, passes through the intersection of the optical waveguides 151 and 152, passes through the intersection of the optical waveguide 151 and the dummy waveguide 154, and propagates through the optical waveguide 151, again.

Thus, the beam spot size of the lightwave launched into the intersection of the optical waveguides 151 and 152 can be magnified seemingly by providing the dummy waveguide 153 before the intersection of the optical waveguides 151 and 152, and the magnified beam spot size of the lightwave output from the intersection of the optical waveguides 151 and 152 can be reduced seemingly by providing the dummy waveguide 153 after the intersection of the optical waveguides 151 and 152. As a result, the excess loss involved in the propagation of the lightwave through the optical waveguide 151 including the intersections can be further reduced.

Figure 19:
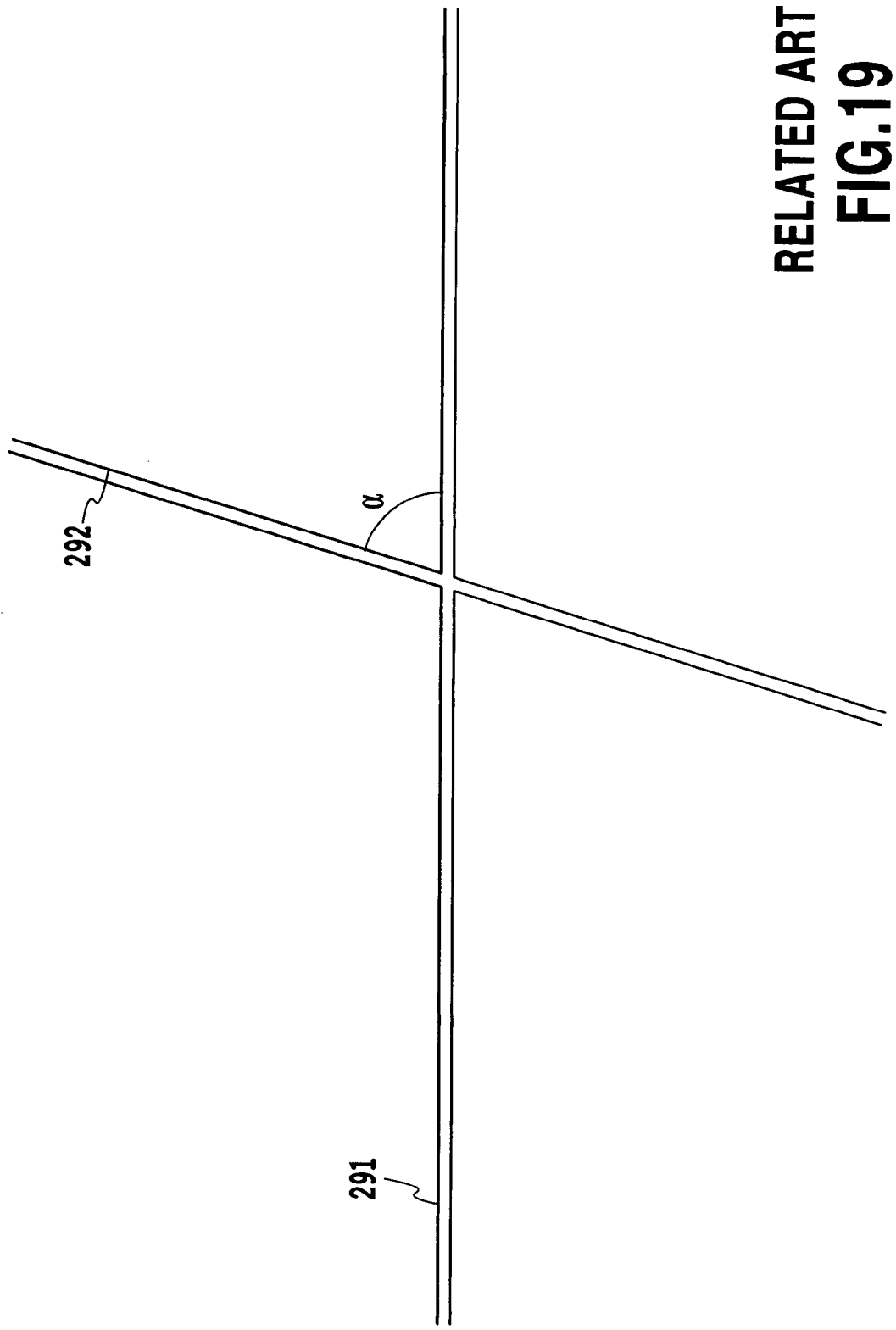
FIG. 19 is a plan view showing a configuration of a conventional crossed optical waveguide.

For example, although the excess loss at the intersection of the optical waveguides 291 and 292 of FIG. 19 is 0.034 dB, the total excess loss at intersections of the optical waveguide 151 including the intersections with the dummy waveguides 153 and 154 of FIG. 38 is 0.023 dB, which means that it can reduce the excess loss by 0.011 dB as compared with the configuration of FIG. 19.

Fifteenth Embodiment

Figure 39:
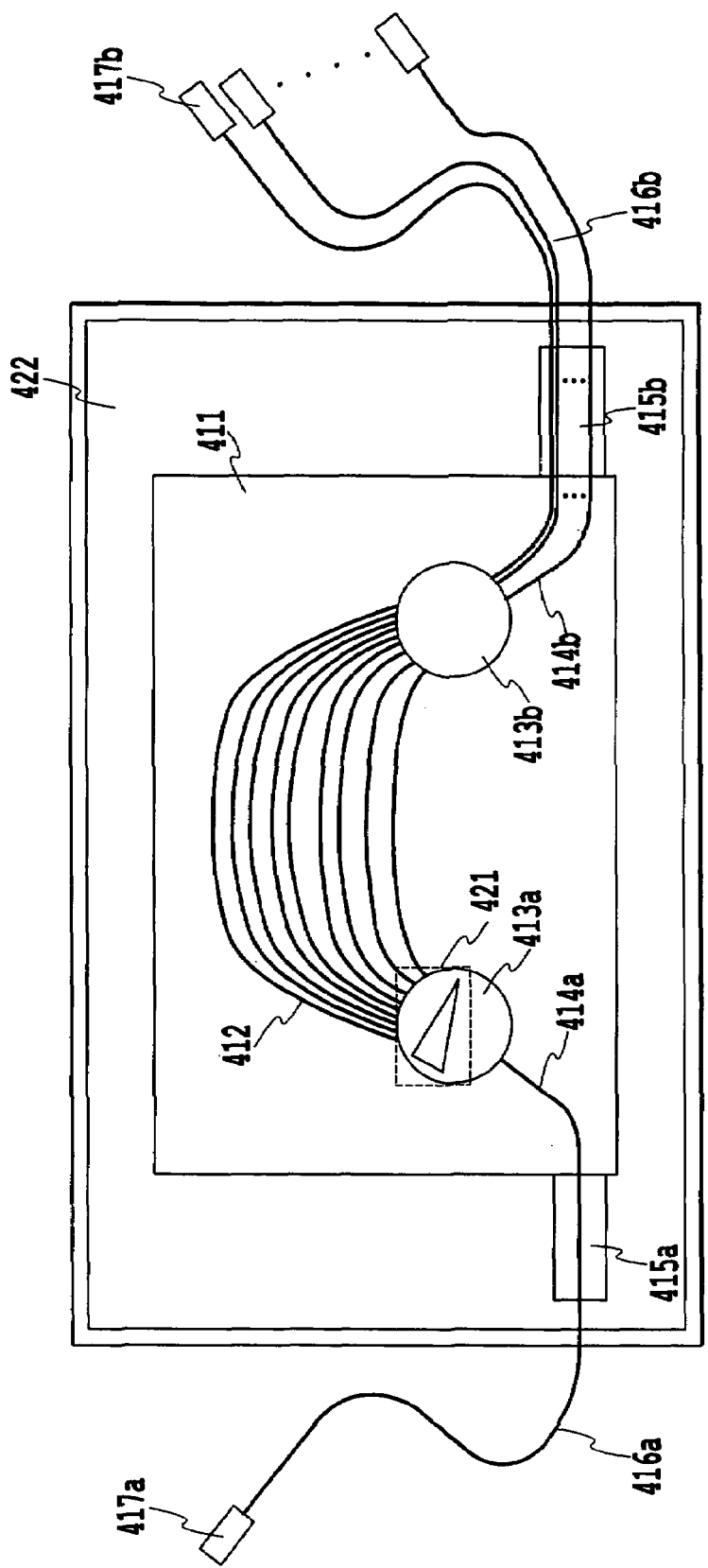
FIG. 39 is a plan view showing a schematic configuration of an optical waveguide of a 15th embodiment in accordance with the present invention.
Figure 40:
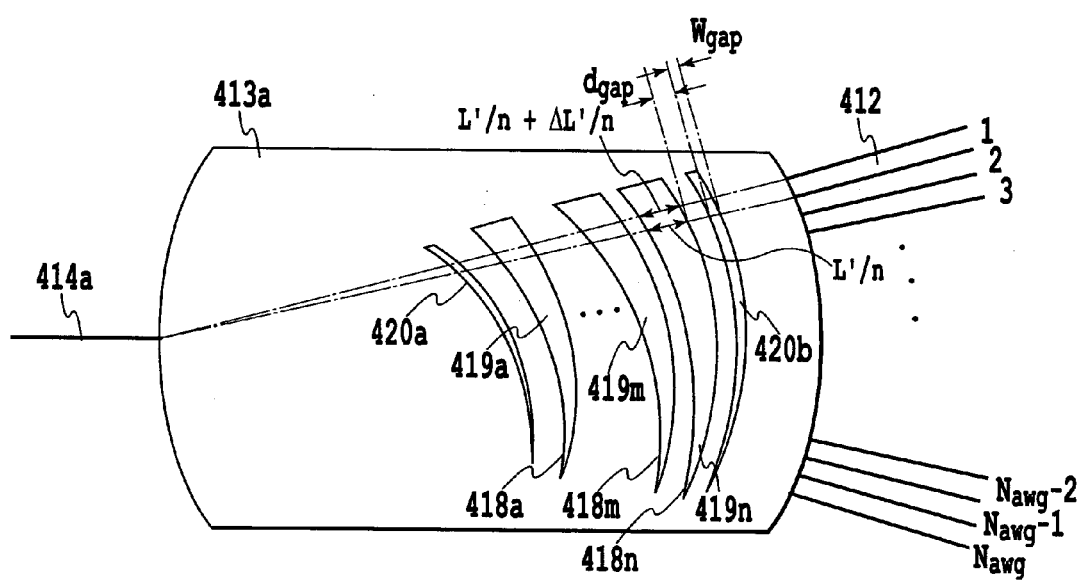
FIG. 40 is an enlarged plan view showing the neighborhood of a slab waveguide 413a of FIG. 39.

FIG. 39 is a plan view showing a schematic configuration of an optical waveguide of a 15th embodiment in accordance with the present invention; and FIG. 40 is an enlarged plan view showing the neighborhood of a slab waveguide 413a of FIG. 39. The 15th embodiment is characterized by comprising temperature compensation materials 419a–419n that fill a plurality of groove 418a–418n as the first loss component, and a characteristic compensation region that includes waveguide gaps 420a and 420b before and after the grooves 418a–418n as the second loss component, which are incorporated into an arrayed-waveguide grating.

In FIG. 39, arrayed-waveguides 412, slab waveguides 413a and 413b, and input and output waveguides 414a and 414b, all of which have silica glass cladding and cores are formed on a silicon substrate 411. The arrayed-waveguides 412 have each waveguide incremented toward the outside by a fixed amount ΔL.

The input waveguide 414a is connected to an optical fiber 416a via an optical fiber connector 415a, and the optical fiber 416a is connected to an optical fiber connecting terminal 417a. On the other hand, the output waveguides 414b are connected to optical fibers 416b via an optical fiber connector 415b, and the optical fibers 416b are connected to optical fiber connecting terminals 417b. The main components are accommodated in a circuit casing 422.

The slab waveguide 413a includes a characteristic compensation region 421 to athermalize transmission wavelength. The characteristic compensation region 421 includes across the slab waveguide 413a a plurality of grooves 418a–418n that are formed with interposing specified spacings.

The grooves 418a–418n can be formed by removing part of the cladding and core from the slab waveguide 413a.

The widths of the grooves 418a–418n across the slab waveguide 413a are specified as follows. As for a line connecting the input waveguide 414a with an (i+1) th waveguide of the arrayed-waveguides 412, assume that it traverses each of the grooves 418a–418n at a width L′/n as illustrated in FIG. 40. In this case, the widths of the grooves are determined as to the line connecting the input waveguide 414a with the ith waveguide of the arrayed-waveguides 412 such that the length of the line segment traversing each of the grooves 418a–418n becomes (L'/n+ΔL'/n), where ΔL' is a value proportional to the fixed amount ΔL.

The grooves 418a–418n are filled with temperature compensation materials 419a–419n with a refractive temperature coefficient different in sign from the temperature coefficient of the effective refractive index of the arrayed-waveguides 412.

In addition, in the slab optical waveguide 413a, waveguide gaps 420a and 420b with a width $W_{gap}$ are formed before the groove 418a and after the groove 418n with interposing a spacing $d_{gap}$, respectively, in which the width $W_{gap}$ and spacing $d_{gap}$ are defined on the line that connects the input waveguide 414a with the ith waveguide from the outermost one of the arrayed-waveguides 412 when the line traverses these grooves and wavelength gaps as illustrated in FIG. 40. The waveguide gaps 420a and 420b can be formed by replacing part of the core of the slab optical waveguide 413a with the cladding without any additional fabrication process.

The width $W_{gap}$ of the waveguide gaps 420a and 420b can be determined such that the diffraction loss in the waveguide gap 420a or 420b becomes smaller than the total diffraction loss in the grooves 418a–418n filled with the temperature compensation materials 419a–419n. In addition, the spacing $d_{gap}$ between the waveguide gap 420a and the groove 418a, and between the waveguide gap 420b and the groove 418n can be determined at such a distance that the lightwave passing through the waveguide gap 420a can reach the groove 418a before the leakage of the lightwave completely turns to radiation, and that the lightwave passing through the groove 418n can reach the waveguide gap 420b before the leakage of the lightwave completely turns to radiation.

The beam spot size of the lightwave launched into the grooves 418a–418n can be magnified seemingly in the vertical direction by providing the waveguide gap 420a before the grooves 418a–418n. Likewise, the beam spot size of the lightwave output from the grooves 418a–418n can be reduced seemingly in the vertical direction by providing the waveguide gap 420b after the grooves 418a–418n. Thus, the excess loss can be reduced involved in the propagation of the lightwave through the slab optical waveguide 413a including the loss components.

For example, it is possible to set the number $N_{awg}$ of the arrayed-waveguides 412 at 130, the length difference ΔL between the adjacent arrayed-waveguides 412 at 60 µm, the refractive index contrast of the arrayed-waveguides 412 at 1.5%, the core width×core thickness at 4.5 µm×4.5 µm, the refractive index contrast of the slab optical waveguide 403a at 1.5%, and its core thickness at 4.5 µm. The design can implement the arrayed-waveguide grating whose wavelength channel spacing is 0.8 nm, and the number of channels is 16. In this case, in the slab optical waveguide 403a, the length difference ΔL' is 1.25 µm which is removed by the grooves 418a–418n on the lines connecting the input waveguide 414a with the adjacent arrayed-waveguides 412.

The number of grooves is made eight. In this case, in the slab optical waveguide 403a, the length difference ΔL'/n is 1.25/8=0.16 µm which is removed by each of the grooves 418a–418n on the lines connecting the input waveguide 414a with the adjacent arrayed-waveguides 412.

In addition, the width $W_{gap}$ of the waveguide gaps 420a and 420b on the line connecting the input waveguide 414a with the ith waveguide from the outermost one of the arrayed-waveguides 412 is specified at 0.15×ΔL'×($N_{awg}$+1−i)µm. On the other hand, the spacing $d_{gap}$ between the groove 418a and the gap 420a or between the groove 418n and the gap 420b is specified at 20 µm on the line. As the temperature compensation materials 419a–419n, silicone can be used.

Figure 20:
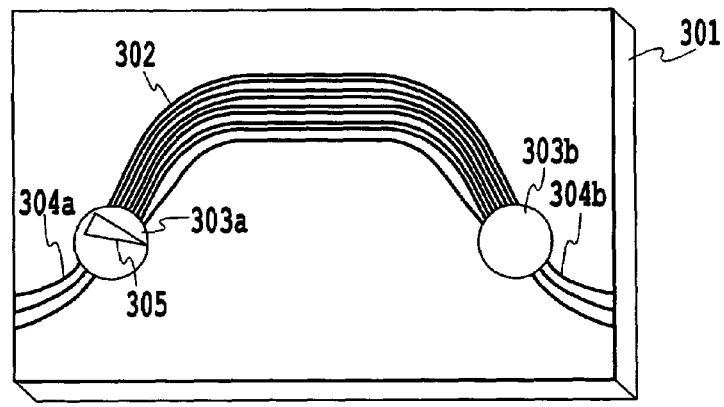
FIG. 20 is a plan view showing another configuration of a conventional athermal arrayed-waveguide grating.
Figure 21:
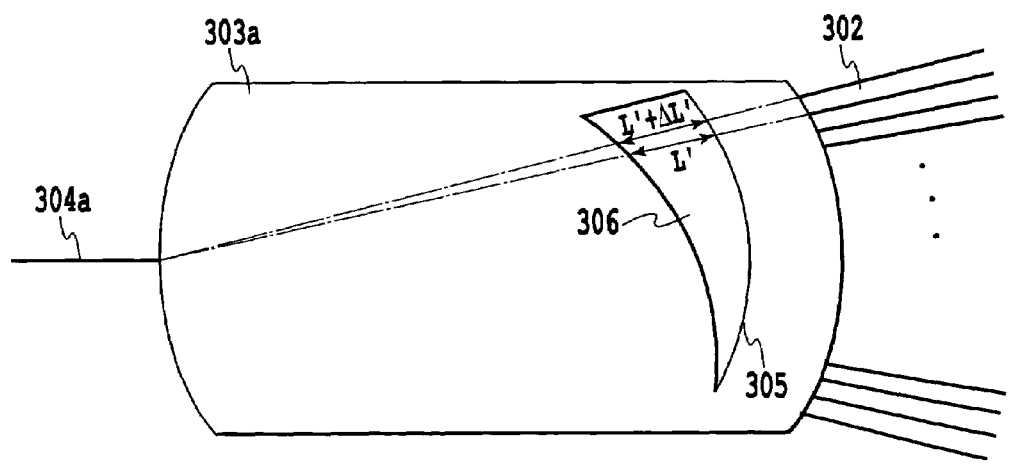
FIG. 21 is an enlarged plan view showing the neighborhood of a slab waveguide 303a of FIG. 20.
Figure 22:
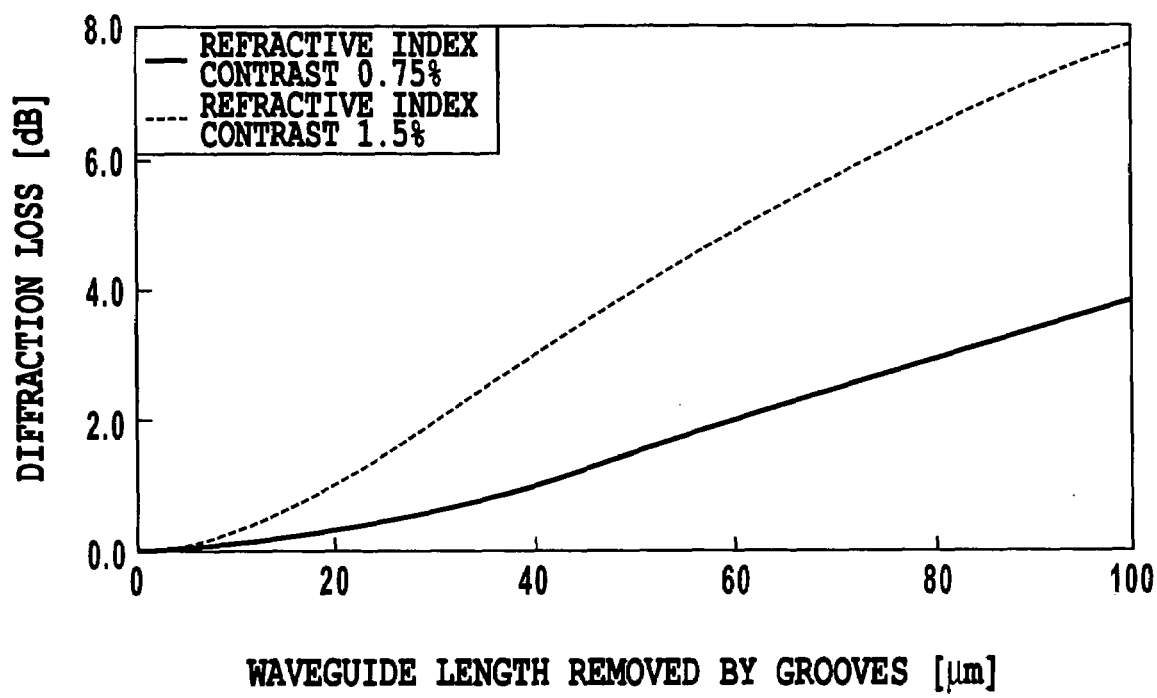
FIG. 22 is a graph illustrating the relationships between the length of the optical waveguide removed by the groove and the diffraction loss.

In this case, although the excess loss of the slab optical waveguide 303a including the groove 305 of FIGS. 20 and 21 is 1.6 dB when the groove 305 is divided by eight, the total excess loss of the slab optical waveguide 413a including the grooves 418a–418n and waveguide gaps 420a and 420b as shown in FIGS. 39 and 40 is 1.1 dB, which means that it can reduce the excess loss by 0.5 dB as compared with the conventional configuration.

Sixteenth Embodiment

Figure 41A:
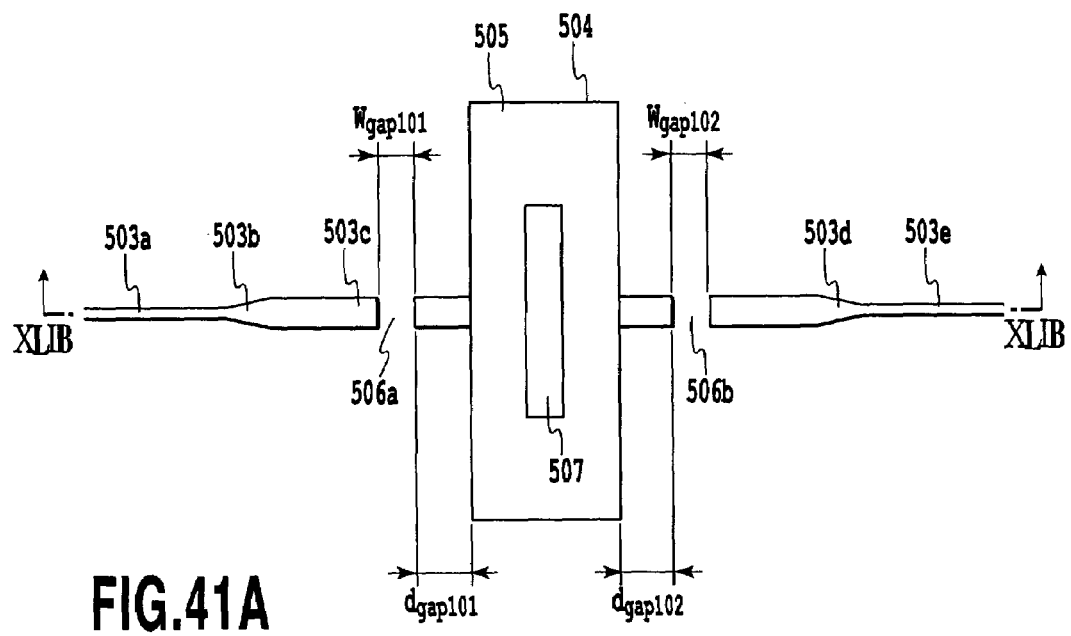
FIG. 41A is a plan view showing a configuration of an optical waveguide of a 16th embodiment in accordance with the present invention.
Figure 41B:
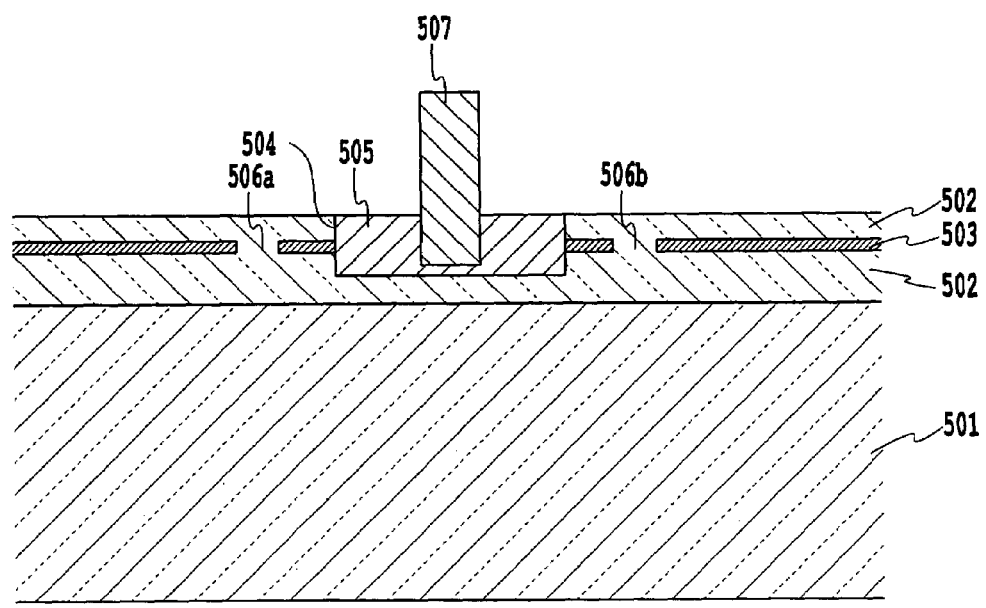
FIG. 41B is a cross-sectional view taken along a line XXXXIB—XXXXIB of FIG. 41A.

FIG. 41A is a plan view showing a configuration of an optical waveguide of a 16th embodiment in accordance with the present invention; and FIG. 41B is a cross-sectional view taken along a line XLIB—XLIB of FIG. 41A. The 16th embodiment is characterized by using a wavelength pass filter 507 inserted into a groove 504 and an adhesive 505 filling the groove 504 to fix the wavelength pass filter 507 as the first loss component, by providing waveguide gaps 506a and 506b before and after the groove 504 as the second loss component, and by increasing the width of the optical waveguide 503 divided by the groove 504, and waveguide gaps 506a and 506b, thereby providing the optical waveguide with a filtering function for transmitting a specified wavelength.

In FIGS. 41A and 41B, a cladding layer 502 composed of silica glass is formed on a silicon substrate 501. In the cladding layer 502, an optical waveguide 503 with a core composed of silica glass is formed. The optical waveguide 503 includes a wide section 503c and narrow sections 503a and 503e. The wide section 503c is connected to the narrow sections 503a and 503e smoothly via tapered sections 503b and 503d.

In addition, the groove 504 with a width $W_{groove}$ is formed across the wide section 503c of the optical waveguide 503 by removing part of the cladding layer 502 and core from the optical waveguide 503 by etching or dicing saw processing.

The groove 504 has the wavelength pass filter 507 inserted thereto and is filled with the adhesive 505 to fix the wavelength pass filter 507. The wavelength pass filter 507 is a filter for transmitting only light with a specified wavelength, and consists of a dielectric multilayer film filter.

The wide section 503c of the optical waveguide 503 includes a waveguide gap 506a with a width $W_{gap101}$, which is placed before the groove 504 with a spacing $d_{gap101}$ and a waveguide gap 506b with a width $W_{gap102}$, which is placed after the groove 504 with the spacing $d_{gap102}$. The waveguide gaps 506a and 506b can be formed by replacing part of the core of the optical waveguide 503 with the cladding layer 502 without any additional fabrication process.

The widths $W_{gap101}$ and $W_{gap102}$ of the waveguide gaps 506a and 506b can be determined such that the diffraction loss in the waveguide gap 506a or 506b becomes smaller than the diffraction loss in the groove 504 that includes the wavelength pass filter 507 and is filled with the adhesive 505. On the other hand, the spacings $d_{gap101}$ and $d_{gap102}$ between the waveguide gap 506a and the groove 504, and between the waveguide gap 506b and the groove 504 can be determined at such distances that the lightwave passing through the waveguide gap 506a can reach the groove 504 before the leakage of the lightwave completely turns to radiation, and the lightwave passing through the groove 504 can reach the waveguide gap 506b before the leakage of the lightwave completely turns to radiation.

In this case, the light propagating through the optical waveguide 503 passes through the waveguide gap 506a with involving the diffraction loss after its beam spot size is magnified in the horizontal direction when it is launched from the narrow section 503a to the wide section 503c. Then, the light proceeds through the groove 504 and the waveguide gap 506b with involving the diffraction loss, and travels through the optical waveguide 503 with its beam spot size being reduced in the horizontal direction when it is launched from the wide section 503c to the narrow section 503e.

Thus, the beam spot size of the lightwave launched into the groove 504 can be further magnified seemingly (particularly in the vertical direction) by providing the waveguide gap 506a before the groove 504. Likewise, the magnified beam spot size of the lightwave output from the groove 504 can be reduced seemingly (particularly in the vertical direction) by providing the waveguide gap 506b after the groove 504. Thus, the excess loss is further reduced which takes place during the propagation of the lightwave through the optical waveguide 503 including the loss component, that is, the groove 504, into which the wavelength pass filter 507 is inserted.

Seventeenth Embodiment

Figure 42:
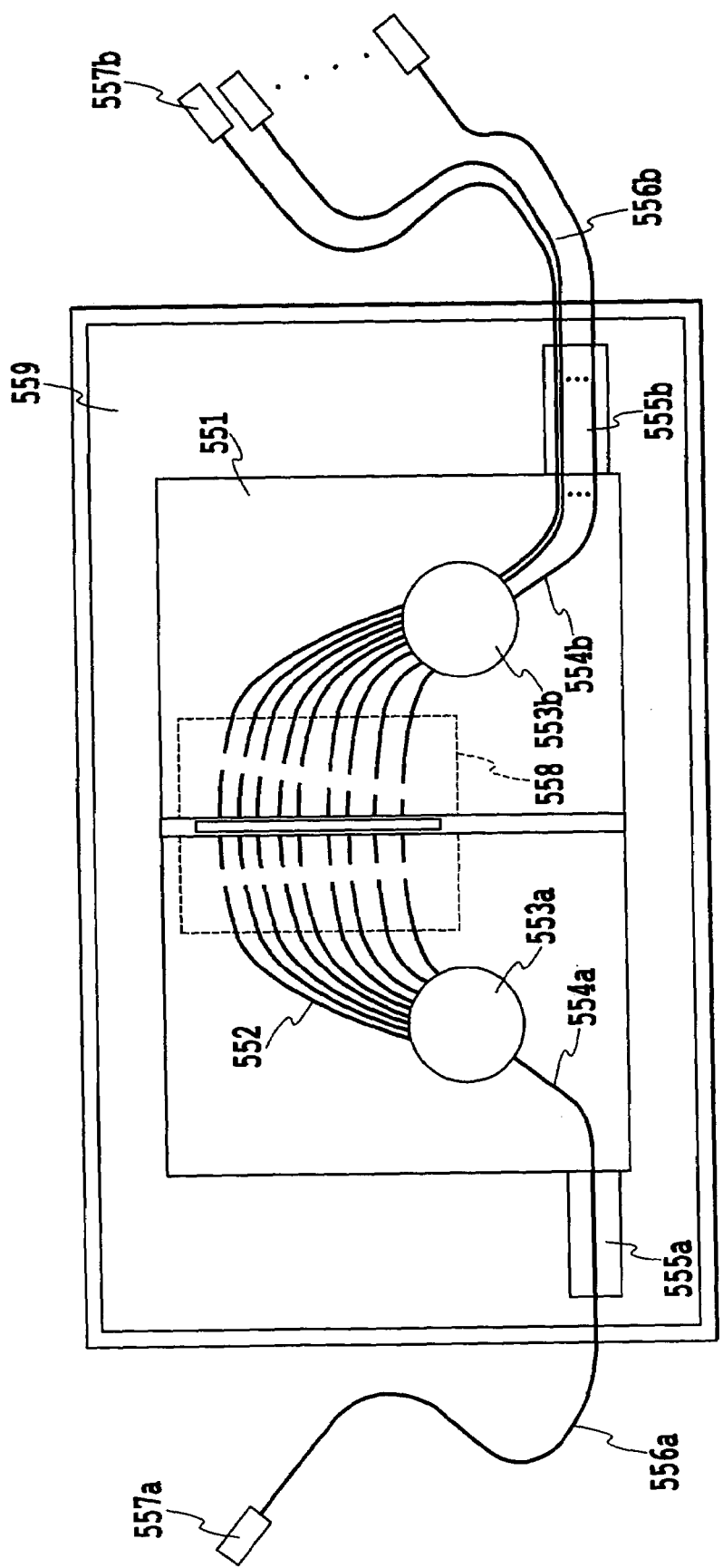
FIG. 42 is a plan view showing a configuration of optical waveguides of a 17th embodiment in accordance with the present invention.
Figure 43:
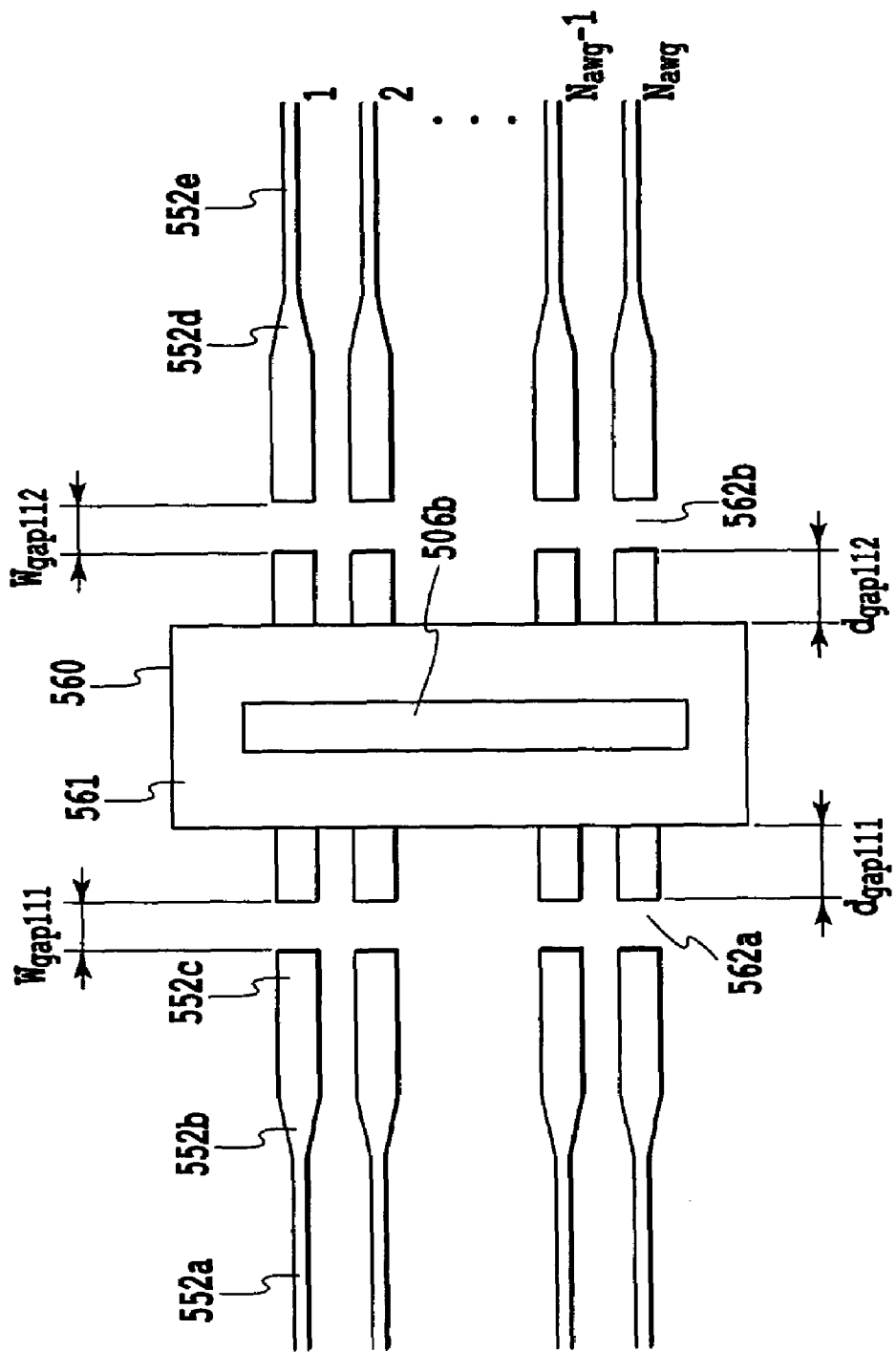
FIG. 43 is an enlarged plan view showing the neighborhood of the arrayed-waveguides of FIG. 42.

FIG. 42 is a plan view showing a schematic configuration of an optical waveguide of a 17th embodiment in accordance with the present invention; and FIG. 43 is an enlarged plan view showing the neighborhood of the arrayed-waveguides of FIG. 42. The 17th embodiment is characterized by using a half wavelength plate 563 embedded in grooves 560 and an adhesive 561 filling the groove for fixing the half wavelength plate 563 as the first loss component, and by providing a characteristic compensation region including waveguide gaps 562a and 562b before and after the grooves 560 as the second loss component, which are incorporated into the arrayed-waveguide grating. The half wavelength plate 563 rotates the polarization of the lightwave passing through the waveguides, and the characteristic compensation region incorporated can compensate the polarization dependence of the transmission characteristics of the arrayed-waveguide grating.

In FIG. 42, arrayed-waveguides 552, slab waveguides 553a and 553b, and input and output waveguides 554a and 554b, all of which have silica glass cladding and cores are formed on a silicon substrate 551. The arrayed-waveguides 552 have each waveguide lengthened toward the outside by a fixed amount ΔL.

The input waveguide 554a is connected to an optical fiber 556a via an optical fiber connector 555a, and the optical fiber 556a is connected to an optical fiber connecting terminal 557a. On the other hand, the output waveguides 554b are connected to optical fibers 556b via an optical fiber connector 555b, and the optical fibers 556b are connected to optical fiber connecting terminals 557b. These components are accommodated in a circuit casing 559.

The arrayed-waveguides 552 include a characteristic compensation region 558 for making them polarization independent. In the characteristic compensation region 558, the arrayed-waveguides 552 have a wide section 552c and narrow sections 552a and 552e, and the wide section 552c is connected smoothly to the narrow sections 552a and 552e via the tapered sections 552b and 552d. In addition, a plurality of grooves 560 are formed across the arrayed-waveguides 552 by removing part of the cladding and cores from the arrayed-waveguides 552 by the dicing saw processing as shown in FIG. 43.

These grooves 560 include a half wavelength plate 563 inserted thereto, and are filled with an adhesive 561 to fix the half wavelength plate 563. The half wavelength plate 563 is composed of a polymeric material.

The wide section 552c of the arrayed-waveguides 552 includes a waveguide gap 562a with a width $W_{gap111}$, which is placed before the grooves 560 with a spacing $d_{gap111}$, and a waveguide gap 562b with a width $W_{gap112}$, which is placed after the grooves 560 with the spacing $d_{gap112}$. The waveguide gaps 562a and 562b can be formed by replacing part of the cores of the arrayed-waveguides 552 with the cladding layer without any additional fabrication process.

The widths $W_{gap111}$ and $W_{gap112}$ of the waveguide gaps 562a and 562b can be determined such that the diffraction loss in the waveguide gap 562a or 562b becomes smaller than the diffraction loss in the grooves 560 that include the half wavelength plate 563 and are filled with the adhesive 561. On the other hand, the spacings $d_{gap111}$ and $d_{gap112}$ between the waveguide gap 562a and grooves 560 and the waveguide gap 562b and the grooves 560 can be determined at such distances that the lightwave passing through the waveguide gap 562a can reach the grooves 560 before the leakage of the lightwave completely turns to radiation, and the lightwave passing through the grooves 560 can reach the waveguide gap 562b before the leakage of the lightwave completely turns to radiation.

In this case, the light propagating through the arrayed-waveguides 552 passes through the waveguide gap 562a with involving the diffraction loss after its beam spot size is magnified in the horizontal direction when it is launched from the narrow section 552a to the wide section 552c. Then, the light proceeds through the grooves 560 and the waveguide gap 562b with involving the diffraction loss, and travels through the arrayed-waveguides 552 with its beam spot size being reduced in the horizontal direction when it is launched from the wide section 552c to the narrow section 552e.

Thus, the beam spot size of the lightwave launched into the grooves 560 can be further magnified seemingly, particularly in the vertical direction, by providing the waveguide gap 562a before the grooves 560. Likewise, the magnified beam spot size of the lightwave output from the grooves 560 can be reduced seemingly, particularly in the vertical direction, by providing the waveguide gap 562b after the grooves 560. Thus, the excess loss is further reduced which takes place during the propagation of the lightwave through the arrayed-waveguides 552 including the loss component, that is, the grooves 560, into which the half wavelength plate 563 is inserted.

Eighteenth Embodiment

Figure 44:
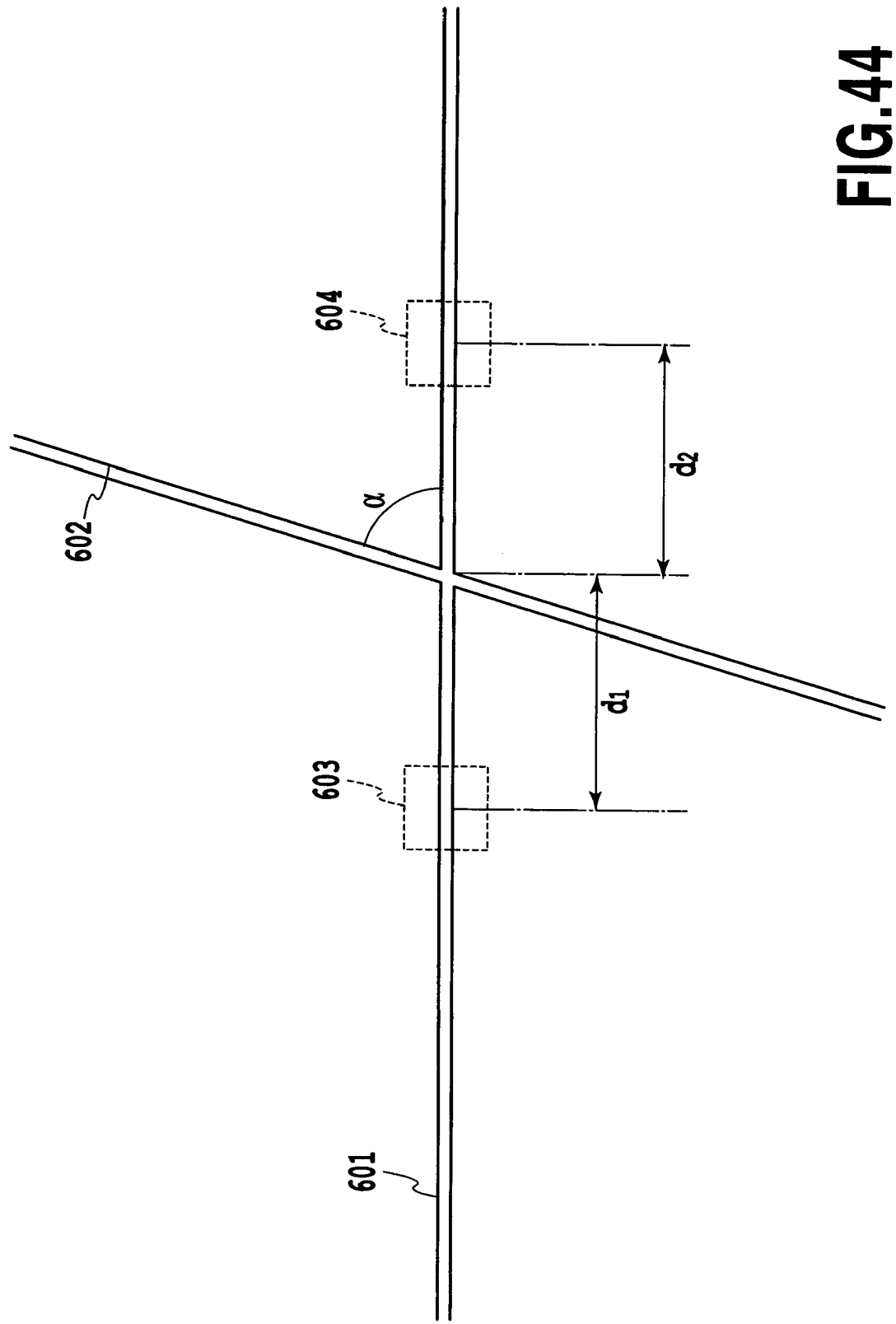
FIG. 44 is a plan view showing a configuration of an optical waveguide of an 18th embodiment in accordance with the present invention.
Figure 45A:
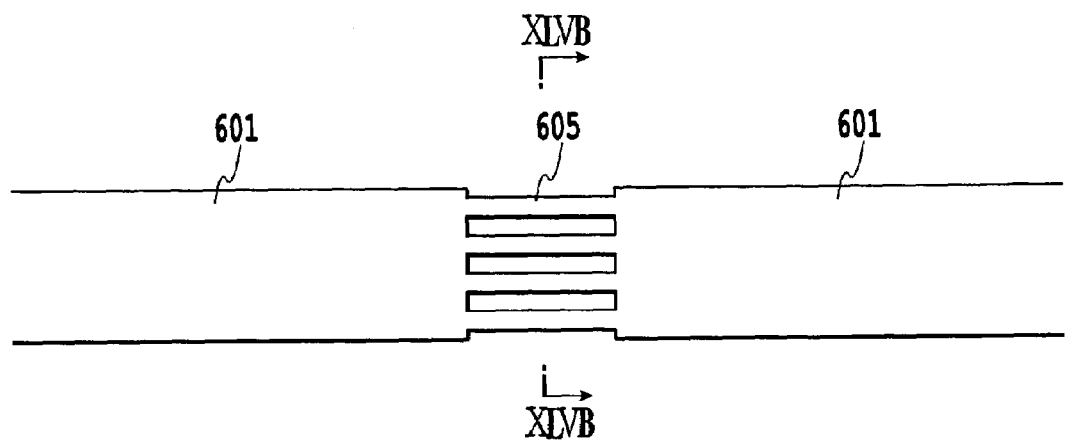
FIG. 45A is an enlarged plan view showing a configuration of a region 603 or 604 of FIG. 44.
Figure 45B:
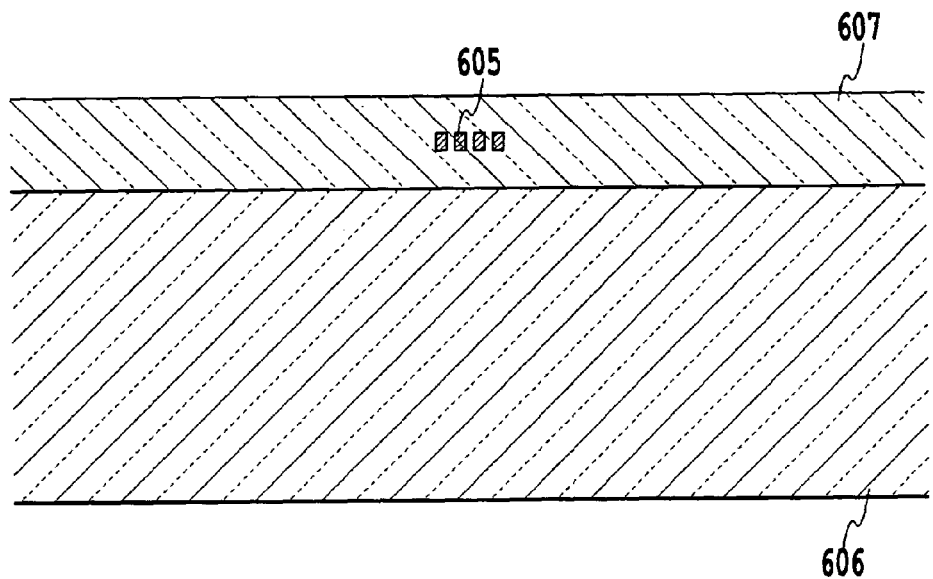
FIG. 45B is a cross-sectional view taken along a line XXXXVB—XXXXVB of FIG. 45A.

FIG. 44 is a plan view showing a schematic configuration of an optical waveguide of an 18th embodiment in accordance with the present invention; FIG. 45A is an enlarged plan view showing a region 603 or 604 of FIG. 44; and FIG. 45B is a cross-sectional view taken along a line XLVB—XLVB of FIG. 45A. The 18th embodiment is characterized by using the intersection of an optical waveguide 601 with an optical waveguide 602 as the first loss component, and by providing a stripe-like core section 605 before and after the intersection as the second loss component.

In FIG. 44 and FIGS. 45A and 45B, a cladding layer 607 composed of silica glass is formed on a silicon substrate 606. In the cladding layer 607, optical waveguides with silica glass cores are formed. The optical waveguides 601 and 602 are placed such that they intersect with each other, and the intersection angle a between them is specified depending on the entire layout of the planar lightwave circuit.

The optical waveguide 601 includes a stripe-like core section 605 that is placed at the region 603 before the intersection with the optical waveguide 602 with interposing a spacing $d_1$, and a similar stripe-like core section 605 that is placed at the region 604 after the intersection with the optical waveguide 602 with interposing a spacing $d_2$. These stripe-like core sections 605 can be formed by replacing part of the core of the optical waveguide 601 with the cladding layer 607 without any additional fabrication process.

When the light propagating through the optical waveguide 601 passes through the stripe-like core section 605, the diffraction loss occurs. This is because the light confinement to the waveguide is weakened at the stripe-like core section 605. In addition, the diffraction loss in the stripe-like core section 605 can be made smaller than the diffraction loss at the intersection of the optical waveguides 601 and 602 by adjusting the number and width of the cores in the stripe-like core section 605. Furthermore, the spacings $d_1$ and $d_2$ between the stripe-like core sections 605 and the intersection of the optical waveguides 601 and 602 can be determined at such distances that the lightwave passing through the stripe-like core section 605 can reach the intersection of the optical waveguides 601 and 602 before the leakage of the lightwave completely turns to radiation, and the lightwave passing through the intersection can reach the stripe-like core section 605 before the leakage of the lightwave completely turns to radiation.

Thus, the beam spot size of the lightwave launched into the intersection of the optical waveguides 601 and 602 can be magnified seemingly in both the horizontal and vertical directions by providing the stripe-like core section 605 before the intersection. Likewise, the magnified beam spot size of the lightwave output from the intersection of the optical waveguides 601 and 602 can be reduced seemingly in both the horizontal and vertical directions by providing the stripe-like core section 605 after the intersection. As a result, the excess loss is reduced which is involved in the propagation of the lightwave through the optical waveguide 601 including the loss component, namely, the intersection with the optical waveguide 602.

Nineteenth Embodiment

A plan view showing a schematic configuration of an optical waveguide of a 19th embodiment in accordance with the present invention is the same as that of the 18th embodiment of FIG. 44.

Figure 46A:
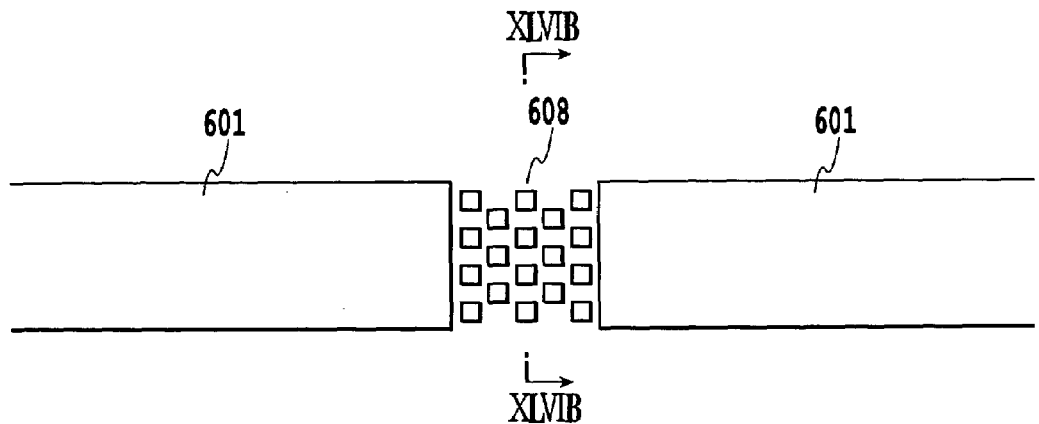
FIG. 46A is an enlarged plan view showing a configuration of the region 603 or 604 of FIG. 44 in a 19th embodiment.
Figure 46B:
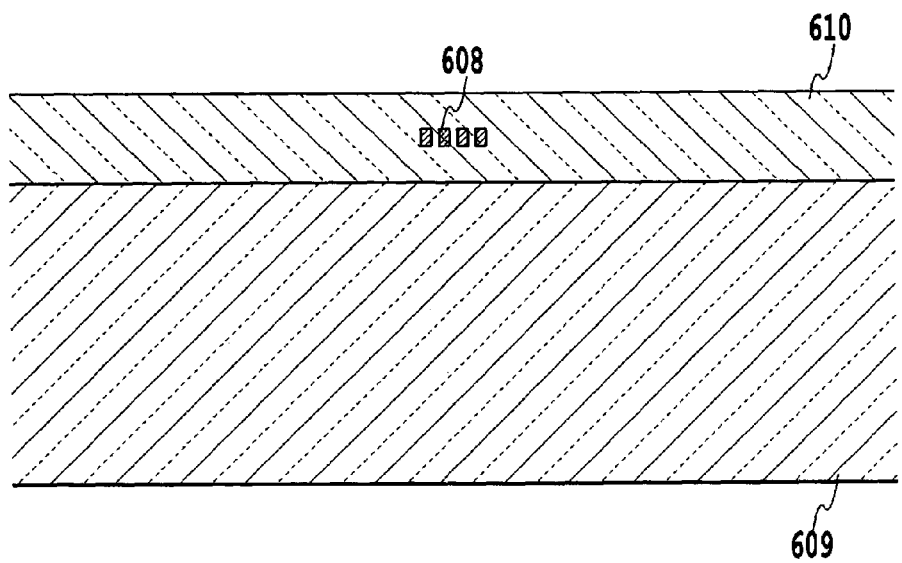
FIG. 46B is a cross-sectional view taken along a line XXXXVIB—XXXXVIB of FIG. 46A.

FIG. 46A is an enlarged plan view showing the region 603 or 604 of FIG. 44 of the 19th embodiment; and FIG. 46B is a cross-sectional view taken along a line A16—A16 of FIG. 46A. The 19th embodiment is characterized by using the intersection of the optical waveguide 601 with the optical waveguide 602 as the first loss component, and by providing distributed core sections 608 before and after the intersection as the second loss component.

In FIG. 44 and FIGS. 46A and 46B, a cladding layer 610 composed of silica glass is formed on a silicon substrate 609. In the cladding layer 610, optical waveguides with silica glass cores are formed. The optical waveguides 601 and 602 are placed such that they intersect with each other, and the intersection angle a between them is specified depending on the entire layout of the planar lightwave circuit.

The optical waveguide 601 includes a distributed core section 608 that is placed at the region 603 before the intersection with the optical waveguide 602 with interposing a spacing $d_1$, and a similar distributed core section 608 that is placed at the region 604 after the intersection with the optical waveguide 602 with interposing a spacing $d_2$. These distributed core sections 608 can be formed by replacing part of the core of the optical waveguide 601 with the cladding layer 610 without any additional fabrication process.

When the light propagating through the optical waveguide 601 passes through the distributed core section 608, the diffraction loss occurs. This is because the light confinement to the waveguide is weakened at the distributed core section 608. In addition, the diffraction loss in the distributed core section 608 can be made smaller than the diffraction loss at the intersection of the optical waveguides 601 and 602 by adjusting the size, density or length of the distribution of the distributed cores in the distributed core section 608. Furthermore, the spacings $d_1$ and $d_2$ between the distributed core sections 608 and the intersection of the optical waveguides 601 and 602 can be determined at such distances that the lightwave passing through the distributed core section 608 can reach the intersection of the optical waveguides 601 and 602 before the leakage of the lightwave completely turns to radiation, and the lightwave passing through the intersection can reach the distributed core section 608 before the leakage of the lightwave completely turns to radiation.

Thus, the beam spot size of the lightwave launched into the intersection of the optical waveguides 601 and 602 can be magnified seemingly in both the horizontal and vertical directions by providing the distributed core section 608 before the intersection. Likewise, the magnified beam spot size of the lightwave output from the intersection of the optical waveguides 601 and 602 can be reduced seemingly in both the horizontal and vertical directions by providing the distributed core section 608 after the intersection. As a result, the excess loss is reduced which is involved in the propagation of the lightwave through the optical waveguide 601 including the loss component, namely, the intersection with the optical waveguide 602.

Twentieth Embodiment

Figure 47A:
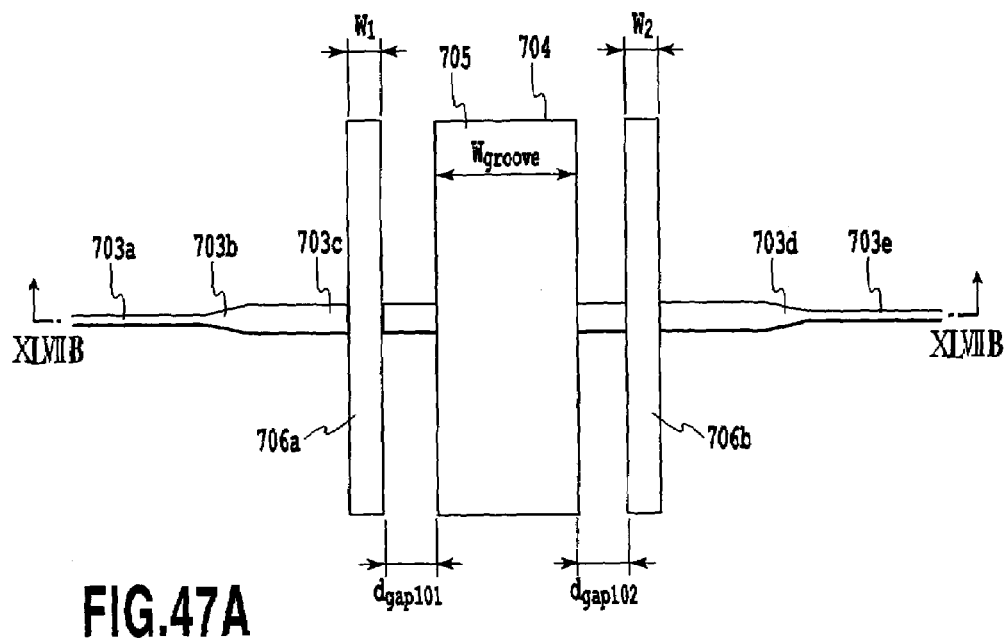
FIG. 47A is a plan view showing a configuration of an optical waveguide of a 20th embodiment in accordance with the present invention.
Figure 47B:
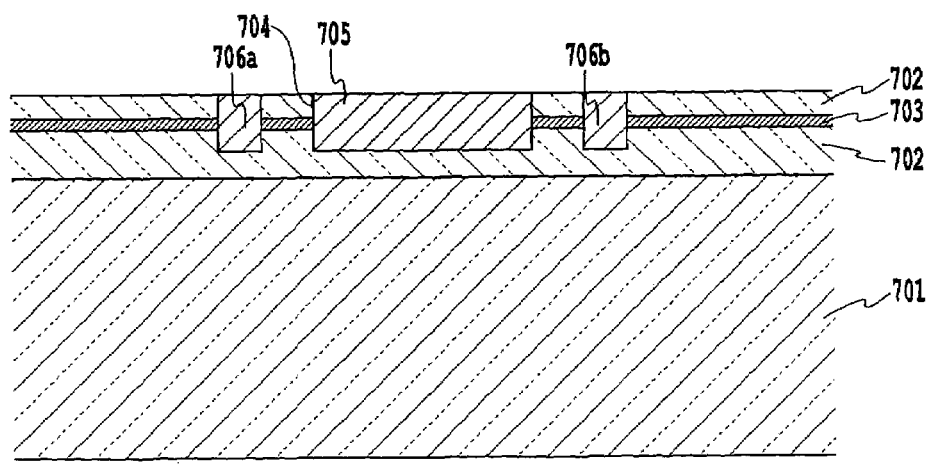
FIG. 47B is a cross-sectional view taken along a line XXXXVIIB—XXXXVIIB of FIG. 47A.

FIG. 47A is a plan view showing a configuration of an optical waveguide of a 20th embodiment in accordance with the present invention; and FIG. 47B is a cross-sectional view taken along a line XLVIIB—XLVIIB of FIG. 47A. The 20th embodiment is characterized by using a temperature compensation material 705 that fills a groove 704 as the first loss component, by providing grooves 706a and 706b filled with the same temperature compensation material before and after the groove 704 as the second loss component, and by increasing the width of the optical waveguide 703 divided by the groove 704 and grooves 706a and 706b.

In FIGS. 47 and 47B, a cladding layer 702 composed of silica glass is formed on a silicon substrate 701. In the cladding layer 702, an optical waveguide 703 with a core composed of silica glass is formed. The optical waveguide 703 includes a wide section 703c and narrow sections 703a and 703e. The wide section 703c is connected to the narrow sections 703a and 703e smoothly via tapered sections 703b and 703d.

In addition, the groove 704 with a width $W_{groove}$ is formed across the wide section 703c of the optical waveguide 703 by removing part of the cladding layer 702 and core from the optical waveguide 703 by etching.

The groove 704 is filled with a temperature compensation material 705 composed of silicone.

The wide section 703c of the optical waveguide 703 includes the groove 706a with a width $W_1$, which is filled with a temperature compensation material and placed before the groove 704 with a spacing $d_1$, and the groove 706$b$ with a width $W_2$, which is filled with the temperature compensation material and placed after the groove 704 with the spacing $d_2$. The grooves 706$a$ and 706$b$ can be formed by replacing part of the core of the optical waveguide 703 with the cladding layer 702 by etching or dicing saw processing.

The widths $W_1$ and $W_2$ of the grooves 706$a$ and 706$b$ can be determined such that the diffraction loss in the groove 706$a$ or 706$b$ becomes smaller than the diffraction loss in the groove 704 filled with the temperature compensation material 705. On the other hand, the spacings $d_1$ and $d_2$ between the groove 706$a$ and the groove 704, and between the groove 706$b$ and the groove 704 can be determined at such distances that the lightwave passing through the groove 706$a$ can reach the groove 704 before the leakage of the lightwave completely turns to radiation, and the lightwave passing through the groove 704 can reach the groove 706$b$ before the leakage of the lightwave completely turns to radiation.

In this case, the light propagating through the optical waveguide 703 passes through the groove 706$a$ with involving the diffraction loss after its beam spot size is magnified in the horizontal direction when it is launched from the narrow section 703$a$ to the wide section 703$c$. Then, the light proceeds through the groove 704 and the groove 706$b$ with involving the diffraction loss, and travels through the optical waveguide 703 with its beam spot size being shrunk in the horizontal direction when it is launched from the wide section 703$c$ to the narrow section 703$e$.

Thus, the beam spot size of the lightwave launched into the groove 704 can be further magnified seemingly, particularly in the vertical direction, by providing the groove 706$a$ before the groove 704. Likewise, the magnified beam spot size of the lightwave output from the groove 704 can be reduced seemingly, particularly in the vertical direction, by providing the groove 706$b$ after the groove 704. As a result, the excess loss is reduced which takes place during the propagation of the lightwave through the optical waveguide 703 including the loss component, that is, the groove 704.

Twenty-First Embodiment

Figure 48:
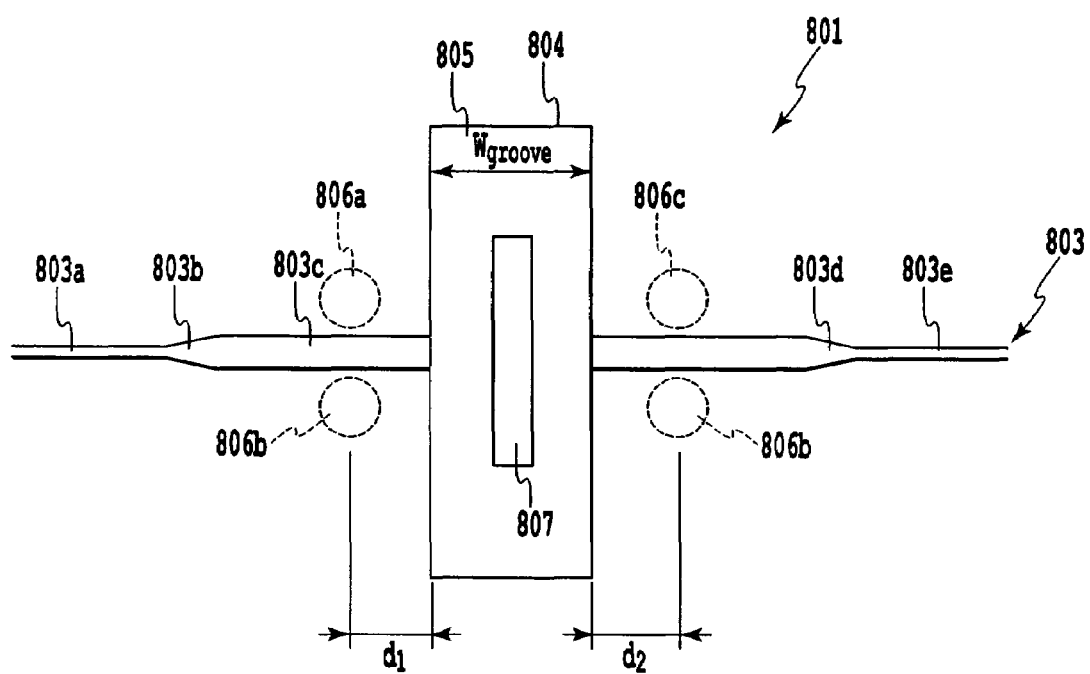
FIG. 48 is a plan view showing a configuration of an optical waveguide of a 21st embodiment in accordance with the present invention.

FIG. 48 is a plan view showing a configuration of an optical waveguide of a 21st embodiment in accordance with the present invention. The 21st embodiment is characterized by using a wavelength pass filter 807 inserted into a groove 804 and an adhesive 805 filling the groove 804 to fix the wavelength pass filter 807 as the first loss component, by providing cladding refractive index induced regions 806$a$, 806$b$, 806$c$ and 806$d$ before and after the groove 804 as the second loss component, and by increasing the width of the optical waveguide 803 divided by the groove 804, thereby providing the optical waveguide with a filtering function for transmitting a specified wavelength.

In FIG. 48, an optical waveguide 803 consisting of a silica glass core and cladding is formed on a silicon substrate 801. The optical waveguide 803 includes a wide section 803$c$ and narrow sections 803$a$ and 803$e$. The wide section 803$c$ is connected to the narrow sections 803$a$ and 803$e$ smoothly via tapered sections 803$b$ and 803$d$.

In addition, the groove 804 with a width $W_{groove}$ is formed across the wide section 803$c$ of the optical waveguide 803 by removing part of the cladding and core from the optical waveguide 803 by etching or dicing saw processing.

The groove 804 has the wavelength pass filter 807 inserted thereto and is filled with the adhesive 805 to fix the wavelength pass filter 807. The wavelength pass filter 807 is a filter for transmitting only light with a specified wavelength, and consists of a dielectric multilayer film filter.

At the wide section 803$c$ of the optical waveguide 803, the cladding refractive index induced regions 806$a$ and 806$b$ are disposed before the groove 804 with a spacing $d_1$, and the cladding refractive index induced regions 806$c$ and 806$d$ are disposed after the groove 804 with the spacing $d_2$. The cladding refractive index induced regions 806$a$, 806$b$, 806$c$ and 806$d$ can be formed by irradiating part of the cladding of the optical waveguide 803 with an ultraviolet laser beam.

When the light propagating through the optical waveguide 803 passes through the neighborhood of the cladding refractive index induced regions 806$a$, 806$b$, 806$c$ and 806$d$, the diffraction loss occurs because the light confinement to the waveguide is weakened due to the fact that the refractive index of the cladding in the regions is greater than their surroundings. In addition, the amount of the refractive index induction by the cladding refractive index induction regions 806$a$, 806$b$, 806$c$ and 806$d$ can be determined such that the diffraction loss in the immediate neighborhood of the regions becomes smaller than the diffraction loss in the groove 804 that includes the wavelength pass filter 807 and is filled with the adhesive 805. Furthermore, the spacings $d_1$ and $d_2$ between the groove 804 and the cladding refractive index induction regions 806$a$ and 806$b$, and between the groove 804 and the cladding refractive index induction regions 806$c$ and 806$d$ can be determined at such distances that the lightwave passing through the immediate neighborhood of the cladding refractive index induction regions 806$a$ and 806$b$ can reach the groove 804 before the leakage of the lightwave completely turns to radiation, and that the lightwave passing through the groove 804 can reach the cladding refractive index induction regions 806$c$ and 806$d$ before the leakage of the lightwave completely turns to radiation.

In this case, the light propagating through the optical waveguide 803 passes through the neighborhood of the cladding refractive index induced regions 806$a$ and 806$b$ with involving the diffraction loss after its beam spot size is magnified in the horizontal direction when it is launched from the narrow section 803$a$ to the wide section 803$c$. Then, the light proceeds through the groove 804 and the neighborhood of the cladding refractive index induction regions 806$c$ and 806$d$ with involving the diffraction loss, and propagates through the optical waveguide 803 with its beam spot size being reduced in the horizontal direction when it is launched from the wide section 803$c$ to the narrow section 803$e$.

Thus, the widened beam spot size of the lightwave launched into the groove 804 can be further magnified seemingly, particularly in the vertical direction, by providing the cladding refractive index induction regions 806$a$ and 806$b$ before the groove 804. Likewise, the magnified beam spot size of the lightwave output from the groove 804 can be reduced seemingly, particularly in the vertical direction, by providing the cladding refractive index induction regions 806$c$ and 806$d$ after the groove 804. As a result, the excess loss is reduced which takes place during the propagation of the lightwave through the optical waveguide 803 including the loss component, that is, the wavelength pass filter 807.

Incidentally, although the foregoing embodiments are described by way of example of a single waveguide, arrayed-waveguide grating, thermo-optic switch, external cavity frequency-stabilized laser, crossed waveguide, and wavelength pass filter, the present invention is not limited to such optical waveguide circuits, but is applicable to a variety of other optical waveguide circuits.

For example, the present invention is applicable to optical waveguide circuits in general that include the loss components for providing the diffraction loss to the lightwave propagating through the optical waveguide. The loss components can be a groove formed by removing part of the optical waveguide and opening to the surroundings; a groove formed by removing part of the optical waveguide and filled with a material such as silicone; a groove formed by removing part of the optical waveguide and including optical material and component with any desired characteristics such as a thin-film filter; a groove formed by removing part of the optical waveguide, including optical material and component with any desired characteristics such as a thin-film filter, and filled with a material such as an adhesive; or an intersection with other optical waveguides.

In addition, although the foregoing embodiments are described by way of example in which the refractive index contrast of the optical waveguide, the core width and core thickness and the like are limited to specified values, the present invention is not limited to those values.

Although part of the foregoing embodiments are described by way of example in which those items are limited to specified values such as the number of grooves and their width, the spacing between the adjacent grooves, the number of the waveguide gaps and their widths, the spacings between the adjacent waveguide gaps, the spacings between the adjacent grooves and waveguide gaps, the present invention is not limited to these values.

Although part of the foregoing embodiments describe a method of increasing the core width in the waveguide loss section, this is not essential. For example, it is possible to increase the core thickness in the waveguide loss section, to increase both the core width and core thickness in the waveguide loss section, to decrease the core width in the waveguide loss section, to decrease the core thickness in the waveguide loss section, or to decrease both the core width and core thickness in the waveguide loss section.

Although part of the foregoing embodiments are described by way of example in which the parameters of the arrayed-waveguide grating are limited to the specific values, the present invention is not limited to those values.

Although part of the foregoing embodiments are described by way of example in which the second loss component is the waveguide intersection, this is not essential. For example, a variety of other loss components such as a waveguide gap are also applicable.

Although part of the foregoing embodiments are described by way of example in which the spacings between the adjacent waveguide intersections are limited to specific values, the present invention is not limited to these values.

In addition, although part of the foregoing embodiments are described with limiting the intersection angle a of the optical waveguides 151 and 152 to 15°, the intersection angle of the optical waveguide 151 and the dummy waveguide 153 to 90°, and the intersection angle of the optical waveguide 151 and dummy waveguide 154 to 90°, the present invention is not limited to these values.

As described above, according to the present invention, the beam spot size of the lightwave launched into the first loss component is magnified seemingly by providing the optical waveguide with the second loss component that causes the diffraction loss less than the diffraction loss of the first loss component. As a result, the radiation angle of the lightwave at the first loss component can be reduced, and the excess loss involved in the propagation of light through the optical waveguide can be reduced.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

What is claimed is:

1. An optical waveguide circuit comprising:
   an optical waveguide;
   a first loss component for causing a diffraction loss to light propagating through said optical waveguide; and
   a second loss component provided at least one of before and after said first loss component,
   wherein said second component includes a region where light confinement is weakened with respect to said optical waveguide and the width of the region is determined such that a diffraction loss in the region becomes smaller than the diffraction loss in the first component, and
   wherein the spacing between the first loss component and the region is determined at such a distance that the light passing through the region can reach the first loss component before a leakage of the light at the region completely turns to radiation so that total diffraction loss at the first and second loss components becomes smaller than the diffraction loss at the first loss component without the second loss component.

2. The optical waveguide circuit as claimed in claim 1, further comprising a beam spot size varying section for varying a beam spot size of a lightwave launched into said second loss component.

3. The optical waveguide circuit as claimed in claim 1, wherein said optical waveguide comprises a cladding and core composed of silica-based glass.

4. The optical waveguide circuit as claimed in claim 3, wherein said first loss component is a groove formed by removing part of a cladding and core from said optical waveguide.

5. The optical waveguide circuit as claimed in claim 4 wherein said groove is filled with a material different from said core.

6. The optical waveguide circuit as claimed in claim 5, wherein the material filling said groove has a refractive index temperature coefficient different in sign from a temperature coefficient of an effective refractive index of said optical waveguide.

7. The optical waveguide circuit as claimed in claim 3, wherein said second loss component consists of a waveguide gap formed by replacing part of a core of said optical waveguide with a cladding.

8. The optical waveguide circuit as claimed in claim 4, wherein said second loss component consists of a waveguide gap formed by replacing part of a core of said optical waveguide with a cladding.

9. The optical waveguide circuit as claimed in claim 3, wherein said second loss component consists of a groove formed by removing part of the cladding and core from said optical waveguide, and wherein said groove is filled with air or a material with a specified refractive index.

10. The optical waveguide circuit as claimed in claim 4, wherein said second loss component consists of a groove formed by removing part of the cladding and core from said optical waveguide, and wherein said groove is filled with air or a material with a specified refractive index.

11. The optical waveguide circuit as claimed in claim 1, wherein the optical waveguide comprises:
- a first optical waveguide having a first width and first thickness;
- a second optical waveguide having a second width and second thickness; and
- a tapered section connected between said first optical waveguide and said second optical waveguide, for varying the first width and first thickness to the second width and second thickness; and
- wherein the first loss component for causing a diffraction loss to light propagating through said second optical waveguide.

12. The optical waveguide circuit as claimed in claim 11, wherein one of the following conditions holds: the first width is less than the second width; the first thickness is less than the second thickness; both the first width and first thickness are less than the second width and second thickness; the first width is greater than the second width; the first thickness is greater than the second thickness; both the first width and first thickness are greater than the second width and second thickness.

13. The optical waveguide circuit as claimed in claim 1, wherein the optical waveguide comprises:
- a first optical waveguide having a first width and first thickness;
- a second optical waveguide having a second width and second thickness;
- a third optical waveguide having a third width and third thickness;
- a first tapered section connected between said first optical waveguide and said second optical waveguide, for varying the first width and first thickness to the second width and second thickness; and
- a second tapered section connected between said second optical waveguide and said third optical waveguide, for varying the second width and second thickness to the third width and third thickness; and
- wherein the first loss component for causing a diffraction loss to light propagating through said second optical waveguide.

14. The optical waveguide circuit as claimed in claim 13, wherein one of the following conditions holds: the first width and the third width are less than the second width; the first thickness and the third thickness are less than the second thickness; the first width and the first thickness and the third width and the third thickness are less than the second width and second thickness; the first width and the third width are greater than the second width; the first thickness and the third thickness are greater than the second thickness; the first width and the first thickness and the third width and the third thickness are greater than the second width and the second thickness.

15. The optical waveguide circuit as claimed in claim 11, wherein said optical waveguide comprises a cladding and core composed of silica-based glass.

16. The optical waveguide circuit as claimed in claim 13, wherein said optical waveguide comprises a cladding and core composed of silica-based glass.

17. The optical waveguide circuit as claimed in claim 15, wherein said first loss component is a groove formed by removing part of a cladding and core from said optical waveguide.

18. The optical waveguide circuit as claimed in claim 16, wherein said first loss component is a groove formed by removing part of a cladding and core from said optical waveguide.

19. The optical waveguide circuit as claimed in claim 4, wherein said groove consists of a plurality of grooves disposed at specified spacings.

20. The optical waveguide circuit as claimed in claim 17, wherein said groove consists of a plurality of grooves disposed at specified spacings.

21. The optical waveguide circuit as claimed in claim 18, wherein said groove consists of a plurality of grooves disposed at specified spacings.

22. The optical waveguide circuit as claimed in claim 17, wherein said groove is filled with a material different from said core.

23. The optical waveguide circuit as claimed in claim 18, wherein said groove is filled with a material different from said core.

24. The optical waveguide circuit as claimed in claim 22, wherein the material filling said groove has a refractive index temperature coefficient different in sign from a temperature coefficient of an effective refractive index of said optical waveguide.

25. The optical waveguide circuit as claimed in claim 23, wherein the material filling said groove has a refractive index temperature coefficient different in sign from a temperature coefficient of an effective refractive index of said optical waveguide.

26. The optical waveguide circuit as claimed in claim 4, wherein said groove includes an element with a specified function.

27. The optical waveguide circuit as claimed in claim 17, wherein said groove includes an element with a specified function.

28. The optical waveguide circuit as claimed in claim 18, wherein said groove includes an element with a specified function.

29. The optical waveguide circuit as claimed in claim 26, wherein said element is fixed with an adhesive filling said groove.

30. The optical waveguide circuit as claimed in claim 27, wherein said element is fixed with an adhesive filling said groove.

31. The optical waveguide circuit as claimed in claim 28, wherein said element is fixed with an adhesive filling said groove.

32. The optical waveguide circuit as claimed in claim 26, wherein said element consists of a half wavelength plate.

33. The optical waveguide circuit as claimed in claim 27, wherein said element consists of a half wavelength plate.

34. The optical waveguide circuit as claimed in claim 28, wherein said element consists of a half wavelength plate.

35. The optical waveguide circuit as claimed in claim 26, wherein said element consists of a wavelength pass filter that transmits only light with a specified wavelength.

36. The optical waveguide circuit as claimed in claim 27, wherein said element consists of a wavelength pass filter that transmits only light with a specified wavelength.

37. The optical waveguide circuit as claimed in claim 28, wherein said element consists of a wavelength pass filter that transmits only light with a specified wavelength.

38. The optical waveguide circuit as claimed in claim 15, wherein said second loss component consists of a waveguide gap formed by replacing part of a core of said optical waveguide with a cladding.

39. The optical waveguide circuit as claimed in claim 26, wherein said second loss component consists of a waveguide gap formed by replacing part of a core of said optical waveguide with a cladding.

40. The optical waveguide circuit as claimed in claim 17, wherein said second loss component consists of a waveguide gap formed by replacing part of a core of said optical waveguide with a cladding.

41. The optical waveguide circuit as claimed in claim 18, wherein said second loss component consists of a waveguide gap formed by replacing part of a core of said optical waveguide with a cladding.

42. The optical waveguide circuit as claimed in claim 7, wherein said waveguide gap consists of a plurality of waveguide gaps disposed at least one of before and after said first loss component with a specified spacing, and said waveguide gaps reduce their width as they are distant from said first loss component.

43. The optical waveguide circuit as claimed in claim 38, wherein said waveguide gap consists of a plurality of waveguide gaps disposed at least one of before and after said first loss component with a specified spacing, and said waveguide gaps reduce their width as they are distant from said first loss component.

44. The optical waveguide circuit as claimed in claim 39, wherein said waveguide gap consists of a plurality of waveguide gaps disposed at least one of before and after said first loss component with a specified spacing, and said waveguide gaps reduce their width as they are distant from said first loss component.

45. The optical waveguide circuit as claimed in claim 8, wherein said waveguide gap consists of a plurality of waveguide gaps disposed at least one of before and after said first loss component with a specified spacing, and said waveguide gaps reduce their width as they are distant from said first loss component.

46. The optical waveguide circuit as claimed in claim 40, wherein said waveguide gap consists of a plurality of waveguide gaps disposed at least one of before and after said first loss component with a specified spacing, and said waveguide gaps reduce their width as they are distant from said first loss component.

47. The optical waveguide circuit as claimed in claim 41, wherein said waveguide gap consists of a plurality of waveguide gaps disposed at least one of before and after said first loss component with a specified spacing, and said waveguide gaps reduce their width as they are distant from said first loss component.

48. The optical waveguide circuit as claimed in claim 6, wherein
said optical waveguide comprises a plurality of arrayed-waveguides; and
said groove is formed across said arrayed-waveguides, and wherein said optical waveguide circuit further comprises:
slab waveguides connected to both ends of said arrayed-waveguides.

49. The optical waveguide circuit as claimed in claim 24, wherein
said optical waveguide comprises a plurality of arrayed-waveguides; and
said groove is formed across said arrayed-waveguides, and wherein said optical waveguide circuit further comprises:
slab waveguides connected to both ends of said arrayed-waveguides.

50. The optical waveguide circuit as claimed in claim 25, wherein
said optical waveguide comprises a plurality of arrayed-waveguides; and
said groove is formed across said arrayed-waveguides, and wherein said optical waveguide circuit further comprises:
slab waveguides connected to both ends of said arrayed-waveguides.

51. The optical waveguide circuit as claimed in claim 32, wherein
said optical waveguide comprises a plurality of arrayed-waveguides; and
said groove is formed across said arrayed-waveguides, and wherein said optical waveguide circuit further comprises:
slab waveguides connected to both ends of said arrayed-waveguides.

52. The optical waveguide circuit as claimed in claim 33, wherein
said optical waveguide comprises a plurality of arrayed-waveguides; and
said groove is formed across said arrayed-waveguides, and wherein said optical waveguide circuit further comprises:
slab waveguides connected to both ends of said arrayed-waveguides.

53. The optical waveguide circuit as claimed in claim 34, wherein
said optical waveguide comprises a plurality of arrayed-waveguides; and
said groove is formed across said arrayed-waveguides, and wherein said optical waveguide circuit further comprises:
slab waveguides connected to both ends of said arrayed-waveguides.

54. The optical waveguide circuit as claimed in claim 7, wherein
said optical waveguide comprises a plurality of arrayed-waveguides; and
said groove is formed across said arrayed-waveguides, and wherein said optical waveguide circuit further comprises:
slab waveguides connected to both ends of said arrayed-waveguides.

55. The optical waveguide circuit as claimed in claim 38, wherein
said optical waveguide comprises a plurality of arrayed-waveguides; and
said groove is formed across said arrayed-waveguides, and wherein said optical waveguide circuit further comprises:
slab waveguides connected to both ends of said arrayed-waveguides.

56. The optical waveguide circuit as claimed in claim 39, wherein
said optical waveguide comprises a plurality of arrayed-waveguides; and
said groove is formed across said arrayed-waveguides, and wherein said optical waveguide circuit further comprises:
slab waveguides connected to both ends of said arrayed-waveguides.

57. The optical waveguide circuit as claimed in claims 8, wherein
said optical waveguide comprises a plurality of arrayed-waveguides; and
said groove is formed across said arrayed-waveguides, and wherein said optical waveguide circuit further comprises:

slab waveguides connected to both ends of said arrayed-waveguides.

58. The optical waveguide circuit as claimed in claim 40, wherein
said optical waveguide comprises a plurality of arrayed-waveguides; and
said groove is formed across said arrayed-waveguides, and wherein said optical waveguide circuit further comprises:
slab waveguides connected to both ends of said arrayed-waveguides.

59. The optical waveguide circuit as claimed in claim 41, wherein
said optical waveguide comprises a plurality of arrayed-waveguides; and
said groove is formed across said arrayed-waveguides, and wherein said optical waveguide circuit further comprises:
slab waveguides connected to both ends of said arrayed-waveguides.

60. The optical waveguide circuit as claimed in claim 6, wherein
said optical waveguide comprises two arm waveguides with different length; and
said groove is formed across at least one of said arm waveguides, and wherein said optical waveguide circuit further comprises:
directional couplers connected to both ends of said arm waveguides.

61. The optical waveguide circuit as claimed in claim 24, wherein
said optical waveguide comprises two arm waveguides with different length; and
said groove is formed across at least one of said arm waveguides, and wherein said optical waveguide circuit further comprises:
directional couplers connected to both ends of said arm waveguides.

62. The optical waveguide circuit as claimed in claim 25, wherein
said optical waveguide comprises two arm waveguides with different length; and
said groove is formed across at least one of said arm waveguides, and wherein said optical waveguide circuit further comprises:
directional couplers connected to both ends of said arm waveguides.

63. The optical waveguide circuit as claimed in claim 7, wherein
said optical waveguide comprises two arm waveguides with different length; and
said groove is formed across at least one of said arm waveguides, and wherein said optical waveguide circuit further comprises:
directional couplers connected to both ends of said arm waveguides.

64. The optical waveguide circuit as claimed in claim 38, wherein
said optical waveguide comprises two arm waveguides with different length; and
said groove is formed across at least one of said arm waveguides, and wherein said optical waveguide circuit further comprises:
directional couplers connected to both ends of said arm waveguides.

65. The optical waveguide circuit as claimed in claim 39, wherein
said optical waveguide comprises two arm waveguides with different length; and
said groove is formed across at least one of said arm waveguides, and wherein said optical waveguide circuit further comprises:
directional couplers connected to both ends of said arm waveguides.

66. The optical waveguide circuit as claimed in claim 8, wherein
said optical waveguide comprises two arm waveguides with different length; and
said groove is formed across at least one of said arm waveguides, and wherein said optical waveguide circuit further comprises:
directional couplers connected to both ends of said arm waveguides.

67. The optical waveguide circuit as claimed in claim 40, wherein
said optical waveguide comprises two arm waveguides with different length; and
said groove is formed across at least one of said arm waveguides, and wherein said optical waveguide circuit further comprises:
directional couplers connected to both ends of said arm waveguides.

68. The optical waveguide circuit as claimed in claim 41, wherein
said optical waveguide comprises two arm waveguides with different length; and
said groove is formed across at least one of said arm waveguides, and wherein said optical waveguide circuit further comprises:
directional couplers connected to both ends of said arm waveguides.

69. The optical waveguide circuit as claimed in claim 6, further comprising:
a UV written grating in said optical waveguide; and
a semiconductor laser diode mounted at an end of said optical waveguide, wherein
said groove is formed across said optical waveguide between said UV written grating and said semiconductor laser diode.

70. The optical waveguide circuit as claimed in claim 24, further comprising:
a UV written grating in said optical waveguide; and
a semiconductor laser diode mounted at an end of said optical waveguide, wherein
said groove is formed across said optical waveguide between said UV written grating and said semiconductor laser diode.

71. The optical waveguide circuit as claimed in claim 25, further comprising:
a UV written grating in said optical waveguide; and
a semiconductor laser diode mounted at an end of said optical waveguide, wherein
said groove is formed across said optical waveguide between said UV written grating and said semiconductor laser diode.

72. The optical waveguide circuit as claimed in claim 7, further comprising:
a UV written grating in said optical waveguide; and
a semiconductor laser diode mounted at an end of said optical waveguide, wherein said groove is formed across said optical waveguide between said UV written grating and said semiconductor laser diode.

73. The optical waveguide circuit as claimed in claim 38, further comprising:
a UV written grating in said optical waveguide; and
a semiconductor laser diode mounted at an end of said optical waveguide, wherein
said groove is formed across said optical waveguide between said UV written grating and said semiconductor laser diode.

74. The optical waveguide circuit as claimed in claim 39, further comprising:
a UV written grating in said optical waveguide; and
a semiconductor laser diode mounted at an end of said optical waveguide, wherein
said groove is formed across said optical waveguide between said UV written grating and said semiconductor laser diode.

75. The optical waveguide circuit as claimed in claim 8, further comprising:
a UV written grating in said optical waveguide; and
a semiconductor laser diode mounted at an end of said optical waveguide, wherein
said groove is formed across said optical waveguide between said UV written grating and said semiconductor laser diode.

76. The optical waveguide circuit as claimed in claim 40, further comprising:
a UV written grating in said optical waveguide; and
a semiconductor laser diode mounted at an end of said optical waveguide, wherein
said groove is formed across said optical waveguide between said UV written grating and said semiconductor laser diode.

77. The optical waveguide circuit as claimed in claim 41, further comprising:
a UV written grating in said optical waveguide; and
a semiconductor laser diode mounted at an end of said optical waveguide, wherein
said groove is formed across said optical waveguide between said UV written grating and said semiconductor laser diode.

78. The optical waveguide circuit as claimed in claim 3, wherein said first loss component consists of an intersection of said optical waveguide and another optical waveguide.

79. The optical waveguide circuit as claimed in claim 15, wherein said first loss component consists of an intersection of said optical waveguide and another optical waveguide.

80. The optical waveguide circuit as claimed in claim 16, wherein said first loss component consists of an intersection of said optical waveguide and another optical waveguide.

81. The optical waveguide circuit as claimed in claim 1, wherein said optical waveguide consists of a slab waveguide.

82. The optical waveguide circuit as claimed in claim 81, wherein said slab waveguide comprises a cladding and core composed of silica-based glass.

83. The optical waveguide circuit as claimed in claim 82, wherein said first loss component consists of a groove formed by removing part of the cladding and core of said slab waveguide.

84. The optical waveguide circuit as claimed in claim 83, wherein said groove consists of a plurality of grooves that divide said slab waveguide, and have uneven widths in accordance with positions of dividing said slab waveguide.

85. The optical waveguide circuit as claimed in claim 83, wherein said groove consists of a plurality of grooves that are placed at specified spacings.

86. The optical waveguide circuit as claimed in claim 83, wherein said groove is filled with a material different from a material of said core.

87. The optical waveguide circuit as claimed in claim 86, wherein the material filling said groove has refractive index temperature dependence with a sign opposite to a sign of a temperature coefficient of an effective refractive index of said slab waveguide.

88. The optical waveguide circuit as claimed in claim 83, wherein said groove includes an element with a specified function.

89. The optical waveguide circuit as claimed in claim 88, wherein said element is fixed with an adhesive filling said groove.

90. The optical waveguide circuit as claimed in claim 88, wherein said element consists of a half wavelength plate.

91. The optical waveguide circuit as claimed in claim 82, wherein said second loss component consists of a waveguide gap formed by replacing part of the core of said slab waveguide with the cladding.

92. The optical waveguide circuit as claimed in claim 83, wherein said second loss component consists of a waveguide gap formed by replacing part of the core of said slab waveguide with the cladding.

93. The optical waveguide circuit as claimed in claim 91, wherein said waveguide gap consists of a plurality of waveguide gaps that divide said slab waveguide, and varies its widths in accordance with positions of dividing said slab waveguide.

94. The optical waveguide circuit as claimed in claim 92, wherein said waveguide gap consists of a plurality of waveguide gaps that divide said slab waveguide, and varies its widths in accordance with positions of dividing said slab waveguide.

95. The optical waveguide circuit as claimed in claim 91, wherein said waveguide gap consists of a plurality of waveguide gaps disposed at least one of before and after said first loss component with a specified spacing between said waveguide gaps, and said waveguide gaps reduce their width as they are distant from said first loss component.

96. The optical waveguide circuit as claimed in claim 92, wherein said waveguide gap consists of a plurality of waveguide gaps disposed at least one of before and after said first loss component with a specified spacing between said waveguide gaps, and said waveguide gaps reduce their width as they are distant from said first loss component.

97. The optical waveguide circuit as claimed in claim 87, wherein said optical waveguide circuit comprises:
two slab waveguides consisting of first and second slab waveguides;
arrayed-waveguides for interconnecting first ends of said first and second slab waveguides; and
input and output waveguides connected to second ends of said first and second slab waveguides, respectively, and wherein
said groove is formed across at least one of said two slab waveguides.

98. The optical waveguide circuit as claimed in claim 90, wherein said optical waveguide circuit comprises:
two slab waveguides consisting of first and second slab waveguides;
arrayed-waveguides for interconnecting first ends of said first and second slab waveguides; and input and output waveguides connected to second ends of said first and second slab waveguides, respectively, and wherein said groove is formed across at least one of said two slab waveguides.

99. The optical waveguide circuit as claimed in claim 91, wherein said optical waveguide circuit comprises:
two slab waveguides consisting of first and second slab waveguides;
arrayed-waveguides for interconnecting first ends of said first and second slab waveguides; and
input and output waveguides connected to second ends of said first and second slab waveguides, respectively, and wherein
said groove is formed across at least one of said two slab waveguides.

100. The optical waveguide circuit as claimed in claim 92, wherein said optical waveguide circuit comprises:
two slab waveguides consisting of first and second slab waveguides;
arrayed-waveguides for interconnecting first ends of said first and second slab waveguides; and
input and output waveguides connected to second ends of said first and second slab waveguides, respectively, and wherein
said groove is formed across at least one of said two slab waveguides.

101. The optical waveguide circuit as claimed in claim 3, wherein said second loss component consists of a stripe-like core formed by replacing part of the core of said optical waveguide with the cladding in a stripe-like shape.

102. The optical waveguide circuit as claimed in claim 15, wherein said second loss component consists of a stripe-like core formed by replacing part of the core of said optical waveguide with the cladding in a stripe-like shape.

103. The optical waveguide circuit as claimed in claim 16, wherein said second loss component consists of a stripe-like core formed by replacing part of the core of said optical waveguide with the cladding in a stripe-like shape.

104. The optical waveguide circuit as claimed in claim 4, wherein said second loss component consists of a stripe-like core formed by replacing part of the core of said optical waveguide with the cladding in a stripe-like shape.

105. The optical waveguide circuit as claimed in claim 17, wherein said second loss component consists of a stripe-like core formed by replacing part of the core of said optical waveguide with the cladding in a stripe-like shape.

106. The optical waveguide circuit as claimed in claim 18, wherein said second loss component consists of a stripe-like core formed by replacing part of the core of said optical waveguide with the cladding in a stripe-like shape.

107. The optical waveguide circuit as claimed in claim 48, wherein said second loss component consists of a stripe-like core formed by replacing part of the core of said optical waveguide with the cladding in a stripe-like shape.

108. The optical waveguide circuit as claimed in claim 49, wherein said second loss component consists of a stripe-like core formed by replacing part of the core of said optical waveguide with the cladding in a stripe-like shape.

109. The optical waveguide circuit as claimed in claim 50, wherein said second loss component consists of a stripe-like core formed by replacing part of the core of said optical waveguide with the cladding in a stripe-like shape.

110. The optical waveguide circuit as claimed in claim 51, wherein said second loss component consists of a stripe-like core formed by replacing part of the core of said optical waveguide with the cladding in a stripe-like shape.

111. The optical waveguide circuit as claimed in claim 52, wherein said second loss component consists of a stripe-like core formed by replacing part of the core of said optical waveguide with the cladding in a stripe-like shape.

112. The optical waveguide circuit as claimed in claim 53, wherein said second loss component consists of a stripe-like core formed by replacing part of the core of said optical waveguide with the cladding in a stripe-like shape.

113. The optical waveguide circuit as claimed in claim 54, wherein said second loss component consists of a stripe-like core formed by replacing part of the core of said optical waveguide with the cladding in a stripe-like shape.

114. The optical waveguide circuit as claimed in claim 55, wherein said second loss component consists of a stripe-like core formed by replacing part of the core of said optical waveguide with the cladding in a stripe-like shape.

115. The optical waveguide circuit as claimed in claim 56, wherein said second loss component consists of a stripe-like core formed by replacing part of the core of said optical waveguide with the cladding in a stripe-like shape.

116. The optical waveguide circuit as claimed in claim 57, wherein said second loss component consists of a stripe-like core formed by replacing part of the core of said optical waveguide with the cladding in a stripe-like shape.

117. The optical waveguide circuit as claimed in claim 58, wherein said second loss component consists of a stripe-like core formed by replacing part of the core of said optical waveguide with the cladding in a stripe-like shape.

118. The optical waveguide circuit as claimed in claim 59, wherein said second loss component consists of a stripe-like core formed by replacing part of the core of said optical waveguide with the cladding in a stripe-like shape.

119. The optical waveguide circuit as claimed in claim 82, wherein said second loss component consists of a stripe-like core formed by replacing part of the core of said optical waveguide with the cladding in a stripe-like shape.

120. The optical waveguide circuit as claimed in claim 83, wherein said second loss component consists of a stripe-like core formed by replacing part of the core of said optical waveguide with the cladding in a stripe-like shape.

121. The optical waveguide circuit as claimed in claim 3, wherein said second loss component consists of a distributed core formed by replacing part of the core of said optical waveguide with the cladding in a dotted shape.

122. The optical waveguide circuit as claimed in claim 15, wherein said second loss component consists of a distributed core formed by replacing part of the core of said optical waveguide with the cladding in a dotted shape.

123. The optical waveguide circuit as claimed in claim 16, wherein said second loss component consists of a distributed core formed by replacing part of the core of said optical waveguide with the cladding in a dotted shape.

124. The optical waveguide circuit as claimed in claim 4, wherein said second loss component consists of a distributed core formed by replacing part of the core of said optical waveguide with the cladding in a dotted shape.

125. The optical waveguide circuit as claimed in claim 17, wherein said second loss component consists of a distributed core formed by replacing part of the core of said optical waveguide with the cladding in a dotted shape.

126. The optical waveguide circuit as claimed in claim 18 wherein said second loss component consists of a distributed core formed by replacing part of the core of said optical waveguide with the cladding in a dotted shape.

127. The optical waveguide circuit as claimed in claim 48, wherein said second loss component consists of a distributed

128. The optical waveguide circuit as claimed in claim 49, wherein said second loss component consists of a distributed core formed by replacing part of the core of said optical waveguide with the cladding in a dotted shape.

129. The optical waveguide circuit as claimed in claim 50, wherein said second loss component consists of a distributed core formed by replacing part of the core of said optical waveguide with the cladding in a dotted shape.

130. The optical waveguide circuit as claimed in claim 51, wherein said second loss component consists of a distributed core formed by replacing part of the core of said optical waveguide with the cladding in a dotted shape.

131. The optical waveguide circuit as claimed in claim 52, wherein said second loss component consists of a distributed core formed by replacing part of the core of said optical waveguide with the cladding in a dotted shape.

132. The optical waveguide circuit as claimed in claim 53, wherein said second loss component consists of a distributed core formed by replacing part of the core of said optical waveguide with the cladding in a dotted shape.

133. The optical waveguide circuit as claimed in claim 54, wherein said second loss component consists of a distributed core formed by replacing part of the core of said optical waveguide with the cladding in a dotted shape.

134. The optical waveguide circuit as claimed in claim 55, wherein said second loss component consists of a distributed core formed by replacing part of the core of said optical waveguide with the cladding in a dotted shape.

135. The optical waveguide circuit as claimed in claim 56, wherein said second loss component consists of a distributed core formed by replacing part of the core of said optical waveguide with the cladding in a dotted shape.

136. The optical waveguide circuit as claimed in claim 57, wherein said second loss component consists of a distributed core formed by replacing part of the core of said optical waveguide with the cladding in a dotted shape.

137. The optical waveguide circuit as claimed in claim 58, wherein said second loss component consists of a distributed core formed by replacing part of the core of said optical waveguide with the cladding in a dotted shape.

138. The optical waveguide circuit as claimed in claim 59, wherein said second loss component consists of a distributed core formed by replacing part of the core of said optical waveguide with the cladding in a dotted shape.

139. The optical waveguide circuit as claimed in claim 82, wherein said second loss component consists of a distributed core formed by replacing part of the core of said optical waveguide with the cladding in a dotted shape.

140. The optical waveguide circuit as claimed in claim 83, wherein said second loss component consists of a distributed core formed by replacing part of the core of said optical waveguide with the cladding in a dotted shape.

141. The optical waveguide circuit as claimed in claim 15, wherein said second loss component consists of a groove formed by removing part of the cladding and core from said optical waveguide, and wherein said groove is filled with air or a material with a specified refractive index.

142. The optical waveguide circuit as claimed in claim 16, wherein said second loss component consists of a groove formed by removing part of the cladding and core from said optical waveguide, and wherein said groove is filled with air or a material with a specified refractive index.

143. The optical waveguide circuit as claimed in claim 17, wherein said second loss component consists of a groove formed by removing part of the cladding and core from said optical waveguide, and wherein said groove is filled with air or a material with a specified refractive index.

144. The optical waveguide circuit as claimed in claim 18, wherein said second loss component consists of a groove formed by removing part of the cladding and core from said optical waveguide, and wherein said groove is filled with air or a material with a specified refractive index.

145. The optical waveguide circuit as claimed in claim 48, wherein said second loss component consists of a groove formed by removing part of the cladding and core from said optical waveguide, and wherein said groove is filled with air or a material with a specified refractive index.

146. The optical waveguide circuit as claimed in claim 49, wherein said second loss component consists of a groove formed by removing part of the cladding and core from said optical waveguide, and wherein said groove is filled with air or a material with a specified refractive index.

147. The optical waveguide circuit as claimed in claim 50, wherein said second loss component consists of a groove formed by removing part of the cladding and core from said optical waveguide, and wherein said groove is filled with air or a material with a specified refractive index.

148. The optical waveguide circuit as claimed in claim 51, wherein said second loss component consists of a groove formed by removing part of the cladding and core from said optical waveguide, and wherein said groove is filled with air or a material with a specified refractive index.

149. The optical waveguide circuit as claimed in claim 52, wherein said second loss component consists of a groove formed by removing part of the cladding and core from said optical waveguide, and wherein said groove is filled with air or a material with a specified refractive index.

150. The optical waveguide circuit as claimed in claim 53, wherein said second loss component consists of a groove formed by removing part of the cladding and core from said optical waveguide, and wherein said groove is filled with air or a material with a specified refractive index.

151. The optical waveguide circuit as claimed in claim 54, wherein said second loss component consists of a groove formed by removing part of the cladding and core from said optical waveguide, and wherein said groove is filled with air or a material with a specified refractive index.

152. The optical waveguide circuit as claimed in claim 55, wherein said second loss component consists of a groove formed by removing part of the cladding and core from said optical waveguide, and wherein said groove is filled with air or a material with a specified refractive index.

153. The optical waveguide circuit as claimed in claim 56, wherein said second loss component consists of a groove formed by removing part of the cladding and core from said optical waveguide, and wherein said groove is filled with air or a material with a specified refractive index.

154. The optical waveguide circuit as claimed in claim 57, wherein said second loss component consists of a groove formed by removing part of the cladding and core from said optical waveguide, and wherein said groove is filled with air or a material with a specified refractive index.

155. The optical waveguide circuit as claimed in claim 58, wherein said second loss component consists of a groove formed by removing part of the cladding and core from said optical waveguide, and wherein said groove is filled with air or a material with a specified refractive index.

156. The optical waveguide circuit as claimed in claim 59, wherein said second loss component consists of a groove formed by removing part of the cladding and core from said optical waveguide, and wherein said groove is filled with air or a material with a specified refractive index.

157. The optical waveguide circuit as claimed in claim 82, wherein said second loss component consists of a groove formed by removing part of the cladding and core from said optical waveguide, and wherein said groove is filled with air or a material with a specified refractive index.

158. The optical waveguide circuit as claimed in claim 83, wherein said second loss component consists of a groove formed by removing part of the cladding and core from said optical waveguide, and wherein said groove is filled with air or a material with a specified refractive index.

159. The optical waveguide circuit as claimed in claim 3, wherein said second loss component consists of an intersection of said optical waveguide and another optical waveguide.

160. The optical waveguide circuit as claimed in claim 15, wherein said second loss component consists of an intersection of said optical waveguide and another optical waveguide.

161. The optical waveguide circuit as claimed in claim 16, wherein said second loss component consists of an intersection of said optical waveguide and another optical waveguide.

162. The optical waveguide circuit as claimed in claim 4, wherein said second loss component consists of an intersection of said optical waveguide and another optical waveguide.

163. The optical waveguide circuit as claimed in claim 17, wherein said second loss component consists of an intersection of said optical waveguide and another optical waveguide.

164. The optical waveguide circuit as claimed in claim 18, wherein said second loss component consists of an intersection of said optical waveguide and another optical waveguide.

165. The optical waveguide circuit as claimed in claim 48, wherein said second loss component consists of an intersection of said optical waveguide and another optical waveguide.

166. The optical waveguide circuit as claimed in claim 49, wherein said second loss component consists of an intersection of said optical waveguide and another optical waveguide.

167. The optical waveguide circuit as claimed in claim 50, wherein said second loss component consists of an intersection of said optical waveguide and another optical waveguide.

168. The optical waveguide circuit as claimed in claim 51, wherein said second loss component consists of an intersection of said optical waveguide and another optical waveguide.

169. The optical waveguide circuit as claimed in claim 52, wherein said second loss component consists of an intersection of said optical waveguide and another optical waveguide.

170. The optical waveguide circuit as claimed in claim 53, wherein said second loss component consists of an intersection of said optical waveguide and another optical waveguide.

171. The optical waveguide circuit as claimed in claim 54, wherein said second loss component consists of an intersection of said optical waveguide and another optical waveguide.

172. The optical waveguide circuit as claimed in claim 55, wherein said second loss component consists of an intersection of said optical waveguide and another optical waveguide.

173. The optical waveguide circuit as claimed in claim 56, wherein said second loss component consists of an intersection of said optical waveguide and another optical waveguide.

174. The optical waveguide circuit as claimed in claim 57, wherein said second loss component consists of an intersection of said optical waveguide and another optical waveguide.

175. The optical waveguide circuit as claimed in claim 58, wherein said second loss component consists of an intersection of said optical waveguide and another optical waveguide.

176. The optical waveguide circuit as claimed in claim 59, wherein said second loss component consists of an intersection of said optical waveguide and another optical waveguide.

177. The optical waveguide circuit as claimed in claim 3, wherein said second loss component consists of a region having, by laser irradiation of part of the cladding of said optical waveguide, a refractive index higher than a refractive index of a region of the cladding not subjected to the laser irradiation.

178. The optical waveguide circuit as claimed in claim 15, wherein said second loss component consists of a region having, by laser irradiation of part of the cladding of said optical waveguide, a refractive index higher than a refractive index of a region of the cladding not subjected to the laser irradiation.

179. The optical waveguide circuit as claimed in claim 16, wherein said second loss component consists of a region having, by laser irradiation of part of the cladding of said optical waveguide, a refractive index higher than a refractive index of a region of the cladding not subjected to the laser irradiation.

180. The optical waveguide circuit as claimed in claim 4, wherein said second loss component consists of a region having, by laser irradiation of part of the cladding of said optical waveguide, a refractive index higher than a refractive index of a region of the cladding not subjected to the laser irradiation.

181. The optical waveguide circuit as claimed in claim 17 wherein said second loss component consists of a region having, by laser irradiation of part of the cladding of said optical waveguide, a refractive index higher than a refractive index of a region of the cladding not subjected to the laser irradiation.

182. The optical waveguide circuit as claimed in claim 18, wherein said second loss component consists of a region having, by laser irradiation of part of the cladding of said optical waveguide, a refractive index higher than a refractive index of a region of the cladding not subjected to the laser irradiation.

183. The optical waveguide circuit as claimed in claim 48, wherein said second loss component consists of a region having, by laser irradiation of part of the cladding of said optical waveguide, a refractive index higher than a refractive index of a region of the cladding not subjected to the laser irradiation.

184. The optical waveguide circuit as claimed in claim 49, wherein said second loss component consists of a region having, by laser irradiation of part of the cladding of said optical waveguide, a refractive index higher than a refractive index of a region of the cladding not subjected to the laser irradiation.

185. The optical waveguide circuit as claimed in claim 50, wherein said second loss component consists of a region having, by laser irradiation of part of the cladding of said

186. The optical waveguide circuit as claimed in claim 51, wherein said second loss component consists of a region having, by laser irradiation of part of the cladding of said optical waveguide, a refractive index higher than a refractive index of a region of the cladding not subjected to the laser irradiation.

187. The optical waveguide circuit as claimed in claim 52, wherein said second loss component consists of a region having, by laser irradiation of part of the cladding of said optical waveguide, a refractive index higher than a refractive index of a region of the cladding not subjected to the laser irradiation.

188. The optical waveguide circuit as claimed in claim 53, wherein said second loss component consists of a region having, by laser irradiation of part of the cladding of said optical waveguide, a refractive index higher than a refractive index of a region of the cladding not subjected to the laser irradiation.

189. The optical waveguide circuit as claimed in claim 54, wherein said second loss component consists of a region having, by laser irradiation of part of the cladding of said optical waveguide, a refractive index higher than a refractive index of a region of the cladding not subjected to the laser irradiation.

190. The optical waveguide circuit as claimed in claim 55 wherein said second loss component consists of a region having, by laser irradiation of part of the cladding of said optical waveguide, a refractive index higher than a refractive index of a region of the cladding not subjected to the laser irradiation.

191. The optical waveguide circuit as claimed in claim 56, wherein said second loss component consists of a region having, by laser irradiation of part of the cladding of said optical waveguide, a refractive index higher than a refractive index of a region of the cladding not subjected to the laser irradiation.

192. The optical waveguide circuit as claimed in claim 57, wherein said second loss component consists of a region having, by laser irradiation of part of the cladding of said optical waveguide, a refractive index higher than a refractive index of a region of the cladding not subjected to the laser irradiation.

193. The optical waveguide circuit as claimed in claim 58, wherein said second loss component consists of a region having, by laser irradiation of part of the cladding of said optical waveguide, a refractive index higher than a refractive index of a region of the cladding not subjected to the laser irradiation.

194. The optical waveguide circuit as claimed in claim 59, wherein said second loss component consists of a region having, by laser irradiation of part of the cladding of said optical waveguide, a refractive index higher than a refractive index of a region of the cladding not subjected to the laser irradiation.

* * * * *